United States Patent [19]
Ekern et al.

[11] Patent Number: 5,770,256
[45] Date of Patent: Jun. 23, 1998

[54] METHOD OF MAKING AN IONICALLY PERMEABLE SEPARATOR FOR A LECLANCHE CELL

[75] Inventors: Ronald J. Ekern, Verona; Janna L. Rose; Miguel E. Armacanqui, both of Madison, all of Wis.

[73] Assignee: Rayovac Corporation, Madison, Wis.

[21] Appl. No.: 645,495

[22] Filed: May 13, 1996

Related U.S. Application Data

[60] Division of Ser. No. 526,762, Sep. 11, 1995, which is a continuation-in-part of Ser. No. 275,019, Jul. 13, 1994.

[51] Int. Cl.$^6$ ............................. B05D 5/12; H01M 2/16
[52] U.S. Cl. ............................ 427/58; 427/395; 429/254
[58] Field of Search ........................... 429/254; 427/395, 427/58

[56] References Cited

U.S. PATENT DOCUMENTS

| | | |
|---|---|---|
| 3,650,825 | 3/1972 | Lihl . |
| 3,682,733 | 8/1972 | Smit ................................... 427/395 X |
| 3,877,993 | 4/1975 | Davis . |
| 3,888,700 | 6/1975 | Larsen . |
| 3,928,074 | 12/1975 | Jung et al. . |
| 3,963,520 | 6/1976 | Bauer et al. . |
| 3,970,476 | 7/1976 | Cerfon . |
| 4,952,368 | 8/1990 | Skenazi et al. . |
| 5,093,159 | 3/1992 | Fernandez et al. . |
| 5,108,494 | 4/1992 | Vemura et al. . |
| 5,180,647 | 1/1993 | Rowland et al. . |

FOREIGN PATENT DOCUMENTS 1065553A 10/1992 China .

OTHER PUBLICATIONS

Ihara, et al., "Mechanism of Corrosion Inhibition with Bismuth Compounds for Iron, Nickel and Zinc in Acid Solutions," 60 *Denki Kagaku* 500–507 (1992) (no month).

Huang, et al., "Mercury–Substituting Inhibitors for Zinc/Manganese Dry Cells," 24 *Battery Monthly* 260 (1994) (Abstracts only) (no month).

Chen, et al., "Corrosion of Ammonium Chloride Mercury–free Paper Lined Battery During the Storage," 24 *Dianchi* (1994) (English abstract, plus translation of Japanese paper) (no month).

Mathewson, "Zinc—The Science & Technology of the Metal, its Alloys and Compounds," pp. 523–533, 555–560 New York (1959) (no month).

Aufenast and Muller, "Gas Formulation on Dry Cells," 335–355 UK (1963).

Shreir, "Biometallic Conversion," 194–197 UK (1963) (no month).

Miyazaki et al., "New Alloy Composition for Zinc Can," 110–112 1987 no month.

Linden, "The Zinc–Carbon Cell," pp. 5–1 to 5–42 New York (1984) no month.

Davis, "Metal Handbook," 9th Ed. vol. 14, 299–326, 343–360 (1988) no month.

Cody et al., "Applied Statistics," 3rd Ed. 100–103 (1991) no month.

Unknown, "Mercury Fre Dry Battery," Nikkei New Materials 1–10 (1992) no month.

Meesu, "The PMA Alloy," JEC Battery Newsletter, No. 5, pp. 30–42 (no month).

*Primary Examiner*—John S. Maples
*Attorney, Agent, or Firm*—Quarles & Brady

[57] ABSTRACT

An ionically permeable separator for a LeClanche cell, and methods of making and using same, are provided for in the invention. The separator comprises a Kraft paper separator and a corrosion-inhibiting coating thereupon selected to prevent corrosion of a zinc anode of the LeClanche cell. The separator may be configured for use in round or flat LeClanche cells. The separators of the invention may be used in heavy duty batteries containing an electrolyte comprising zinc chloride as a primary component. Cells made in accordance with the invention exhibit comparable or improved capacity and other performance characteristics in respect of conventional cells.

14 Claims, 82 Drawing Sheets

ANALYSIS OF HEAVY DUTY D SIZE CELLS (SCALE UP 1)

2.2 OHM LIFT (MIN TO 0.9V) n = 6

| LOTS | | 0 MIN | 1HT MIN | % RET | 3HT MIN | % RET | 3RT MIN | % RET |
|---|---|---|---|---|---|---|---|---|
| CTRL | Range<br>Ave<br>S.D. | 492.8-575.2<br>528.4<br>33.82 | 538.0-576.4<br>559.2<br>16.44 | 105.83 | 355.2-472.8<br>420.7<br>46.65 | 79.62 | 447.0-534.0<br>497.0<br>39.72 | 94.06 |
| 37 | Range<br>Ave<br>S.D. | 576.6-586.0<br>582.8<br>3.47 | 556.8-581.6<br>567.5<br>9.34 | 97.37 | 417.0-520.8<br>492.5<br>38.26 | 84.51 | 532.2-586.2<br>560.6<br>17.79 | 96.19 |
| 38 | Range<br>Ave<br>S.D. | 550.8-589.6<br>573.6<br>17.79 | 555.2-584.3<br>576.3<br>11.24 | 100.29 | 489.0-550.8<br>519.5<br>21.26 | 90.57 | 588.0-628.8<br>594.6<br>19.96 | 103.66 |
| 35 | Range<br>Ave<br>S.D. | 559.2-589.6<br>574.9<br>12.25 | 526.0-594.0<br>562.0<br>27.96 | 97.75 | 372.0-541.8<br>479.7<br>61.86 | 83.44 | 554.4-703.8<br>600.7<br>54.04 | 104.49 |
| 36 | Range<br>Ave<br>S.D. | 563.2-600.8<br>583.1<br>13.20 | 506.0-580.4<br>552.2<br>31.79 | 94.70 | 512.4-542.4<br>525.3<br>13.56 | 90.09 | 573.6-607.2<br>593.9<br>15.19 | 101.85 |

FIGURE 9A 2.2 OHM 1H/D (MIN TO 0.9V) n = 6

| LOTS | | 0<br>MIN | 1HT<br>MIN | % RET | 3HT<br>MIN | % RET | 3RT<br>MIN | % RET |
|---|---|---|---|---|---|---|---|---|
| CTRL | Range<br>Ave<br>S.D. | 510.0-528.8<br>519.2<br>7.45 | 446.8-517.2<br>467.9<br>25.77 | 90.12 | 398.4-417.6<br>410.7<br>6.72 | 79.10 | 393.0-515.4<br>420.4<br>47.43 | 80.97 |
| 37 | Range<br>Ave<br>S.D. | 508.5-525.0<br>517.6<br>6.45 | 354.0-460.2<br>417.0<br>37.45 | 80.57 | 292.2-351.6<br>335.5<br>21.94 | 64.82 | 456.6-474.0<br>465.3<br>7.31 | 89.90 |
| 38 | Range<br>Ave<br>S.D. | 508.5-523.4<br>516.6<br>4.89 | 399.0-466.4<br>426.4<br>29.41 | 82.54 | 305.4-402.0<br>353.0<br>30.73 | 68.34 | 460.2-515.4<br>477.5<br>19.77 | 92.44 |
| 35 | Range<br>Ave<br>S.D. | 466.8-510.0<br>489.6<br>19.96 | 351.2-454.2<br>403.0<br>32.66 | 82.32 | 340.2-391.2<br>353.3<br>19.37 | 72.16 | 391.2-460.2<br>414.8<br>24.08 | 84.72 |
| 36 | Range<br>Ave<br>S.D. | 474.8-516.0<br>504.2<br>14.98 | 410.4-475.6<br>449.6<br>29.86 | 89.17 | 321.6-348.0<br>333.1<br>10.16 | 66.07 | 416.4-438.0<br>425.3<br>7.72 | 84.35 |

FIGURE 9B 2.2 OHM CONT (MIN TO 0.8V)  n = 6

| LOTS | | 0 MIN | 1HT MIN | % RET | 3HT MIN | % RET | 3RT MIN | % RET |
|---|---|---|---|---|---|---|---|---|
| CTRL | Range<br>Ave<br>S.D. | 448.0-487.0<br>464.3<br>12.64 | 434.1-467.7<br>447.7<br>12.71 | 96.42 | 400.8-428.4<br>416.9<br>12.54 | 89.79 | 424.2-445.8<br>436.3<br>9.31 | 93.97 |
| 37 | Range<br>Ave<br>S.D. | 460.0-484.7<br>470.4<br>10.70 | 407.7-460.0<br>429.8<br>17.26 | 91.37 | 340.2-366.6<br>364.2<br>23.91 | 77.42 | 422.4-456.0<br>438.7<br>12.24 | 93.26 |
| 38 | Range<br>Ave<br>S.D. | 436.7-473.3<br>452.6<br>14.55 | 410.0-440.0<br>429.5<br>10.74 | 94.89 | 352.8-379.8<br>367.7<br>10.66 | 81.24 | 342.6-370.8<br>352.1<br>10.77 | 77.79 |
| 35 | Range<br>Ave<br>S.D. | 435.8-458.3<br>444.8<br>8.53 | 440.0-471.3<br>455.2<br>11.91 | 102.34 | 403.8-471.0<br>428.0<br>22.86 | 96.22 | 352.2-370.8<br>360.4<br>6.55 | 81.03 |
| *36 | Range<br>Ave<br>S.D. | 190.0-423.3<br>382.0<br>94.1 | 418.0-450.0<br>441.8<br>12.08 | 115.77 | 377.4-430.2<br>405.2<br>19.55 | 106.07 | 333.0-356.4<br>343.4<br>10.74 | 89.90 |
| | n=5 | 417.5-423.3<br>420.44 | | 105.1 | | | | |

*One cell had very low CCV (1.022v) at beginning of test

FIGURE 9C 3.9 OHM 1H/D (MIN TO 0.9V) n = 6

| LOTS | | 0 MIN | 1HT MIN | 1HT % RET | 3HT MIN | 3HT % RET | 3RT MIN | 3RT % RET |
|---|---|---|---|---|---|---|---|---|
| CTRL | Range | 1004.5-1133.4 | 899.3-1139.3 | 96.51 | 1053.6-1079.4 | 98.10 | 949.8-1005.0 | 90.29 |
| | Ave | 1087.8 | 1049.8 | | 1067.1 | | 982.2 | |
| | S.D. | 48.76 | 100.14 | | 8.56 | | 27.01 | |
| 37 | Range | 1132.5-1254.0 | 884.1-1079.3 | 82.936 | 899.4-1005.6 | 82.18 | 1055.4-1113.6 | 91.35 |
| | Ave | 1171.5 | 971.6 | | 962.7 | | 1070.2 | |
| | S.D. | 46.21 | 73.46 | | 39.55 | | 21.65 | |
| 38 | Range | 1110.6-1185.8 | 839.0-1012.5 | 83.11 | 831.0-1062.0 | 82.89 | 1019.4-1122.0 | 93.24 |
| | Ave | 1142.7 | 949.7 | | 947.20 | | 1065.5 | |
| | S.D. | 33.36 | 70.62 | | 97.3 | | 32.86 | |
| 35 | Range | 1121.7-1190.4 | 896.6-1113.3 | 89.416 | 758.4-1059.0 | 83.77 | 1061.4-1120.8 | 94.27 |
| | Ave | 1142.6 | 1021.67 | | 957.1 | | 1077.1 | |
| | S.D. | 24.14 | 75.70 | | 112.48 | | 22.80 | |
| 36 | Range | 1119.7-1180.9 | 605.5-1057.5 | 81.243 | 587.4-1062.6 | 82.01 | 1008.0-1120.8 | 93.17 |
| | Ave | 1143.6 | 929.1 | | 937.9 | | 1065.5 | |
| | S.D. | 28.00 | 163.70 | | 175.52 | | 36.17 | |

FIGURE 9D

39 OHM 4H/D (HR TO 0.9V) n = 6

| LOTS | | 0<br>HR | 1HT<br>HR | % RET | 3HT<br>HR | % RET | 3RT<br>HR | % RET |
|---|---|---|---|---|---|---|---|---|
| CTRL | Range<br>Ave<br>S.D. | 176.0-192.2<br>181.1<br>6.26 | 210.2-215.6<br>213.4<br>1.73 | 117.81 | 188.1-212.0<br>199.3<br>8.96 | 110.05 | 192.1-212.4<br>202.6<br>6.82 | 111.89 |
| 37 | Range<br>Ave<br>S.D. | 192.4-215.0<br>204.9<br>8.55 | 214.1-219.8<br>217.3<br>2.53 | 106.03 | 214.1-231.9<br>222.8<br>7.77 | 108.74 | 201.1-216.4<br>209.1<br>5.64 | 102.03 |
| 38 | Range<br>Ave<br>S.D. | 208.4-232.0<br>221.2<br>7.65 | 201.1-211.1<br>207.7<br>3.73 | 93.90 | 148.4-215.9<br>198.1<br>27.29 | 89.53 | 204.1-242.3<br>216.2<br>14.53 | 97.72 |
| 35 | Range<br>Ave<br>S.D. | 161.4-191.5<br>178.3<br>9.98 | 192.1-222.6<br>212.5<br>10.43 | 119.15 | 214.3-226.9<br>220.9<br>5.16 | 123.87 | 192.5-220.3<br>212.9<br>10.38 | 119.41 |
| 36 | Range<br>Ave<br>S.D. | 168.8-192.3<br>183.6<br>8.20 | 214.3-226.3<br>220.3<br>4.75 | 120.00 | 208.3-221.6<br>214.6<br>4.93 | 116.90 | 196.9-224.1*<br>211.4<br>9.92 | 115.15 |

FIGURE 9E

DELAYED TARGETS

24 MONTH RT n = 15

| LOTS | | 0 mo<br>AMPS |
|---|---|---|
| CTRL | Range<br>Ave<br>S.D. | 9.12-9.74<br>9.42<br>0.17 |
| 37 | Range<br>Ave<br>S.D. | 8.53-9.09<br>8.70<br>0.13 |
| 38 | Range<br>Ave<br>S.D. | 8.60-8.99<br>8.77<br>0.13 |
| 35 | Range<br>Ave<br>S.D. | 9.12-10.28<br>9.82<br>0.35 |
| 36 | Range<br>Ave<br>S.D. | 9.55-10.14<br>9.85<br>0.13 |

FIGURE 9F

DELAYED TARGETS

6 MONTH 113 F/50% H    n = 15

| LOTS | | 0 mo AMPS | 2 mo AMPS | 2 mo % RET | 4 mo AMPS | 4 mo % RET |
|---|---|---|---|---|---|---|
| CTRL | Range<br>Ave<br>S.D. | 9.16-9.79<br>9.50<br>0.17 | 7.37-8.59<br>8.22<br>0.34 | 86.53 | 6.46-8.06<br>7.46<br>0.47 | 78.48 |
| 37 | Range<br>Ave<br>S.D. | 8.36-9.16<br>8.79<br>0.19 | 6.84-7.74<br>7.55<br>0.22 | 85.89 | 6.27-7.22<br>6.94<br>0.22 | 78.94 |
| 38 | Range<br>Ave<br>S.D. | 8.54-9.04<br>8.70<br>0.14 | 6.91-7.60<br>7.28<br>0.21 | 83.68 | 5.88-6.88<br>6.42<br>0.25 | 73.79 |
| 35 | Range<br>Ave<br>S.D. | 9.48-10.29<br>9.94<br>0.18 | 7.77-8.72<br>8.36<br>0.27 | 84.10 | 6.70-8.17<br>7.65<br>0.42 | 76.93 |
| 36 | Range<br>Ave<br>S.D. | 9.62-10.26<br>9.87<br>0.15 | 7.76-8.66<br>8.23<br>0.28 | 83.38 | 7.08-8.12<br>7.45<br>0.36 | 75.53 |

FIGURE 9G

DELAYED TARGETS
3 MONTH 130 F   n = 15
(i)

| LOTS | | 0 mo AMPS | 1 mo AMPS | % RET | 2 mo AMPS | % RET | 3 mo AMPS | % RET |
|---|---|---|---|---|---|---|---|---|
| CTRL | Range | 9.29-9.84 | 7.84-8.70 | 87.88 | 6.38-7.71 | 75.97 | 5.46-6.81 | 67.22 |
|  | Ave | 9.49 | 8.34 |  | 7.21 |  | 6.38 |  |
|  | S.D. | 0.14 | 0.26 |  | 0.32 |  | 0.35 |  |
| 37 | Range | 8.46-9.05 | 7.21-8.41 | 90.44 | 5.93-7.21 | 76.45 | 4.78-6.57 | 66.81 |
|  | Ave | 8.79 | 7.95 |  | 6.72 |  | 5.87 |  |
|  | S.D. | 0.15 | 0.35 |  | 0.39 |  | 0.53 |  |
| 38 | Range | 8.43-8.99 | 7.45-8.23 | 90.07 | 6.29-7.05 | 76.26 | 5.34-6.24 | 66.71 |
|  | Ave | 8.76 | 7.89 |  | 6.68 |  | 5.84 |  |
|  | S.D. | 0.16 | 0.21 |  | 0.22 |  | 0.27 |  |
| 35 | Range | 9.49-10.12 | 8.20-8.84 | 86.46 | 6.61-7.85 | 73.84 | 5.43-6.91 | 64.79 |
|  | Ave | 9.90 | 8.56 |  | 7.31 |  | 6.41 |  |
|  | S.D. | 0.16 | 0.19 |  | 0.35 |  | 0.42 |  |
| 36 | Range | 9.65-10.10 | 7.75-8.90 | 84.29 | 6.86-7.70 | 73.05 | 5.34-6.70 | 63.52 |
|  | Ave | 9.87 | 8.32 |  | 7.21 |  | 6.27 |  |
|  | S.D. | 0.14 | 0.32 |  | 0.24 |  | 0.37 |  |

(ii) 5 OHM LEAKAGE n = 10

| | 0 | 2 wks | 4 wks | 6 wks | 8 wks | 10 wks | 12 wks |
|---|---|---|---|---|---|---|---|
| CTRL | 0/10 | 0/10 | 0/10 | 0/10 | 0/10 | 0/10 | 0/10 |
| 37 | 0/10 | 0/10 | 0/10 | 0/10 | 0/10 | 0/10 | 0/10 |
| 38 | 0/10 | 0/10 | 0/10 | 0/10 | 0/10 | 0/10 | 0/10 |
| 35 | 0/10 | 0/10 | 0/10 | 0/10 | 0/10 | 0/10 | 0/10 |
| 36 | 0/10 | 0/10 | 0/10 | 0/10 | 0/10 | 0/10 | 0/10 |

FIGURE 9H-1

(iii) PD Amp retention

| | Initial(rt) amps | 6 wks amps | 6 wks % ret | 12 wks amps | 12 wks % ret | Initial(ht) amps | 6 wks amps | 6 wks % ret | 12 wks amps | 12 wks % ret |
|---|---|---|---|---|---|---|---|---|---|---|
| CTRL | 5.53 | 4.27 | 77.4 | 3.25 | 58.8 | 5.37 | 5.08 | 94.6 | 4.71 | 87.8 |
| 37 | 5.25 | 4.00 | 76.2 | 3.43 | 65.3 | 5.09 | 4.60 | 90.4 | 4.25 | 83.4 |
| 38 | 5.04 | 4.20 | 83.3 | 3.84 | 78.2 | 4.76 | 4.39 | 92.2 | 4.02 | 84.4 |
| 35 | 5.03 | 3.36 | 66.8 | 2.86 | 56.8 | 4.70 | 4.25 | 90.4 | 3.80 | 80.7 |
| 36 | 4.84 | 3.65 | 75.4 | 3.28 | 67.6 | 4.70 | 4.56 | 97.0 | 4.09 | 87.0 |

FIGURE 9H-2

ANALYSIS OF HEAVY DUTY D SIZE CELLS (SCALE UP 2)

2.2 OHM LIFT (MIN TO 0.9V) n = 6

| LOTS | | 0 MIN | 1HT MIN | 1HT % RET | 3HT MIN | 3HT % RET | 3RT MIN | 3RT % RET |
|------|------|-------|---------|-----------|---------|-----------|---------|-----------|
| CTRL | Range | 449.2-622.0 | 355.8-573.0 | 101.97 | 386.4-483.6 | 87.81 | 491.4-575.4 | 102.95 |
|      | Ave   | 501.4       | 511.3       |        | 440.3       |       | 516.2       |        |
|      | S.D.  | 63.5        | 80.36       |        | 43.55       |       | 33.3        |        |
| 49   | Range | 588.8-623.7 | 546.0-577.2 | 91.79  | 484.2-571.8 | 89.41 | 537.0-600.0 | 92.14  |
|      | Ave   | 609.2       | 559.2       |        | 544.7       |       | 561.3       |        |
|      | S.D.  | 12.5        | 12.91       |        | 31.89       |       | 21.6        |        |
| 50   | Range | 579.7-613.2 | 535.8-576.0 | 92.50  | 492.0-586.2 | 89.35 | 517.2-550.8 | 89.47  |
|      | Ave   | 597.2       | 552.4       |        | 533.6       |       | 534.3       |        |
|      | S.D.  | 13.7        | 16.10       |        | 32.23       |       | 15.1        |        |
| 47   | Range | 563.7-584.4 | 487.8-574.2 | 93.89  | 323.4-508.2 | 70.01 | 513.0-568.2 | 95.21  |
|      | Ave   | 575.7       | 540.5       |        | 403.0       |       | 548.1       |        |
|      | S.D.  | 9.1         | 31.68       |        | 64.87       |       | 19.6        |        |
| 48   | Range | 511.4-571.7 | 571.8-602.4 | 109.89 | 418.2-564.6 | 92.85 | 524.4-569.4 | 103.26 |
|      | Ave   | 530.6       | 583.1       |        | 492.7       |       | 547.9       |        |
|      | S.D.  | 21.6        | 11.05       |        | 51.76       |       | 15.0        |        |

FIGURE 10A 2.2 OHM 1H/D (MIN TO 0.8V)  n = 6

| LOTS | | 0<br>MIN | 1HT<br>MIN | 1HT<br>% RET | 3RT<br>MIN | 3RT<br>% RET |
|---|---|---|---|---|---|---|
| CTRL | Range<br>Ave<br>S.D. | 637.3-654.0<br>642.8<br>5.82 | 124.8-645.0<br>538.6<br>203.95 | 83.79 | 526.2-585.6<br>569.9<br>22.29 | 88.66 |
| 49 | Range<br>Ave<br>S.D. | 650.4-693.0<br>660.1<br>16.21 | 596.4-654.6<br>634.4<br>20.01 | 96.11 | 573.0-658.2<br>638.2<br>32.41 | 96.68 |
| 50 | Range<br>Ave<br>S.D. | 630.0-645.0<br>635.4<br>6.02 | 589.2-640.8<br>620.6<br>24.16 | 97.67 | 633.0-650.4<br>641.13<br>6.74 | 100.93 |
| 47 | Range<br>Ave<br>S.D. | 552.8-623.8<br>598.6<br>23.86 | 532.8-598.8<br>563.0<br>32.40 | 94.05 | 522.0-634.8<br>576.7<br>36.91 | 96.34 |
| 48 | Range<br>Ave<br>S.D. | 608.1-658.2<br>620.1<br>19.35 | 468.0-594.6<br>509.1<br>47.36 | 82.10 | 560.4-645.0<br>616.1<br>34.66 | 99.35 |

FIGURE 10B 2.2 OHM CONT (MIN TO 0.8V)  n = 6

| LOTS | | 0 MIN | 1HT MIN | % RET | 3HT MIN | % RET | 3RT MIN | % RET |
|---|---|---|---|---|---|---|---|---|
| CTRL | Range | 426.7-460.0 | 420.6-454.8 | | 405.6-435.6 | | 443.4-462.6 | |
| | Ave | 450.1 | 431.7 | 95.91 | 418.4 | 92.96 | 451.8 | 100.38 |
| | S.D. | 12.74 | 13.60 | | 11.3 | | 6.20 | |
| 49 | Range | 435.6-461.7 | 403.8-437.4 | | 406.8-427.2 | | 456.0-552.6 | |
| | Ave | 446.2 | 414.4 | 92.87 | 417.7 | 93.61 | 484.90 | 108.67 |
| | S.D. | 9.71 | 12.27 | | 9.0 | | 34.37 | |
| 50 | Range | 410.0-424.7 | 402.0-441.6 | | 357.6-430.2 | | 437.4-465.0 | |
| | Ave | 417.8 | 425.2 | 101.77 | 384.3 | 91.98 | 449.0 | 107.47 |
| | S.D. | 6.33 | 13.27 | | 27.4 | | 11.53 | |
| 47 | Range | 396.0-411.3 | 337.8-457.2 | | 353.4-441.6 | | 399.0-433.8 | |
| | Ave | 402.1 | 426.6 | 106.09 | 378.3 | 94.08 | 422.9 | 105.17 |
| | S.D. | 5.40 | 45.35 | | 33.6 | | 13.09 | |
| 48 | Range | 378.7-408.0 | 416.4-444.0 | | 378.6-450.0 | | 391.2-456.0 | |
| | Ave | 392.9 | 431.2 | 109.75 | 423.4 | 107.76 | 417.2 | 106.18 |
| | S.D. | 9.97 | 11.28 | | 26.1 | | 21.94 | |

FIGURE 10C 3.9 OHM 1H/D (MIN TO 0.9V)    n = 6

| LOTS | | 0 MIN | 1HT MIN | 1HT % RET | 3HT MIN | 3HT % RET | 3RT MIN | 3RT % RET |
|---|---|---|---|---|---|---|---|---|
| CTRL | Range | 1137.0-1189.1 | 1053.6-1137.0 | | 959.4-1115.4 | | 993.0-1120.2 | |
| | Ave | 1167.3 | 1090.9 | 93.45 | 1065.4 | 91.27 | 1049.9 | 89.94 |
| | S.D. | 16.90 | 39.42 | | 56.44 | | 46.7 | |
| 49 | Range | 1170.6-1185.5 | 1079.4-1132.2 | | 880.8-1121.4 | | 1131.6-1175.4 | |
| | Ave | 1177.7 | 1120.6 | 95.15 | 1061.1 | 90.10 | 1146.80 | 97.38 |
| | S.D. | 5.26 | 20.54 | | 92.49 | | 19.8 | |
| 50 | Range | 1142.0-1190.9 | 1016.4-1129.2 | | 1059.6-1117.8 | | 1119.6-1139.4 | |
| | Ave | 1169.2 | 1098.6 | 93.96 | 1084.2 | 92.73 | 1128.7 | 96.53 |
| | S.D. | 17.98 | 44.39 | | 25.76 | | 8.7 | |
| 47 | Range | 1111.5-1161.0 | 994.8-1117.8 | | 704.4-1056.0 | | 1072.8-1129.2 | |
| | Ave | 1141.4 | 1060.2 | 92.88 | 906.9 | 79.45 | 1105.1 | 96.82 |
| | S.D. | 17.86 | 49.84 | | 141.99 | | 24.3 | |
| 48 | Range | 1167.4-1184.0 | 939.0-1077.6 | | 898.2-1126.2 | | 1065.0-1174.8 | |
| | Ave | 1175.0 | 996.5 | 84.81 | 1007.9 | 85.78 | 1120.7 | 95.38 |
| | S.D. | 5.43 | 47.94 | | 89.09 | | 41.1 | |

FIGURE 10D

39 OHM 4H/D (HR TO 0.9V)    n = 6

| LOTS | | 0 HR | 1HT HR | 1HT % RET |
|---|---|---|---|---|
| CTRL | Range | 156.5-208.4 | 193.0-207.2 | |
| | Ave | 178.47 | 200.78 | 112.50 |
| | S.D. | 18.77 | 4.81 | |
| 49 | Range | 153.3-174.1 | 198.7-215.1 | |
| | Ave | 163.58 | 208.25 | 127.31 |
| | S.D. | 7.58 | 5.41 | |
| 50 | Range | 172.1-183.4 | 196.8-209.7 | |
| | Ave | 176.00 | 203.90 | 115.85 |
| | S.D. | 4.23 | 4.37 | |
| 47 | Range | 132.4-172.8 | 188.9-227.5 | |
| | Ave | 150.65 | 211.07 | 140.10 |
| | S.D. | 13.94 | 12.87 | |
| 48 | Range | 152.6-188.5 | 172.7-221.6 | |
| | Ave | 169.40 | 203.07 | 119.87 |
| | S.D. | 12.27 | 18.24 | |

FIGURE 10E

DELAYED TARGETS

24 MONTH RT     n = 15

| LOTS | | 0 mo<br>AMPS |
|---|---|---|
| CTRL | Range<br>Ave<br>S.D. | 9.17-9.93<br>9.61<br>0.22 |
| 49 | Range<br>Ave<br>S.D. | 8.94-9.30<br>9.16<br>0.11 |
| 50 | Range<br>Ave<br>S.D. | 8.72-9.54<br>9.20<br>0.21 |
| 47 | Range<br>Ave<br>S.D. | 9.86-10.83<br>10.32<br>0.27 |
| 48 | Range<br>Ave<br>S.D. | 9.69-10.34<br>10.02<br>0.17 |

FIGURE 10F

DELAYED TARGETS

6 MONTH 113 F/50% H    n = 15

| LOTS | | 0 mo<br>AMPS | 2 mo<br>AMPS | % RET | 4 mo<br>AMPS | % RET |
|---|---|---|---|---|---|---|
| CTRL | Range<br>Ave<br>S.D. | 9.25-9.92<br>9.55<br>0.20 | 6.72-7.99<br>7.63<br>0.32 | 79.86 | 4.90-6.70<br>6.08<br>0.54 | 63.62 |
| 49 | Range<br>Ave<br>S.D. | 8.89-9.51<br>9.28<br>0.15 | 6.33-7.97<br>7.50<br>0.44 | 80.82 | 3.22-6.91<br>6.21<br>0.88 | 66.96 |
| 50 | Range<br>Ave<br>S.D. | 8.89-9.39<br>9.21<br>0.16 | 7.32-7.97<br>7.66<br>0.20 | 83.16 | 5.67-6.57<br>6.24<br>0.25 | 67.77 |
| 47 | Range<br>Ave<br>S.D. | 9.45-10.58<br>10.20<br>0.28 | 6.98-8.75<br>7.88<br>0.54 | 77.26 | 4.99-7.13<br>6.24<br>0.61 | 61.20 |
| 48 | Range<br>Ave<br>S.D. | 9.90-10.31<br>10.12<br>0.13 | 7.08-8.32<br>7.88<br>0.36 | 77.86 | 5.09-6.97<br>6.27<br>0.48 | 61.96 |

FIGURE 10G

DELAYED TARGETS
(i) 3 MONTH 130 F    n = 15

| LOTS | | 0 mo AMPS | | 1 mo AMPS | % RET | 2 mo AMPS | % RET | 3 mo AMPS | % RET |
|---|---|---|---|---|---|---|---|---|---|
| CTRL | Range<br>Ave<br>S.D. | 9.46-10.05<br>9.74<br>0.16 | | 6.28-8.31<br>7.63<br>0.48 | 78.41 | 5.79-8.23<br>7.51<br>0.59 | 77.10 | 5.12-7.05<br>6.36<br>0.50 | 65.36 |
| 49 | Range<br>Ave<br>S.D. | 8.95-9.43<br>9.20<br>0.17 | | 6.29-7.70<br>7.26<br>0.46 | 78.85 | 6.38-7.79<br>7.24<br>0.43 | 78.70 | 5.14-6.57<br>5.91<br>0.55 | 64.20 |
| 50 | Range<br>Ave<br>S.D. | 8.35-9.44<br>9.09<br>0.27 | | 6.79-7.78<br>7.32<br>0.29 | 80.51 | 6.57-7.99<br>7.34<br>0.46 | 80.78 | 5.31-7.15<br>6.17<br>0.53 | 67.87 |
| 47 | Range<br>Ave<br>S.D. | 9.69-10.35<br>10.13<br>0.19 | | 6.73-8.25<br>7.61<br>0.43 | 75.15 | 6.14-7.96<br>7.35<br>0.52 | 72.52 | 4.74-6.87<br>5.95<br>0.62 | 58.70 |
| 48 | Range<br>Ave<br>S.D. | 9.84-10.39<br>10.10<br>0.16 | | 6.73-8.33<br>7.62<br>0.55 | 75.40 | 5.66-8.31<br>7.37<br>0.64 | 73.01 | 4.60-6.97<br>6.13<br>0.60 | 60.70 |

(ii) 5 OHM LEAKAGE    n = 10

| | 0 | 2 wks | 4 wks | 6 wks | 8 wks | 10 wks | 12 wks |
|---|---|---|---|---|---|---|---|
| CTRL | 0/10 | 0/10 | 0/10 | 0/10 | 0/10 | 0/10 | 0/10 |
| 49 | 0/10 | 0/10 | 0/10 | 0/10 | 0/10 | 0/10 | 0/10 |
| 50 | 0/10 | 0/10 | 0/10 | 0/10 | 0/10 | 0/10 | 1/10 |
| 47 | 0/10 | 0/10 | 0/10 | 0/10 | 0/10 | 0/10 | 0/10 |
| 48 | 0/10 | 0/10 | 0/10 | 0/10 | 0/10 | 0/10 | 0/10 |

FIGURE 10H-1

(iii) PD Amp retention    n=10

| | Initial(rt) amps | 6 wks amps | 6 wks % ret | 12 wks amps | 12 wks % ret | Initial(ht) amps | 6 wks amps | 6 wks % ret | 12 wks amps | 12 wks % ret |
|---|---|---|---|---|---|---|---|---|---|---|
| CTRL | 5.65 | 4.40 | 77.80 | 3.94 | 69.76 | 5.74 | 4.54 | 79.14 | 4.28 | 74.57 |
| 49 | 5.36 | 3.71 | 69.16 | 3.14 | 58.50 | 5.28 | 4.40 | 83.29 | 3.90 | 73.96 |
| 50 | 5.36 | 4.43 | 82.67 | 3.95 | 73.70 | 5.10 | 4.61 | 90.48 | 4.25 | 83.34 |
| 47 | 3.48 | 2.51 | 72.02 | 2.02 | 58.08 | 3.78 | 3.32 | 87.68 | 3.08 | 81.43 |
| 48 | 4.06 | 3.20 | 78.81 | 2.96 | 72.84 | 3.98 | 4.19 | 105.15 | 3.98 | 99.92 |

FIGURE 10H-2

ANALYSIS OF HEAVY DUTY C SIZE CELLS (SCALE UP 1)

(i) 3.9 OHM LIFT (MIN TO 0.9V)   n = 6

| LOTS | | 0 MIN | 1HT MIN | 1HT % RET | 3HT MIN | 3HT % RET | 3RT MIN | 3RT % RET |
|---|---|---|---|---|---|---|---|---|
| CTRL | Range | 460.3-550.6 | 327.0-493.1 | | 376.8-415.8 | | 422.4-507.6 | |
| | Ave | 507.3 | 391.0 | 77.07 | 396.4 | 78.14 | 471.3 | 92.90 |
| | S.D. | 29.98 | 66.68 | | 17.54 | | 29.46 | |
| 46 | Range | 500.3-525.2 | 395.8-498.4 | | 381.6-441.0 | | 434.4-490.2 | |
| | Ave | 509.8 | 450.8 | 88.42 | 410.8 | 80.58 | 467.1 | 91.62 |
| | S.D. | 8.84 | 44.34 | | 22.33 | | 18.23 | |
| 44 | Range | 455.1-525.6 | 408.4-458.8 | | 394.2-457.8 | | 488.4-528.0 | |
| | Ave | 502.9 | 427.5 | 85.00 | 427.2 | 84.95 | 504.5 | 100.32 |
| | S.D. | 25.17 | 18.04 | | 22.60 | | 16.23 | |

(ii) 3.9 OHM 1H/D (MIN TO 0.8V)   n = 6

| LOTS | | 0 MIN | 1HT MIN | 1HT % RET | 3HT MIN | 3HT % RET | 3RT MIN | 3RT % RET |
|---|---|---|---|---|---|---|---|---|
| CTRL | Range | 468.0-519.4 | 350.0-460.5 | | 405.6-453.6 | | 467.4-505.8 | |
| | Ave | 499.6 | 428.7 | 85.80 | 427.3 | 85.53 | 483.3 | 96.74 |
| | S.D. | 23.92 | 41.20 | | 22.03 | | 17.17 | |
| 46 | Range | 465.9-520.5 | 407.0-473.9 | | 416.4-463.8 | | 412.8-507.6 | |
| | Ave | 486.5 | 452.7 | 93.05 | 445.7 | 91.61 | 470.2 | 96.65 |
| | S.D. | 21.69 | 23.41 | | 16.06 | | 35.68 | |
| 44 | Range | 441.4-505.5 | 337.1-464.1 | | 384.0-465.0 | | 454.2-476.4 | |
| | Ave | 476.5 | 389.2 | 81.68 | 431.5 | 90.56 | 469.2 | 98.47 |
| | S.D. | 25.94 | 57.31 | | 29.80 | | 8.33 | |

FIGURE 11A (i) 3.9 OHM CONT (MIN TO 0.8V)    n = 6

| LOTS | | 0<br>MIN | 1HT<br>MIN | % RET | 3HT<br>MIN | % RET | 3RT<br>MIN | % RET |
|---|---|---|---|---|---|---|---|---|
| CTRL | Range<br>Ave<br>S.D. | 347.7-381.7<br>367.7<br>11.51 | 355.0-382.8<br>367.2<br>10.01 | 99.86 | 311.4-345.6<br>331.3<br>14.37 | 90.09 | 335.4-366.0<br>353.7<br>11.11 | 96.19 |
| 46 | Range<br>Ave<br>S.D. | 378.0-400.0<br>389.3<br>8.47 | 362.8-387.1<br>374.5<br>9.99 | 96.20 | 345.6-373.8<br>359.4<br>11.02 | 92.32 | 331.8-391.0<br>367.9<br>18.31 | 94.50 |
| 44 | Range<br>Ave<br>S.D. | 362.5-424.1<br>385.7<br>21.58 | 328.5-404.7<br>379.1<br>26.15 | 98.29 | 325.8-360.0<br>350.4<br>12.70 | 90.85 | 347.4-403.2<br>369.6<br>19.83 | 95.83 |

(ii) 6.8 OHM 1H/D (HR TO 0.9V)    n = 6

| LOTS | | 0<br>HR | 1HT<br>HR | % RET | 3HT<br>HR | % RET | 3RT<br>HR | % RET |
|---|---|---|---|---|---|---|---|---|
| CTRL | Range<br>Ave<br>S.D. | 13.9-14.9<br>14.4<br>0.48<br>n=5 | 11.7-13.5<br>12.5<br>0.65 | 86.80 | 11.6-13.0<br>12.5<br>0.49 | 86.92 | 13.5-14.7<br>14.1<br>0.55 | 97.92 |
| 46 | Range<br>Ave<br>S.D. | 13.6-14.6<br>14.1<br>0.48 | 12.0-13.8<br>12.8<br>0.58 | 90.80 | 11.5-13.5<br>12.7<br>0.66 | 89.95 | 12.6-13.9<br>13.5<br>0.59 | 95.39 |
| 44 | Range<br>Ave<br>S.D. | 11.9-14.8<br>13.9<br>1.03 | 10.1-12.8<br>11.8<br>1.01 | 84.90 | 12.0-13.8<br>12.7<br>0.61 | 91.25 | 0.0-14.4<br>11.5<br>5.66<br>n=5<br>13.8 | 82.97<br><br><br><br>99.57 |

FIGURE 11B (i) 39 OHM 4H/D (HR TO 0.9V)    n = 6

| LOTS | | 0 HR | 1HT HR | % RET | 3HT HR | % RET | 3RT HR | % RET |
|---|---|---|---|---|---|---|---|---|
| CTRL | Range | 97.73-98.77 | 90.32-95.81 | 95.06 | 89.64-91.76 | 92.45 | 94.53-97.68 | 97.77 |
|  | Ave | 98.11 | 93.26 |  | 90.71 |  | 95.92 |  |
|  | S.D. | 0.40 | 1.95 |  | 0.92 |  | 1.38 |  |
| 46 | Range | 91.35-94.84 | 89.48-93.66 | 96.61 | 85.96-89.83 | 93.53 | 91.59-98.84 | 102.32 |
|  | Ave | 93.91 | 90.73 |  | 87.84 |  | 96.09 |  |
|  | S.D. | 1.29 | 1.60 |  | 1.52 |  | 2.93 |  |
| 44 | Range | 90.12-97.80 | 86.13-90.76 | 95.54 | 86.39-91.20 | 93.53 | 90.78-94.84 | 99.59 |
|  | Ave | 93.78 | 89.60 |  | 87.71 |  | 93.40 |  |
|  | S.D. | 2.66 | 1.75 |  | 1.78 |  | 1.83 |  |

(ii) DELAYED TARGETS
24 MONTH RT   n=15   *n=12

| LOTS | | 0 AMPS |
|---|---|---|
| CTRL | Range | 7.14-7.31 |
|  | Ave | 7.20 |
|  | S.D. | 0.06 |
| 46 | Range | 6.69-7.41 |
|  | Ave | 7.18 |
|  | S.D. | 0.21 |
| 44 | Range | 7.21-7.84 |
|  | Ave | 7.60 |
|  | S.D. | 0.17 |

FIGURE 11C

DELAYED TARGETS (i) 6 MONTH 113 F/50% H   n=15   *n=12

| LOTS | | 0 mo AMPS | 2 mo AMPS | 2 mo % RET | 4 mo AMPS | 4 mo % RET |
|---|---|---|---|---|---|---|
| CTRL | Range | 7.16-7.53 | 5.60-6.29 | | 4.86-5.50 | |
|  | Ave | 7.31 | 5.96 | 81.50 | 5.21 | 71.25 |
|  | S.D. | 0.12 | 0.20 | | 0.20 | |
| 46 | Range | 6.74-7.40 | 5.48-6.14 | | 4.82-5.43 | |
|  | Ave | 7.18 | 5.93 | 82.63 | 5.23 | 72.81 |
|  | S.D. | 0.15 | 0.20 | | 0.19 | |
| 44 | Range | 7.36-7.83 | 5.50-6.39 | | 4.62-5.57 | |
|  | Ave | 7.67 | 6.11 | 79.67 | 5.36 | 69.76 |
|  | S.D. | 0.12 | 0.20 | | 0.21 | |

(ii) 3 MONTH 130 F   n=15   *n=12   **n=14

| LOTS | | 0 mo AMPS | 1 mo AMPS | 1 mo % RET | 2 mo AMPS | 2 mo % RET | 3 mo AMPS | 3 mo % RET |
|---|---|---|---|---|---|---|---|---|
| CTRL | Range | 7.03-7.61 | 5.49-6.40 | | 5.05-5.93 | | 4.27-5.07 | |
|  | Ave | 7.28 | 6.02 | 82.69 | 5.58 | 76.61 | 4.70 | 64.49 |
|  | S.D. | 0.17 | 0.24 | | 0.29 | | 0.22 | |
| 46 | Range | 7.10-7.56 | 5.57-6.45 | | 5.14-6.03 | | 3.69-5.18 | |
|  | Ave | 7.33 | 6.02 | 82.13 | 5.46 | 74.47 | 4.52 | 61.65 |
|  | S.D. | 0.12 | 0.24 | | 0.24 | | 0.35 | |
| 44 | Range | 7.40-7.90 | 5.95-6.52 | | 5.11-5.99 | | 3.90-5.12 | |
|  | Ave | 7.69 | 6.21 | 80.75 | 5.60 | 72.84 | 4.65 | 60.40 |
|  | S.D. | 0.13 | 0.17 | | 0.29 | | 0.34 | |

FIGURE 11D (i) 7.5 OHM LEAKAGE      n = 10

|  | 0 | 2 wks | 4 wks | 6 wks | 8 wks | 10 wks | 12 wks |
|---|---|---|---|---|---|---|---|
| CTRL | 0/10 | 0/10 | 1/10 | 2/10 | 2/10 | 2/10 | 2/10 |
| 46 | 0/10 | 0/10 | 3/10 | 3/10 | 3/10 | 3/10 | 3/10 |
| 44 | 0/10 | 0/10 | 1/10 | 2/10 | 2/10 | 2/10 | 2/10 |

(ii) PD Amp retention      n=10

| LOTS | Initial(rt) amps | 6 wks amps | 6 wks % ret | 12 wks amps | 12 wks % ret |
|---|---|---|---|---|---|
| CTRL** | 3.41 | 2.84 | 83.14 | 2.60 | 76.17 |
| 46 | 3.29 | 2.51 | 76.39 | 2.39 | 72.65 |
| 44* | 3.56 | 2.79 | 78.30 | 2.57 | 72.07 |

| | Initial(ht) amps | 6 wks amps | 6 wks % ret | 12 wks amps | 12 wks % ret |
|---|---|---|---|---|---|
| | 3.20 | 2.92 | 91.341 | 2.74 | 85.55 |
| | 3.18 | 2.79 | 87.626 | 2.56 | 80.50 |
| | 3.52 | 2.78 | 79.07 | 2.72 | 77.39 |

* AT 12 WK RT & HT ONE CELL FROM EACH HAD LOW AMPERAGE AND CCV
** AT 12 WK HT ONE CELL HAD A LOW CCV & AMP TARGET

FIGURE 11E

ANALYSIS OF HEAVY DUTY C SIZE CELLS (SCALE UP 2)

3.9 OHM LIFT (MIN TO 0.9V)   n = 6

| LOTS | | 0 MIN | 1HT MIN | % RET | 3HT MIN | % RET | 3RT MIN | % RET |
|---|---|---|---|---|---|---|---|---|
| CTRL | Range | 412.8-506.4 | 485.4-496.2 | | 419.4-503.4 | | 485.4-496.2 | |
| | Ave | 456.5 | 489.3 | 107.19 | 459.0 | 100.55 | 489.3 | 107.19 |
| | S.D. | 34.08 | 4.77 | | 28.35 | | 4.77 | |
| 55 | Range | 504.6-527.6 | 281.4-522.0 | | 414.0-501.0 | | 525.6-511.2 | |
| | Ave | 515.3 | 458.8 | 89.03 | 467.5 | 90.72 | 520.7 | 101.04 |
| | S.D. | 8.80 | 88.80 | | 29.90 | | 5.19 | |
| 56 | Range | 479.4-511.2 | 458.4-521.4 | | 438.0-494.4 | | 511.2-528.0 | |
| | Ave | 494.9 | 495.3 | 100.07 | 475.1 | 95.99 | 520.6 | 105.19 |
| | S.D. | 12.04 | 20.98 | | 21.65 | | 5.60 | |

FIGURE 12A (i)  3.9 OHM 1H/D (MIN TO 0.8V)    n = 6

| LOTS | | 0 MIN | 1HT MIN | % RET | 3HT MIN | % RET | 3RT MIN | % RET |
|---|---|---|---|---|---|---|---|---|
| CTRL | Range | 520.2-532.5 | 511.8-519.6 | | 465.0-477.0 | | 517.8-527.4 | |
| | Ave | 525.7 | 516.2 | 98.19 | 471.6 | 89.71 | 523.8 | 99.64 |
| | S.D. | 4.57 | 2.67 | | 5.03 | | 3.46 | |
| 55 | Range | 531.1-571.4 | 517.8-531.6 | | 471.0-514.8 | | 521.4-589.8 | |
| | Ave | 551.8 | 522.4 | 94.67 | 481.6 | 87.28 | 539.0 | 97.68 |
| | S.D. | 20.57 | 5.31 | | 16.46 | | 25.41 | |
| 56 | Range | 527.0-533.0 | 471.6-520.8 | | 466.2-476.4 | | 522.0-531.6 | |
| | Ave | 529.4 | 496.4 | 93.76 | 473.2 | 89.38 | 526.3 | 99.41 |
| | S.D. | 2.33 | 23.18 | | 3.69 | | 3.09 | |

(ii) 3.9 OHM CONT (MIN TO 0.8V)    n = 6

| LOTS | | 0 MIN | 1HT MIN | % RET | 3HT MIN | % RET | 3RT MIN | % RET |
|---|---|---|---|---|---|---|---|---|
| CTRL | Range | 362.8-415.0 | 336.0-375.6 | | 322.8-339.0 | | 351.0-376.2 | |
| | Ave | 377.0 | 353.2 | 93.70 | 330.5 | 87.68 | 365.7 | 97.02 |
| | S.D. | 19.31 | 15.36 | | 5.67 | | 9.46 | |
| 55 | Range | 355.5-413.5 | 354.0-395.4 | | 307.8-361.2 | | 351.6-367.8 | |
| | Ave | 376.1 | 373.2 | 99.24 | 340.9 | 90.65 | 358.2 | 95.25 |
| | S.D. | 26.08 | 13.89 | | 20.49 | | 5.55 | |
| 56 | Range | 334.3-368.0 | 358.2-384.0 | | 273.0-344.4 | | 348.6-363.0 | |
| | Ave | 348.8 | 369.8 | 106.02 | 325.6 | 93.34 | 355.8 | 102.00 |
| | S.D. | 12.73 | 8.47 | | 27.33 | | 5.96 | |

FIGURE 12B (i) 6.8 OHM 1H/D (MIN TO 0.9V)  n = 6

| LOTS | | 0 HR | 1HT HR | % RET | 3HT HR | % RET | 3RT HR | % RET |
|---|---|---|---|---|---|---|---|---|
| CTRL | Range | 14.9-15.8 | 14.7-15.6 | | 11.6-14.6 | | 14.9-15.6 | |
| | Ave | 15.5 | 15.0 | 96.35 | 13.7 | 88.40 | 15.5 | 99.79 |
| | S.D. | 0.32 | 0.33 | | 1.11 | | 0.29 | |
| 55 | Range | 15.6-15.8 | 14.7-15.6 | | 12.4-14.9 | | 15.6-15.7 | |
| | Ave | 15.7 | 15.0 | 95.44 | 14.4 | 91.61 | 15.7 | 99.79 |
| | S.D. | 0.09 | 0.32 | | 0.97 | | 0.05 | |
| 56 | Range | 14.8-15.7 | 14.7-15.7 | | 14.6-14.8 | | 15.0-15.9 | |
| | Ave | 15.1 | 15.1 | 99.78 | 14.7 | 97.46 | 15.6 | 103.09 |
| | S.D. | 0.34 | 0.44 | | 0.08 | | 0.31 | |

(ii) 39 OHM 4H/D (HR TO 0.9V)  n = 6

| LOTS | | 0 HR | 1HT HR | % RET | 3HT HR | % RET | 3RT HR | % RET |
|---|---|---|---|---|---|---|---|---|
| CTRL | Range | 97.89-99.57 | 93.54-94.98 | | 90.45-93.23 | | 97.40-99.02 | |
| | Ave | 98.69 | 94.19 | 95.45 | 91.46 | 92.68 | 98.11 | 99.41 |
| | S.D. | 0.62 | 0.51 | | 0.99 | | 0.60 | |
| 55 | Range | 95.66-99.45 | 93.91-97.12 | | 89.94-91.98 | | 95.33-98.72 | |
| | Ave | 97.74 | 95.07 | 97.27 | 90.78 | 92.89 | 97.53 | 99.79 |
| | S.D. | 1.24 | 1.15 | | 0.67 | | 1.18 | |
| 56 | Range | 95.79-98.65 | 93.72-94.60 | | 90.71-93.72 | | 97.81-98.17 | |
| | Ave | 97.48 | 94.09 | 96.53 | 92.10 | 94.48 | 97.98 | 100.52 |
| | S.D. | 0.95 | 0.39 | | 1.30 | | 0.13 | |

FIGURE 12C

DELAYED TARGETS (i) 24 MONTH RT    n = 15

| LOTS | | 0 |
|---|---|---|
| | | AMPS |
| CTRL | Range | 7.23-7.75 |
| | Ave | 7.49 |
| | S.D. | 0.15 |
| 55 | Range | 7.37-7.72 |
| | Ave | 7.53 |
| | S.D. | 0.11 |
| 56 | Range | 6.96-7.27 |
| | Ave | 7.12 |
| | S.D. | 0.10 |

(ii) 6 MONTH 113 F/50% H    n = 15    *n=14

| LOTS | | 0 mo | | 2 mo | | 4 mo | |
|---|---|---|---|---|---|---|---|
| | | AMPS | | AMPS | % RET | AMPS | % RET |
| CTRL | Range | 7.09-7.62 | | 5.55-6.45 | | 4.73-5.50 | |
| | Ave | 7.39 | | 6.00 | 81.10 | 5.10 | 69.00 |
| | S.D. | 0.18 | | 0.27 | | 0.23 | |
| 55 | Range | 7.22-7.78 | | 6.05-6.74 | | 4.05-5.81 | |
| | Ave | 7.54 | | 6.39 | 84.81 | 5.47 | 72.51 |
| | S.D. | 0.15 | | 0.19 | | 0.41 | |
| 56 | Range | 6.84-7.31 | | 3.72-6.27 | | 3.17-5.56 | |
| | Ave | 7.08 | | 5.75 | 81.28 | 4.72 | 66.71 |
| | S.D. | 0.12 | | 0.63 | | 0.95 | |

FIGURE 12D

DELAYED TARGETS
(i) 3 MONTH 130 F n = 15

| LOTS | | 0 mo<br>AMPS | 1 mo<br>AMPS | % RET | 2 mo<br>AMPS | % RET | 3 mo<br>AMPS | % RET |
|---|---|---|---|---|---|---|---|---|
| CTRL | Range<br>Ave<br>S.D. | 7.30-7.84<br>7.54<br>0.14 | 5.16-6.31<br>5.88<br>0.29 | 78.01 | 5.24-6.52<br>6.05<br>0.29 | 80.17 | 4.39-5.72<br>5.22<br>0.31 | 69.22 |
| 55 | Range<br>Ave<br>S.D. | 6.57-7.67<br>7.40<br>0.29 | 5.99-6.52<br>6.22<br>0.16 | 84.05 | 5.66-6.50<br>6.15<br>0.22 | 83.13 | 5.04-5.78<br>5.43<br>0.23 | 73.35 |
| 56 | Range<br>Ave<br>S.D. | 6.94-7.32<br>7.14<br>0.12 | 5.41-6.22<br>5.90<br>0.24 | 82.6302 | 5.17-6.23<br>5.77<br>0.32 | 80.85 | 3.02-5.42<br>4.95<br>0.62 | 69.26 |

(ii) 7.5 OHM LEAKAGE n = 10

| LOTS | 0 | 2 wks | 4 wks | 6 wks | 8 wks | 10 wks | 12 wks |
|---|---|---|---|---|---|---|---|
| CTRL | 0/10 | 0/10 | 0/10 | 0/10 | 0/10 | 0/10 | 0/10 |
| 55 | 0/10 | 0/10 | 0/10 | 0/10 | 0/10 | 0/10 | 0/10 |
| 56 | 0/10 | 0/10 | 0/10 | 0/10 | 0/10* | 1/10* | 1/10* |

*showed white deposits on bottom crimp (iii) PD Amp retention    n=10

| LOTS | Initial(rt)<br>amps | 6 wks<br>amps | % ret | 12 wks<br>amps | % ret | Initial(ht)<br>amps | 6 wks<br>amps | % ret | 12 wks<br>amps | % ret |
|---|---|---|---|---|---|---|---|---|---|---|
| CTRL | 3.41 | 2.55 | 74.86 | 2.38 | 69.90 | 3.35 | 2.81 | 83.90 | 2.69 | 80.17 |
| 55 | 3.38 | 2.83 | 83.74 | 2.49 | 73.61 | 3.28 | 2.31 | 70.49 | 2.04 | 62.13 |
| 56 | 2.95 | 2.16 | 73.32 | 2.00 | 67.90 | 3.22 | 2.49 | 77.35 | 2.36 | 73.41 |

FIGURE 12E

ANALYSIS OF HEAVY DUTY AA SIZE CELLS (SCALE UP 1)

(i) 2.2 OHM LIFT (MIN TO 0.9V)  n = 6  12.7 ppm Fe

| LOTS | | 0 MIN | 1HT MIN | % RET | 3HT MIN | % RET | 2RT MIN | % RET | 6RT MIN | % RET |
|---|---|---|---|---|---|---|---|---|---|---|
| CTRL | Range<br>Ave<br>S.D. | 157.3-168.0<br>165.3<br>4.01 | 142.7-158.3<br>150.6<br>5.98 | 91.11 | 142.2-148.2<br>144.7<br>2.06 | 87.54 | 153.9-170.2<br>162.2<br>7.06 | 98.12 | 150.6-157.8<br>154.2<br>3.01 | 93.28 |
| 43 | Range<br>Ave<br>S.D. | 148.0-159.1<br>155.1<br>3.94 | 140.0-147.1<br>144.0<br>3.23 | 92.84 | 124.2-142.8<br>136.0<br>6.92 | 87.69 | 143.1-157.9<br>153.9<br>5.75 | 99.22 | 142.2-156.0<br>151.2<br>5.13 | 97.49 |
| 42 | Range<br>Ave<br>S.D. | 161.3-172.7<br>167.7<br>4.78 | 99.7-158.3<br>142.5<br>23.44 | 84.97 | 99.6-144.6<br>127.7<br>14.89 | 76.15 | 162.2-173.3<br>166.2<br>4.99 | 99.10 | 130.2-161.4<br>146.0<br>16.44 | 87.06 |
| 41 | Range<br>Ave<br>S.D. | 155.1-167.6<br>162.0<br>6.20 | 139.2-156.7<br>149.2<br>6.23 | 92.10 | 139.2-148.2<br>142.2<br>3.56 | 87.78 | 146.4-166.0<br>158.5<br>7.21 | 97.84 | 141.6-154.2<br>149.8<br>5.06 | 100.40 |

FIGURE 13A-1

(ii) 3.9 OHM 1H/D (MIN TO 0.9V)    n = 6

| LOTS | | 0 MIN | 1HT MIN | % RET | 3HT MIN | % RET | 2RT MIN | % RET | 6RT MIN | % RET |
|---|---|---|---|---|---|---|---|---|---|---|
| CTRL | Range<br>Ave<br>S.D. | 108.5-112.0<br>110.5<br>1.10 | 84.8-104.4<br>98.8<br>7.55 | 89.41 | 78.0-96.0<br>89.9<br>6.89 | 81.39 | 104.3-110.8<br>107.4<br>2.47 | 97.25 | 101.4-109.2<br>104.4<br>3.15 | 94.52 |
| 43 | Range<br>Ave<br>S.D. | 104.3-111.8<br>108.7<br>2.73 | 89.1-101.8<br>97.3<br>5.30 | 89.48 | 82.8-96.0<br>91.4<br>4.69 | 84.10 | 102.2-109.3<br>106.5<br>2.56 | 97.95 | 95.4-106.2<br>101.9<br>4.51 | 93.76 |
| 42 | Range<br>Ave<br>S.D. | 106.6-109.4<br>107.9<br>1.02 | 39.2-102.6<br>85.9<br>23.65 | 79.57 | 61.2-97.2<br>83.4<br>12.5 | 77.28 | 102.4-109.8<br>107.0<br>3.26 | 99.1 | 94.8-106.2<br>102.6<br>4.59 | 95.07 |
| 41 | Range<br>Ave<br>S.D. | 102.1-110.6<br>108.1<br>3.09 | 78.4-98.0<br>91.1<br>7.27 | 84.27 | 79.2-96.6<br>89.1<br>6.86 | 82.45 | 103.4-107.6<br>105.6<br>1.65 | 97.7 | 97.8-103.8<br>101.3<br>2.02 | 93.74 |

FIGURE 13A-2

(i) 3.9 OHM CONT (MIN TO 0.8V)   n = 6   12.7 ppm Fe

| LOTS | | 0<br>MIN | | 1HT<br>MIN | % RET | 3HT<br>MIN | % RET | 2RT<br>MIN | % RET | 6RT<br>MIN | % RET |
|---|---|---|---|---|---|---|---|---|---|---|---|
| CTRL | Range<br>Ave<br>S.D. | 124.8-128.0<br>125.8<br>1.31 | | 77.6-115.4<br>102.9<br>14.02 | 81.79 | 76.2-97.2<br>87.6<br>8.56 | 69.63 | 116.4-122.0<br>119.2<br>2.16 | 94.75 | 99.0-118.2<br>107.1<br>6.83 | 85.14 |
| 43 | Range<br>Ave<br>S.D. | 120.0-129.0<br>123.8<br>3.43 | | 99.5-117.4<br>107.2<br>7.77 | 86.59 | 89.4-111.6<br>104.4<br>8.18 | 84.33 | 113.5-126.4<br>119.0<br>4.16 | 96.12 | 106.2-111.0<br>108.4<br>1.96 | 87.56 |
| 42 | Range<br>Ave<br>S.D. | 112.0-120.3<br>115.5<br>3.18 | | 86.9-118.0<br>106.5<br>13.22 | 92.21 | 89.4-100.8<br>94.9<br>4.76 | 82.16 | 107.3-119.3<br>114.0<br>4.55 | 98.70 | 101.4-111.6<br>106.9<br>4.08 | 92.55 |
| 41 | Range<br>Ave<br>S.D. | 112.8-116.4<br>114.3<br>1.66 | | 90.3-115.5<br>108.6<br>9.42 | 95.01 | 86.2-104.4<br>93.8<br>8.00 | 82.06 | 108.6-118.0<br>114.6<br>3.56 | 100.2 | 94.8-108.0<br>100.9<br>4.81 | 88.28 |

FIGURE 13B-1

(ii) 1.8 OHM PHOTOFLASH (CYCLES TO 0.9V)   n = 6

| LOTS | | 0 CYCLES | 1HT CYCLES | % RET | 3HT CYCLES | % RET | 3RT CYCLES | % RET | 6RT CYCLES | % RET |
|---|---|---|---|---|---|---|---|---|---|---|
| CTRL | Range | 156.0-174.3 | 136.8-165.7 | | 136.5-149.5 | | 149.0-163.7 | | 144.7-169.5 | |
|  | Ave | 167.0 | 153.4 | 91.85 | 144.0 | 86.25 | 155.0 | 92.81 | 162.4 | 97.25 |
|  | S.D. | 6.09 | 11.11 | | 5.16 | | 5.39 | | 9.11 | |
| 43 | Range | 149.7-163.5 | 129.3-163.3 | | 105.5-143.2 | | 132.5-154.5 | | 134.0-164.3 | |
|  | Ave | 158.0 | 149.7 | 94.74 | 131.7 | 83.38 | 146.7 | 92.85 | 154.9 | 98.03 |
|  | S.D. | 6.11 | 11.52 | | 15.09 | | 8.30 | | 10.95 | |
| 42 | Range | 151.0-166.5 | 129.7-160.6 | | 132.0-143.8 | | 134.7-158.0 | | 145.7-165.0 | |
|  | Ave | 161.5 | 145.7 | 90.21 | 138.1 | 85.51 | 151.4 | 93.75 | 158.0 | 97.85 |
|  | S.D. | 5.59 | 10.69 | | 5.19 | | 8.46 | | 7.60 | |
| 41 | Range | 155.0-163.6 | 127.0-148.0 | | 136.0-149.7 | | 146.2-157.0 | | 149.7-167.3 | |
|  | Ave | 158.3 | 140.7 | 88.88 | 140.5 | 88.72 | 153.6 | 97.00 | 160.5 | 101.39 |
|  | S.D. | 3.23 | 7.37 | | 5.07 | | 4.20 | | 6.33 | |

FIGURE 13B-2

(i) 10 OHM 1H/D (MIN TO 0.9V)  n = 6   12.7 ppm Fe

| LOTS | | 0 MIN | 1HT MIN | % RET | 3HT MIN | % RET | 2RT MIN | % RET | 6RT MIN | % RET |
|---|---|---|---|---|---|---|---|---|---|---|
| CTRL | Range | 446.8-459.2 | 409.2-442.7 | | 356.4-402.6 | | 445.9-457.5 | | 413.4-451.8 | |
| | Ave | 453.5 | 419.8 | 92.56 | 390.7 | 86.15 | 452.4 | 99.76 | 441.8 | 97.42 |
| | S.D. | 4.33 | 11.73 | | 17.05 | | 4.12 | | 14.15 | |
| 43 | Range | 450.6-452.9 | 391.1-416.3 | | 351.0-406.8 | | 414.3-454.2 | | 405.0-444.6 | |
| | Ave | 451.5 | 406.5 | 90.03 | 392.3 | 86.89 | 444.6 | 98.47 | 418.8 | 92.76 |
| | S.D. | 1.01 | 9.77 | | 20.50 | | 15.04 | | 13.48 | |
| 42 | Range | 446.9-459.2 | 399.3-449.8 | | 400.8-411.6 | | 445.8-459.4 | | 419.4-453.0 | |
| | Ave | 453.3 | 423.4 | 93.40 | 407.2 | 89.83 | 452.5 | 99.82 | 437.3 | 96.47 |
| | S.D. | 3.94 | 19.88 | | 3.90 | | 5.40 | | 14.35 | |
| 41 | Range | 449.0-453.9 | 403.4-414.7 | | 394.2-403.8 | | 447.5-458.4 | | 402.0-450.6 | |
| | Ave | 451.5 | 411.5 | 91.14 | 399.1 | 88.39 | 451.0 | 99.89 | 428.9 | 94.99 |
| | S.D. | 2.12 | 4.43 | | 3.97 | | 4.03 | | 22.09 | |

FIGURE 13C-1

(ii) 75 OHM 4H/D (HR TO 0.9V)    n = 6

| LOTS | | 0 HR | 1HT HR | 1HT % RET | 3HT HR | 3HT % RET | 2RT HR | 2RT % RET |
|---|---|---|---|---|---|---|---|---|
| CTRL | Range<br>Ave<br>S.D. | 63.9-65.4<br>64.5<br>0.66 | 59.2-61.8<br>60.8<br>1.17 | 94.26 | 58.2-59.9<br>58.9<br>0.56 | 91.34 | 62.0-63.2<br>62.8<br>0.50 | 97.31 |
| 43 | Range<br>Ave<br>S.D. | 62.9-64.8<br>63.8<br>0.80 | 61.3-62.9<br>62.0<br>0.62 | 97.18 | 58.0-59.4<br>58.7<br>0.56 | 91.98 | 62.5-63.7<br>63.0<br>0.45 | 98.75 |
| 42 | Range<br>Ave<br>S.D. | 62.5-64.8<br>63.8<br>0.85 | 60.7-62.8<br>62.1<br>0.76 | 97.33 | 58.5-59.6<br>59.0<br>0.41 | 92.48 | 61.8-64.7<br>63.0<br>0.42 | 98.78<br>n=5 |
| 41 | Range<br>Ave<br>S.D. | 62.2-65.1<br>63.6<br>1.02 | 61.6-62.3<br>61.9<br>0.25 | 97.33 | 57.9-59.4<br>58.8<br>0.55 | 92.48 | 62.1-64.0<br>62.7<br>0.71 | 98.56 |

FIGURE 13C-2

DELAYED TARGETS 12.7 ppm Fe
(i) 24 MONTH RT   n = 15

| LOTS |       | 0 mo AMPS   | 6 mo AMPS   | % RET |
|------|-------|-------------|-------------|-------|
| CTRL | Range | 5.16-5.49   | 4.61-5.27   |       |
|      | Ave   | 5.33        | 5.05        | 94.81 |
|      | S.D.  | 0.10        | 0.19        |       |
| 43   | Range | 4.96-5.36   | 4.88-5.16   |       |
|      | Ave   | 5.17        | 5.05        | 97.60 |
|      | S.D.  | 0.13        | 0.08        |       |
| 42   | Range | 5.44-5.76   | 5.00-5.56   |       |
|      | Ave   | 5.66        | 5.28        | 93.35 |
|      | S.D.  | 0.09        | 0.16        |       |
| 41   | Range | 5.33-5.81   | 5.02-5.49   |       |
|      | Ave   | 5.55        | 5.23        | 94.15 |
|      | S.D.  | 0.13        | 0.15        |       |

FIGURE 13D-1

(ii) 6 MONTH 113 F/50% H  n = 15

| LOTS | | 0 mo<br>AMPS | 2 mo<br>AMPS | % RET | 4 mo<br>AMPS | % RET |
|---|---|---|---|---|---|---|
| CTRL | Range<br>Ave<br>S.D. | 4.64-5.58<br>5.19<br>0.25 | 4.71-5.14<br>4.93<br>0.14 | 94.99 | 4.04-4.55<br>4.29<br>0.14 | 82.71 |
| 43 | Range<br>Ave<br>S.D. | 4.47-5.36<br>5.03<br>0.25 | 3.36-5.04<br>4.66<br>0.41 | 92.64 | 2.06-4.36<br>4.01<br>0.58 | 79.75 |
| 42 | Range<br>Ave<br>S.D. | 5.07-5.84<br>5.64<br>0.20 | 4.19-5.36<br>4.93<br>0.33 | 87.41 | 3.26-4.47<br>4.00<br>0.39 | 70.91 |
| 41 | Range<br>Ave<br>S.D. | 5.18-5.79<br>5.53<br>0.18 | 4.67-5.30<br>5.04<br>0.19 | 91.14 | 4.02-4.70<br>4.38<br>0.19 | 79.29 |

FIGURE 13D-2

DELAYED TARGETS (CONTINUED)
(i) 3 MONTH 130 F    n = 15                                                    12.7 ppm Fe

| LOTS | | 0 mo<br>AMPS | 1 mo<br>AMPS | % RET | 2 mo<br>AMPS | % RET | 3 mo<br>AMPS | % RET |
|---|---|---|---|---|---|---|---|---|
| CTRL | Range<br>Ave<br>S.D. | 4.66-5.64<br>5.29<br>0.25 | 4.06-5.12<br>4.73<br>0.29 | 89.41 | 3.81-5.04<br>4.73<br>0.29 | 89.41 | 3.38-4.61<br>4.25<br>0.28 | 80.25 |
| 43 | Range<br>Ave<br>S.D. | 5.00-5.45<br>5.18<br>0.12 | 4.44-5.08<br>4.79<br>0.20 | 92.47 | 4.51-4.89<br>4.76<br>0.09 | 91.89 | 3.95-4.39<br>4.25<br>0.12 | 82.07 |
| 42 | Range<br>Ave<br>S.D. | 5.22-5.97<br>5.64<br>0.17 | 4.28-5.28<br>4.88<br>0.28 | 86.52 | 4.01-5.09<br>4.47<br>0.30 | 79.26 | 3.36-4.13<br>3.72<br>0.20 | 65.90 |
| 41 | Range<br>Ave<br>S.D. | 5.22-5.81<br>5.62<br>0.15 | 4.59-5.08<br>4.86<br>0.16 | 86.47 | 4.52-5.00<br>4.81<br>0.12 | 85.59 | 4.07-4.54<br>4.32<br>0.12 | 76.92 |

(ii) 10 OHM LEAKAGE    n = 10

| LOTS | 0 | 2 wks | 4 wks | 6 wks | 8 wks | 10 wks | 12 wks |
|---|---|---|---|---|---|---|---|
| CTRL | 0/10 | 0/10 | 2/10 | 3/10 | 3/10 | 3/10 | 3/10 |
| 43 | 0/10 | 0/10 | 1/10 | 3/10 | 3/10 | 3/10 | 3/10 |
| 42 | 0/10 | 0/10 | 2/10 | 2/10 | 2/10 | 2/10 | 2/10 |
| 41 | 0/10 | 0/10 | 3/10 | 4/10 | 4/10 | 4/10 | 4/10 |

FIGURE 13E-1

(iii) PD Amp retention
n=15, *n=13

| LOTS | Initial(rt) amps | 6 wks amps | 6 wks % ret | 12 wks amps | 12 wks % ret | Initial(ht) amps | 6 wks amps | 6 wks % ret | 12 wks amps | 12 wks % ret |
|---|---|---|---|---|---|---|---|---|---|---|
| CTRL | 2.97 | 2.93 | 98.6 | 2.85 | 95.93 | 3.01 | 2.82 | 93.8 | 2.73 | 90.72 |
| 43 | 2.63 | 2.66 | 101.2 | 2.56 | 97.09 | 2.65 | 2.73 | 102.9 | 2.60 | 97.99 |
| 42 | 1.73 | 1.69 | 97.9 | 1.61 | 93.84 | 1.79 | 1.73 | 96.9 | 1.58 | 88.56 |
| 41 | 2.69 | 2.72 | 101.3 | 2.66 | 98.98 | 2.81 | 2.96 | 105.2 | 2.79 | 99.41 |

FIGURE 13E-2

ANALYSIS OF HEAVY DUTY AA SIZE CELLS (SCALE UP 2) 11.0 ppm Fe 3.9 OHM LIFT (MIN TO 0.9V)    n = 6

| LOTS | | 0 MIN | 1HT MIN | % RET | 3HT MIN | % RET | 3RT MIN | % RET |
|---|---|---|---|---|---|---|---|---|
| CTRL | Range | 155.1-169.9 | 139.8-153.0 | | 136.2-151.2 | | 152.4-167.4 | |
| | Ave | 160.5 | 144.4 | 89.97 | 144.2 | 89.84 | 160.1 | 99.75 |
| | S.D. | 6.43 | 5.24 | | 5.38 | | 6.11 | |
| 54 | Range | 156.8-168.5 | 127.8-155.4 | | 135.0-151.8 | | 154.8-158.4 | |
| | Ave | 162.6 | 146.3 | 89.98 | 141.0 | 86.72 | 156.1 | 96.00 |
| | S.D. | 5.60 | 9.86 | | 6.14 | | 1.34 | |

FIGURE 14A 3.9 OHM 1H/D (MIN TO 0.8V)     n = 6     11.0 ppm Fe

| LOTS | | 0 MIN | 1HT MIN | % RET | 3HT MIN | % RET | 3RT MIN | % RET |
|---|---|---|---|---|---|---|---|---|
| CTRL | Range | 146.9-154.7 | 97.8-142.8 | | 93.0-140.4 | | 143.4-148.8 | |
| | Ave | 150.3 | 115.8 | 77.05 | 122.9 | 81.77 | 145.6 | 96.87 |
| | S.D. | 2.87 | 20.04 | | 20.04 | | 2.23 | |
| 54 | Range | 144.2-146.1 | 105.0-145.8 | | 106.8-117.0 | | 138.6-143.4 | |
| | Ave | 145.3 | 118.8 | 81.76 | 110.5 | 76.05 | 141.9 | 97.66 |
| | S.D. | 0.67 | 18.14 | | 3.47 | | 1.81 | |

FIGURE 14B 3.9 OHM CONT (MIN TO 0.8V)   n = 6   11.0 ppm Fe

| LOTS | | 0 | 1HT | | 3HT | | 3RT | |
|---|---|---|---|---|---|---|---|---|
| | | MIN | MIN | % RET | MIN | % RET | MIN | % RET |
| CTRL | Range | 104.0-104.0 | 79.2-106.8 | | 84.0-106.8 | | 111.6-124.2 | |
| | Ave | 104.0 | 92.6 | 89.04 | 82.5 | 79.37 | 116.7 | 112.21 |
| | S.D. | 0.00 | 10.63 | | 8.24 | | 4.53 | |
| 54 | Range | 101.2-104.0 | 85.8-111.6 | | 86.4-102.6 | | 105.0-113.4 | |
| | Ave | 102.9 | 97.5 | 94.75 | 92.5 | 89.89 | 109.8 | 106.71 |
| | S.D. | 1.20 | 9.38 | | 6.53 | | 3.37 | |

FIGURE 14C 1.8 OHM PHOTOFLASH (CYCLES TO 0.9V)    n = 6

11.0 ppm Fe

| LOTS | | 0 CYCLES | 1HT CYCLES | 1HT % RET | 3HT CYCLES | 3HT % RET | 3RT CYCLES | 3RT % RET |
|---|---|---|---|---|---|---|---|---|
| CTRL | Range | 162.5-175.5 | 135.5-169.0 | | 130.5-161.5 | | 159.5-172.5 | |
|  | Ave | 169.9 | 152.8 | 89.94 | 141.1 | 83.02 | 167.0 | 98.27 |
|  | S.D. | 4.26 | 12.74 | | 11.35 | | 4.54 | |
| 54 | Range | 132.3-176.0 | 115.2-160.0 | | 129.0-137.7 | | 161.0-172.7 | |
|  | Ave | 154.0 | 135.0 | 87.66 | 133.2 | 86.52 | 166.9 | 108.37 |
|  | S.D. | 17.39 | 16.43 | | 2.90 | | 4.28 | |

FIGURE 14D

10 OHM 1H/D (MIN TO 0.9V)  n = 6  11.0 ppm Fe

| LOTS | | 0 MIN | 1HT MIN | % RET | 3HT MIN | % RET | 3RT MIN | % RET |
|---|---|---|---|---|---|---|---|---|
| CTRL | Range | 452.4-463.4 | 409.2-446.4 | | 399.0-415.2 | | 418.8-453.6 | |
| | Ave | 457.2 | 424.9 | 92.93 | 408.8 | 89.41 | 445.5 | 97.44 |
| | S.D. | 4.13 | 15.81 | | 6.90 | | 13.19 | |
| 54 | Range | 418.8-453.9 | 414.6-447.0 | | 399.0-460.2 | | 446.4-459.0 | |
| | Ave | 446.2 | 441.1 | 98.86 | 438.7 | 98.32 | 449.9 | 100.83 |
| | S.D. | 13.53 | 13.00 | | 28.61 | | 5.11 | |

FIGURE 14E

75 OHM 4H/D (HR TO 0.9V)    n = 6    11.0 ppm Fe

| LOTS | | 0 HR | 1HT HR | % RET | 3HT HR | % RET | 3RT HR | % RET |
|---|---|---|---|---|---|---|---|---|
| CTRL | Range | 64.8-66.6 | 61.4-66.1 | | 58.7-62.0 | | 62.1-67.3 | |
| | Ave | 65.7 | 62.7 | 95.53 | 60.5 | 92.06 | 64.0 | 97.41 |
| | S.D. | 0.70 | 1.74 | | 1.40 | | 1.87 | |
| 54 | Range | 63.2-65.6 | 59.5-65.2 | | 59.3-61.8 | | 62.5-64.8 | |
| | Ave | 64.6 | 62.2 | 96.29 | 60.6 | 93.76 | 63.8 | 98.76 |
| | S.D. | 0.92 | 1.95 | | 1.11 | | 0.88 | |

FIGURE 14F 11.0 ppm Fe

DELAYED TARGETS
24 MONTH RT    n = 15

| LOTS | | 0 mo AMPS |
|---|---|---|
| CTRL | Range | 5.33-5.76 |
| | Ave | 5.54 |
| | S.D. | 0.11 |
| 54 | Range | 5.21-5.62 |
| | Ave | 5.43 |
| | S.D. | 0.13 |

FIGURE 14G

DELAYED TARGETS (CONTINUED)

6 MONTH 113 F/50% H    n = 15    11.0 ppm Fe

| LOTS | | 0 mo | | 2 mo | | 4 mo | |
|------|------|------|------|------|------|------|------|
| | | AMPS | AMPS | % RET | AMPS | % RET |
| CTRL | Range | 5.10-5.88 | 4.35-5.07 | | 0.00-4.62* | |
| | Ave | 5.49 | 4.72 | 86.06 | 4.00 | 72.88 |
| | S.D. | 0.23 | 0.20 | | 1.12 | |
| 54 | Range | 5.14-5.60 | 4.64-4.99 | | 4.20-4.64 | |
| | Ave | 5.45 | 4.83 | 88.62 | 4.44 | 81.41 |
| | S.D. | 0.13 | 0.10 | | 0.12 | |

*ONE CELL AT 4MO SHOWED A CCV OF 0.0

FIGURE 14H

DELAYED TARGETS (CONTINUED)
(i) 3 MONTH 130 F  n = 15

11.0 ppm Fe

| LOTS | | 0 mo AMPS | 1 mo AMPS | % RET | 2 mo AMPS | % RET | 3 mo AMPS | % RET |
|---|---|---|---|---|---|---|---|---|
| CTRL | Range | 5.13-5.92 | 4.42-5.21 | | 4.40-5.22 | | 3.99-4.81 | |
| | Ave | 5.61 | 4.91 | 87.52 | 4.93 | 87.88 | 4.45 | 79.35 |
| | S.D. | 0.278 | 0.220 | | 0.25 | | 0.25 | |
| 54 | Range | 5.25-5.80 | 4.21-5.15 | | 4.33-5.27 | | 3.92-4.80 | |
| | Ave | 5.46 | 4.78 | 87.55 | 4.80 | 87.85 | 4.39 | 80.35 |
| | S.D. | 0.140 | 0.26 | | 0.24 | | 0.23 | |

(ii) 10 OHM LEAKAGE n = 10

| LOTS | 0 | 2 wks | 4 wks | 6 wks | 8 wks | 10 wks | 12 wks |
|---|---|---|---|---|---|---|---|
| CTRL | 0/10 | 0/10 | 1/10 | 1/10 | 1/10 | 1/10 | 1/10 |
| 54 | 0/10 | 0/10 | 0/10 | 0/10 | 0/10 | 0/10 | 0/10 |

*2/3 showed rust rings on bottom crimp (iii) PD Amp retention    n=10

| | Initial (rt) | | 6 wks | | 12 wks | | Initial (ht) | 6 wks | | 12 wks | |
|---|---|---|---|---|---|---|---|---|---|---|---|
| LOTS | amps | | amps | % ret | amps | % ret | amps | amps | % ret | amps | % ret |
| CTRL | 2.95 | | 2.89 | 97.97 | 2.96 | 100.34 | 2.89 | 2.89 | 100.00 | 2.90 | 100.31 |
| 54 | 2.01 | | 2.28 | 113.53 | 2.32 | 115.32 | 2.30 | 2.61 | 113.43 | 2.62 | 114.04 |

FIGURE 14I

ANALYSIS OF HEAVY DUTY 941 LANTERN SIZE CELLS (SCALE UP 1)

6.8 OHM 30 M/H (HR TO 2.6V)  n = 6

| LOTS | | 0 HR | 1HT HR | % RET | 3HT HR | % RET |
|---|---|---|---|---|---|---|
| CTRL | Range<br>Ave<br>S.D. | 9.90-10.15<br>10.03<br>0.10 | 4.37-9.42<br>8.47<br>2.02 | 84.45 | 7.71-9.08<br>8.57<br>0.57 | 85.44 |
| 39 | Range<br>Ave<br>S.D. | 9.40-9.68<br>9.53<br>0.14 | 9.06-9.40<br>9.32<br>0.13 | 97.74 | 7.17-8.90<br>7.63<br>0.65 | 80.10 |
| 40 | Range<br>Ave<br>S.D. | 7.95-9.39<br>9.06<br>0.56 | 7.40-8.99<br>8.18<br>0.63 | 90.31 | 7.14-8.89<br>7.74<br>0.61 | 85.47 |
| 35A | Range<br>Ave<br>S.D. | 7.91-9.29<br>8.79<br>0.65 | 7.59-9.20<br>8.62<br>0.68 | 98.03 | 6.94-9.06<br>8.11<br>0.96 | 92.30 |
| 36A | Range<br>Ave<br>S.D. | 9.33-9.56<br>9.44<br>0.09 | 9.02-9.38<br>9.21<br>0.12 | 97.55 | 7.38-9.26<br>8.10<br>0.77 | 85.81 |

FIGURE 15A-1

9.1 OHM 30 M/H (HR TO 2.6V)  n = 6

| LOTS | | 0 HR | 1HT HR | 1HT % RET | 3HT HR | 3HT % RET |
|---|---|---|---|---|---|---|
| CTRL | Range | 14.8-15.4 | 15.6-15.9 | | 12.1-13.8 | |
| | Ave | 15.0 | 15.8 | 105.3 | 12.8 | 85.11 |
| | S.D. | 0.25 | 0.17 | | 0.76 | |
| 39 | Range | 14.5-15.2 | 15.0-15.3 | | 13.2-13.9 | |
| | Ave | 14.6 | 15.2 | 104.1 | 13.6 | 92.92 |
| | S.D. | 0.27 | 0.09 | | 0.30 | |
| 40 | Range | 14.9-15.3 | 15.4-15.8 | | 12.3-13.6 | |
| | Ave | 15.1 | 15.6 | 103.3 | 13.1 | 86.64 |
| | S.D. | 0.16 | 0.14 | | 0.43 | |
| 35A | Range | 15.0-15.2 | 15.1-15.7 | | 12.0-14.1 | |
| | Ave | 15.1 | 15.5 | 102.6 | 13.6 | 89.85 |
| | S.D. | 0.08 | 0.19 | | 0.79 | |
| 36A | Range | 14.6-15.0 | 14.6-15.0 | | 12.7-13.8 | |
| | Ave | 14.8 | 14.8 | 100.0 | 13.3 | 89.64 |
| | S.D. | 0.15 | 0.16 | | 0.40 | |

FIGURE 15A-2

1604 MIX 14.5 ppm Fe (i)

| LOTS | | 16 OHM 30 M/H (HR TO 3.0V) 0 HR | 33 OHM 30 M/H (HR TO 3.6V) 0 HR | 110 OHM CONT (HR TO 3.0V) 0 HR | 110 OHM CONT (HR TO 3.0V) 1HT HR | % RET |
|---|---|---|---|---|---|---|
| CTRL | Range<br>Ave<br>S.D. | 25.24-25.41<br>25.31<br>0.09 | 50.07-50.19<br>50.14<br>0.07 | 179.4-182.1<br>180.1<br>1.01 | 187.8-199.5<br>193.6<br>3.79 | 107.5 |
| 39 | Range<br>Ave<br>S.D. | 25.22-25.24<br>25.23<br>0.01 | 49.78-49.84<br>49.80<br>0.03 | 179.0-180.2<br>179.7<br>0.55 | 185.1-190.3<br>187.2<br>2.16 | 104.2 |
| 40 | Range<br>Ave<br>S.D. | 25.17-25.28<br>25.23<br>0.06 | 49.66-49.91<br>49.79<br>0.13 | 178.1-180.7<br>179.1<br>0.88 | 176.9-188.6<br>182.2<br>4.84 | 101.7 |
| 35A | Range<br>Ave<br>S.D. | 25.26-25.28<br>25.27<br>0.01 | 49.86-50.18<br>50.07<br>0.18 | 181.0-183.5<br>182.4<br>0.80 | 179.3-207.0<br>185.6<br>10.67 | 101.7 |
| 36A | Range<br>Ave<br>S.D. | 25.19-25.22<br>25.20<br>0.01 | 49.82-50.00<br>49.88<br>0.10 | 180.4-182.3<br>181.0<br>0.73 | 179.0-184.6<br>180.5<br>2.05 | 99.7 |

FIGURE 15B-1

(ii) PD Amp retention        n=9        9.1 OHM CONT TO 4.2V

| RT LOTS | Initial amps | 2 wks amps | % ret | 6 wks amps | % ret | 12 wks amps | % ret |
|---|---|---|---|---|---|---|---|
| CTRL | 3.780 | 3.933 | 104.1 | 3.972 | 105.1 | 3.509 | 93.83 |
| 39 | 3.994 | 4.089 | 102.4 | 4.173 | 104.5 | 3.768 | 94.33 |
| 40 | 3.850 | 3.860 | 100.3 | 3.954 | 102.7 | 3.694 | 95.96 |
| 35A | 3.972 | 3.987 | 100.4 | 4.010 | 101.0 | 3.712 | 93.45 |
| 36A | 3.980 | 4.064 | 102.1 | 4.162 | 104.6 | 3.829 | 96.20 |

| HT LOTS | Initial amps | 2 wks amps | % ret | 6 wks amps | % ret | 12 wks amps | % ret |
|---|---|---|---|---|---|---|---|
| CTRL | 3.796 | 4.542 | 119.7 | 3.644 | 96.0 | 2.780 | 73.2 |
| 39 | 3.857 | 4.808 | 124.7 | 4.398 | 114.0 | 3.970 | 102.9 |
| 40 | 3.728 | 4.642 | 124.5 | 4.337 | 116.3 | 3.894 | 104.5 |
| 35A | 3.942 | 5.201 | 131.9 | 4.702 | 119.3 | 3.900 | 98.9 |
| 36A | 3.999 | 5.087 | 127.2 | 4.819 | 120.5 | 4.468 | 111.7 |

FIGURE 15B-2

1604 MIX   14.5 ppm Fe (i) L295 TEST    n=6

| LOTS | 1 DAY | 2 DAYS | OBSERVATIONS |
|---|---|---|---|
| CTRL | 0/6 | 0/6 | 3-75,2-50,1-20   NO SEAL MOVEMENT |
| 39 | 1/6 | 1/6 | 2-80,1-75,2-50,1-25   NO SEAL MOVEMENT |
| 40 | 0/6 | 0/6 | 1-80,1-50,1-40,3-5   NO SEAL MOVEMENT |
| 35A | 0/6 | 0/6 | 1-30,1-20,2-5,1-<5,1-DRY   NO SEAL MOVEMENT |
| 36A | 0/6 | 0/6 | 1-20,1-15,1-10,1-5,2-DRY   NO SEAL MOVEMENT |

*percentage of wetness observed on each bottom pad and number of seals which had no movement out of the 24 seals in each group of 6 batteries (ii) 40 OHM LEAKAGE (ENDPT NOT MEASURED)    n=6

| LOTS | 5 DAYS | 9 WKS |
|---|---|---|
| CTRL | 1/6 | 1/6 |
| 39 | 0/6 | 0/6 |
| 40 | 1/6 | 0/6 |
| 35A | 0/6 | 0/6 |
| 36A | 0/6 | 0/6 |

(iii) 40 OHM CONT TO 1.0 V LEAKAGE    n = 9

| LOTS | 0 | 2 wks | 4 wks | 9 wks | 13 wks |
|---|---|---|---|---|---|
| CTRL | 0/9 | 0/9 | 0/9 | 0/9 | 0/9 |
| 39 | 0/9 | 0/9 | 0/9 | 0/9 | 0/9 |
| 40 | 0/9 | 1/9 | 1/9 | 1/9 | 1/9 |
| 35A | 0/9 | 0/9 | 0/9 | 1/9 | 1/9 |
| 36A | 0/9 | 0/9 | 2/9 | 2/9 | 2/9 |

FIGURE 15C

ANALYSIS OF HEAVY DUTY 941 LANTERN SIZE CELLS (SCALE UP 2)

10.8 ppm Fe 6.8 OHM 30 M/H (HR TO 2.6V)   n = 6

| LOTS | | 0 HR | 1HT HR | % RET | 3HT HR | % RET |
|---|---|---|---|---|---|---|
| CTRL | Range | 9.75-9.88 | 7.58-9.36 | | 7.85-9.26 | |
| | Ave | 9.81 | 8.97 | 91.40 | 8.96 | 91.35 |
| | S.D. | 0.06 | 0.68 | | 0.55 | |
| 51 | Range | 9.70-9.87 | 9.15-9.33 | | 7.11-8.96 | |
| | Ave | 9.79 | 9.23 | 94.28 | 8.16 | 83.30 |
| | S.D. | 0.07 | 0.07 | | 0.88 | |
| 52 | Range | 9.52-9.91 | 9.07-9.33 | | 7.1-7.8* | |
| | Ave | 9.69 | 9.22 | 95.15 | 7.38 | 76.16 |
| | S.D. | 0.15 | 0.10 | | 0.29 | |
| 47A | Range | 9.72-10.03 | 5.98-9.48 | | 6.97-9.19* | |
| | Ave | 9.91 | 8.86 | 89.42 | 8.44 | 85.17 |
| | S.D. | 0.11 | 1.41 | | 1.00 | |
| 48A | Range | 8.03-9.82 | 9.13-9.59 | | 7.65-8.99 | |
| | Ave | 9.44 | 9.27 | 98.15 | 8.33 | 88.19 |
| | S.D. | 0.69 | 0.17 | | 0.67 | |

*ONE LANTERN EXHIBITED A CCV OF 0.0V-NOT INCLUDED IN CALCULATION (N=5)

FIGURE 16A-1

9.1 OHM 30 M/H (HR TO 2.6V)    n = 6

| LOTS | | 0 HR | 1HT HR | 1HT % RET | 3HT HR | 3HT % RET |
|---|---|---|---|---|---|---|
| CTRL | Range<br>Ave<br>S.D. | 13.71-14.01<br>13.81<br>0.11 | 13.45-13.77<br>13.55<br>0.11 | 98.11 | 10.14-13.01<br>12.08<br>1.03 | 87.46 |
| 51 | Range<br>Ave<br>S.D. | 13.62-13.93<br>13.77<br>0.11 | 13.26-13.56<br>13.41<br>0.11 | 97.41 | 12.01-13.28<br>12.59<br>0.58 | 91.43 |
| 52 | Range<br>Ave<br>S.D. | 13.84-14.02<br>13.94<br>0.07 | 13.43-17.05<br>14.17<br>1.42 | 101.65 | 13.22-13.49<br>13.35<br>0.10 | 95.77 |
| 47A | Range<br>Ave<br>S.D. | 13.96-14.17<br>14.06<br>0.09 | 13.90-14.13<br>14.02<br>0.11 | 99.74 | 13.09-13.54<br>13.33<br>0.19 | 94.82 |
| 48A | Range<br>Ave<br>S.D. | 13.75-14.06<br>13.97<br>0.13 | 13.30-13.70<br>13.52<br>0.14 | 96.80 | 12.01-13.50<br>13.08<br>0.54 | 93.64 |

FIGURE 16A-2

1604 MIX

| LOTS | | 16 OHM 30 M/H (HR TO 3.0V) 0 HR | 33 OHM 30 M/H (HR TO 3.6V) 0 HR | 110 OHM CONT (HR TO 3.0V) 0 HR | 1HT HR | % RET |
|---|---|---|---|---|---|---|
| CTRL | Range | 22.68-22.73 | 45.9-46.1 | 170.3-171.8 | 168.0-171.1 | |
| | Ave | 22.7 | 46.0 | 171.1 | 172.5 | 100.83 |
| | S.D. | 0.03 | 0.12 | 0.56 | 3.91 | |
| 51 | Range | 22.86-22.94 | 45.9-46.2 | 172.8-175.5 | 172.0-177.9 | |
| | Ave | 22.9 | 46.1 | 174.2 | 175.0 | 100.43 |
| | S.D. | 0.04 | 0.15 | 0.97 | 2.21 | |
| 52 | Range | 22.71-22.90 | 45.9-46.1 | 170.9-174.8 | 172.0-177.1 | |
| | Ave | 22.8 | 46.0 | 172.7 | 174.4 | 100.97 |
| | S.D. | 0.10 | 0.08 | 1.36 | 1.93 | |
| 47A | Range | 23.42-25.07 | 45.8-47.7 | 175.2-186.7 | 174.7-186.0 | |
| | Ave | 24.1 | 47.0 | 181.8 | 180.5 | 99.27 |
| | S.D. | 0.87 | 1.06 | 4.20 | 3.93 | |
| 48A | Range | 22.85-23.02 | 46.1-46.4 | 173.7-176.0 | 170.5-174.6 | |
| | Ave | 22.9 | 46.2 | 175.0 | 172.8 | 98.76 |
| | S.D. | 0.08 | 0.16 | 0.81 | 1.56 | |

FIGURE 16B-1

(ii) PD Amp retention    n=9    9.1 OHM CONT TO 4.2V

| RT LOTS | Initial amps | 2 wks amps | % ret | 6 wks amps | % ret | 12 wks amps | % ret |
|---|---|---|---|---|---|---|---|
| CTRL | 3.82 | 3.69 | 96.48 | 3.40 | 89.10 | 2.77 | 72.61 |
| 51 | 4.04 | 3.92 | 97.03 | 3.78 | 93.56 | 3.53 | 87.37 |
| 52 | 3.89 | 3.69 | 94.77 | 3.55 | 91.26 | 3.38 | 86.98 |
| 47A | 3.81 | 3.65 | 95.89 | 3.44 | 90.31 | 3.17 | 83.31 |
| 48A | 3.84 | 3.72 | 96.76 | 3.61 | 93.84 | 3.42 | 88.93 |

| HT LOTS | Initial amps | 2 wks amps | % ret | 6 wks amps | % ret | 12 wks amps | % ret |
|---|---|---|---|---|---|---|---|
| CTRL | 3.79 | 3.96 | 104.36 | 3.79 | 99.94 | 3.27 | 86.27 |
| 51 | 4.02 | 4.14 | 102.90 | 4.12 | 102.31 | 3.78 | 93.92 |
| 52 | 3.83 | 3.94 | 103.17 | 3.96 | 103.84 | 3.73 | 97.58 |
| 47A | 3.90 | 4.35 | 111.51 | 4.51 | 115.58 | 4.30 | 110.31 |
| 48A | 3.88 | 4.31 | 111.06 | 4.37 | 112.55 | 4.27 | 110.00 | n=8 AT 12 WKS
n=8 AT 6 & 12 WKS

FIGURE 16B-2

1604 MIX (i) L295 TEST    n=6

| LOTS | 1 DAY | 2 DAYS | OBSERVATIONS* |
|------|-------|--------|---------------|
| CTRL | 0/6   | 0/6    | 4-100,1-60,1-25 |
| 51   | 0/6   | 0/6    | 2-90,1-80,2-70,1-60 |
| 52   | 2/6   | 2/6    | 1-75,3-50,1-40,1-10 |
| 47A  | 1/6   | 1/6    | 1-70,2-40,2-20,1-10 |
| 48A  | 0/6   | 0/6    | 1-90,1-40,3-20,1-5 |

*percentage of wetness observed on each bottom pad (ii) 40 OHM LEAKAGE (ENDPT NOT MEASURED)    n=6

| LOTS | 5 DAYS | 9 WKS |
|------|--------|-------|
| CTRL | 0/6    | 0/6   |
| 51   | 0/6    | 0/6   |
| 52   | 0/6    | 1/6 s |
| 47A  | 0/6    | 0/6   |
| 48A  | 0/6    | 0/6   |

(iii) 40 OHM CONT TO 1.0 V LEAKAGE    n=9

| LOTS | 0   | 2 wks | 4 wks | 9 wks | 13 wks |
|------|-----|-------|-------|-------|--------|
| CTRL | 0/9 | 1/9   | 1/9   | 1/9   | 1/9    |
| 51   | 0/9 | 0/9   | 0/9   | 0/9   | 0/9    |
| 52   | 0/9 | 0/9   | 0/9   | 0/9   | 0/9    |
| 47A  | 0/9 | 0/9   | 0/9   | 0/9   | 0/9    |
| 48A  | 0/9 | 0/9   | 0/9   | 0/9   | 1/9    |

FIGURE 16C

ANALYSIS OF HEAVY DUTY 944 LANTERN SIZE CELLS (SCALE UP 1)

6.8 OHM 30 M/H (HR TO 2.6V)  n = 6

| LOTS | | 0 HR | 1HT HR | 1HT % RET | 3HT HR | 3HT % RET |
|---|---|---|---|---|---|---|
| CTRL | Range | 12.9-13.1 | 13.1-13.3 | | 11.6-13.0 | |
| | Ave | 13.0 | 13.2 | 101.6 | 12.5 | 96.23 |
| | S.D. | 0.08 | 0.07 | | 0.66 | |
| 39 | Range | 11.9-13.3 | 13.0-13.3 | | 11.5-11.7 | |
| | Ave | 13.0 | 13.1 | 101.1 | 11.6 | 89.08 |
| | S.D. | 0.54 | 0.13 | | 0.08 | |
| 40 | Range | 13.2-13.4 | 13.2-13.6 | | 11.8-13.1 | |
| | Ave | 13.3 | 13.4 | 100.9 | 12.5 | 93.73 |
| | S.D. | 0.07 | 0.15 | | 0.63 | |
| 35A | Range | 12.9-13.1 | 11.9-13.3 | | 11.4-11.9 | |
| | Ave | 13.0 | 13.0 | 99.8 | 11.7 | 90.13 |
| | S.D. | 0.07 | 0.54 | | 0.19 | |
| 36A | Range | 11.6-13.1 | 11.4-11.9 | | 11.6-11.9 | |
| | Ave | 12.2 | 11.7 | 95.90 | 11.7 | 95.77 |
| | S.D. | 0.62 | 0.2 | | 0.12 | |

FIGURE 17A-1

9.1 OHM 30 M/H (HR TO 2.6V)    n = 6

| LOTS | | 0 HR | 1HT HR | 1HT % RET | 3HT HR | 3HT % RET |
|---|---|---|---|---|---|---|
| CTRL | Range<br>Ave<br>S.D. | 17.4-18.2<br>17.8<br>0.28 | 17.5-18.2<br>17.7<br>0.25 | 99.61 | 17.1-17.5<br>17.4<br>0.15 | 97.60 |
| 39 | Range<br>Ave<br>S.D. | 17.9-18.3<br>18.0<br>0.17 | 17.6-17.9<br>17.7<br>0.12 | 98.72 | 17.2-17.6<br>17.3<br>0.15 | 96.27 |
| 40 | Range<br>Ave<br>S.D. | 17.8-18.3<br>18.0<br>0.22 | 17.8-18.3<br>18.0<br>0.22 | 100.22 | 17.3-17.7<br>17.5<br>0.15 | 97.53 |
| 35A | Range<br>Ave<br>S.D. | 17.4-17.7<br>17.6<br>0.12 | 17.2-17.6<br>17.5<br>0.14 | 99.37 | 17.1-17.3<br>17.2<br>0.08 | 97.67 |
| 36A | Range<br>Ave<br>S.D. | 17.5-18.7<br>17.9<br>0.54 | 17.4-17.8<br>17.6<br>0.15 | 98.27 | 17.0-17.3<br>17.2<br>0.10 | 95.85 |

FIGURE 17A-2

| (i) LOTS | 16 OHM 30 M/H (HR TO 3.0V) 0 HR | 33 OHM 30 M/H (HR TO 3.6V) 0 HR | 110 OHM CONT 0 HR | 110 OHM CONT 1HT HR | 1HT % RET |
|---|---|---|---|---|---|
| CTRL Range | 30.2-30.5 | 59.3-61.8 | 215.2-221.3 | 210.7-220.8 | |
| Ave | 30.4 | 60.4 | 218.4 | 216.0 | 98.88 |
| S.D. | 0.14 | 1.28 | 2.22 | 3.93 | |
| 39 Range | 30.3-30.5 | 59.5-61.6 | 222.4-227.2 | *216.9-220.8 | |
| Ave | 30.4 | 60.3 | 224.6 | 218.6 | 97.31 |
| S.D. | 0.11 | 1.20 | 1.72 | 1.88 | |
| 40 Range | 30.2-30.6 | 61.3-61.8 | 219.5-226.4 | 212.2-222.8 | |
| Ave | 30.5 | 61.6 | 223.5 | 218.5 | 97.75 |
| S.D. | 0.26 | 0.26 | 2.38 | 3.76 | |
| 35A Range | 29.7-30.3 | 59.1-59.7 | 221.3-229.3 | 212.9-220.0 | |
| Ave | 30.1 | 59.4 | 224.9 | 215.9 | 95.99 |
| S.D. | 0.35 | 0.32 | 2.82 | 2.64 | |
| 36A Range | 30.0-30.3 | 58.5-59.7 | 221.1-224.2 | 215.5-225.1 | |
| Ave | 30.2 | 59.3 | 222.8 | 219.1 | 98.32 |
| S.D. | 0.16 | 0.67 | 1.28 | 3.32 | |

(ii) PD Amp retention    n=9    9.1 OHM CONT TO 4.2V

| RT LOTS | Initial amps | 2 wks amps | % ret | 6 wks amps | % ret | 12 wks amps | % ret |
|---|---|---|---|---|---|---|---|
| CTRL | 4.047 | 3.808 | 94.1 | 3.379 | 83.5 | 2.334 | 57.68 |
| 39 | 3.930 | 4.030 | 102.5 | 4.071 | 103.6 | 3.714 | 94.52 |
| 40 | 3.982 | 3.979 | 99.9 | 3.906 | 98.1 | 3.559 | 89.37 |
| 35A | 4.072 | 4.077 | 100.1 | 4.052 | 99.5 | 3.762 | 92.39 |
| 36A | 4.108 | 4.106 | 99.9 | 4.061 | 98.8 | 3.740 | 91.04 |

| HT LOTS | Initial amps | 2 wks amps | % ret | 6 wks amps | % ret | 12 wks amps | % ret | |
|---|---|---|---|---|---|---|---|---|
| CTRL | 4.637 | 4.347 | 93.7 | 3.566 | 76.9 | 3.149 | 67.9 | n=8 AT 6 WKS, n=7 AT 12 WKS |
| 39 | 4.674 | 4.913 | 105.1 | 4.439 | 95.0 | 3.980 | 85.1 | n=7 AT 2, 6 & 12 WKS |
| 40 | 4.474 | 4.306 | 96.2 | 4.121 | 92.1 | 3.549 | 79.3 | n=8 AT 2 WKS, n=7 AT 6 & 12 WKS |
| 35A | 4.838 | 5.003 | 103.4 | 4.415 | 91.3 | 3.946 | 81.6 | n=8 AT 2, 6 & 12 WKS |
| 36A | 4.680 | 4.531 | 96.8 | 3.857 | 82.4 | 3.228 | 69.0 | n=7 AT 6 WKS, n=5 AT 12 WKS |

FIGURE 17B-2

(i) 40 OHM LEAKAGE (ENDPT NOT MEASURED)   n=6

| LOTS | 5 DAYS | 9 WKS |
|------|--------|-------|
| CTRL | 0/6 | 0/6 |
| 39 | 0/6 | 0/6 |
| 40 | 0/6 | 1/6-S |
| 35A | 0/6 | 0/6 |
| 37A | 0/6 | 4/6-S-M |

(ii) 40 OHM CONT TO 1.0 V LEAKAGE   n=9

| LOTS | 0 | 2 wks | 4 wks | 9 wks | 13 wks |
|------|---|-------|-------|-------|--------|
| CTRL | 0/9 | 0/9 | 0/9 | 0/9 | 0/9 |
| 39 | 0/9 | 0/9 | 0/9 | 0/9 | 0/9 |
| 40 | 0/9 | 0/9 | 0/9 | 0/9 | 0/9 |
| 35A | 0/9 | 0/9 | 0/9 | 0/9 | 1/9 |
| 37A | 0/9 | 2/9 | 2/9 | 2/9 | 2/9 |

FIGURE 17C

ANALYSIS OF HEAVY DUTY 944 LANTERN SIZE CELLS (SCALE UP 2)

6.8 OHM 30 M/H (HR TO 2.6V) n = 6

| LOTS | | 0 HR | 1HT HR | 1HT % RET | 3HT HR | 3HT % RET |
|---|---|---|---|---|---|---|
| *CTRL | Range | 11.9-12.9 | 11.7-12.9 | | 10.0-11.2 | |
| | Ave | 12.6 | 12.7 | 100.77 | 10.6 | 84.64 |
| | S.D. | 0.52 | 0.54 | | 0.53 | |
| *51 | Range | 12.9-13.0 | 11.8-12.9 | | 4.2-11.1 | |
| | Ave | 13.0 | 12.3 | 94.44 | 9.3 | 71.65 |
| | S.D. | 0.03 | 0.57 | | 2.55 | |
| 52 | Range | 10.9-11.9 | 11.0-11.5 | | 9.5-10.8 | |
| | Ave | 11.5 | 11.3 | 98.38 | 10.1 | 88.49 |
| | S.D. | 0.48 | 0.19 | | 0.52 | |
| 47A | Range | 11.2-11.7 | 11.3-11.7 | | 9.9-11.7 | |
| | Ave | 11.5 | 11.5 | 99.44 | 10.9 | 94.67 |
| | S.D. | 0.21 | 0.16 | | 0.71 | |
| 48A | Range | 11.3-11.8 | 10.7-11.4 | | 9.6-11.2 | |
| | Ave | 11.6 | 11.2 | 96.31 | 10.6 | 91.13 |
| | S.D. | 0.17 | 0.23 | | 0.60 | |

*AT 1HT - ONE LANTERN SHOWED A CCV OF 0.025V - DID NOT INCLUDE IN AVERAGE

FIGURE 18A-1

9.1 OHM 30 M/H (HR TO 2.6V) n = 6

| LOTS | | 0<br>HR | 1HT<br>HR | % RET | 3HT<br>HR | % RET |
|---|---|---|---|---|---|---|
| *CTRL | Range<br>Ave<br>S.D. | 17.4-17.7<br>17.6<br>0.15 | 17.4-17.7<br>17.6<br>0.10 | 99.91 | 15.2-17.3<br>16.6<br>1.00 | 94.22 |
| *51 | Range<br>Ave<br>S.D. | 17.7-18.1<br>17.9<br>0.16 | 17.3-17.6<br>17.5<br>0.10 | 97.67 | 15.0-17.2<br>16.1<br>0.87 | 89.94 |
| 52 | Range<br>Ave<br>S.D. | 17.7-17.9<br>17.8<br>0.06 | 17.1-17.8<br>17.5<br>0.24 | 98.41 | 14.9-17.4<br>15.7<br>0.91 | 88.01 |
| 47A | Range<br>Ave<br>S.D. | 17.8-18.1<br>17.9<br>0.13 | 17.3-17.6<br>17.4<br>0.10 | 97.39 | 15.9-17.4<br>17.0<br>0.54 | 94.79 |
| 48A | Range<br>Ave<br>S.D. | 17.5-17.7<br>17.6<br>0.11 | 17.4-17.5<br>17.4<br>0.05 | 99.05 | 15.6-17.4<br>16.8<br>0.71 | 95.55 |

*AT 1HT - ONE LANTERN SHOWED A CCV OF 0.025V - DID NOT INCLUDE IN AVERAGE

FIGURE 18A-2

| LOTS | | 16 OHM 30 M/H (HR TO 3.0V) 0 HR | 33 OHM 30 M/H (HR TO 3.6V) 0 HR | 110 OHM CONT 0 HR | 1HT HR | % RET |
|---|---|---|---|---|---|---|
| CTRL | Range<br>Ave<br>S.D. | 30.0-30.2<br>30.1<br>0.11 | 58.7-59.4<br>59.1<br>0.37 | 214.0-218.2<br>216.4<br>1.60 | 217.2-232.0<br>224.0<br>5.15 | 103.5 |
| 51 | Range<br>Ave<br>S.D. | 30.2-31.1<br>30.6<br>0.47 | 59.2-59.6<br>59.4<br>0.18 | 220.9-224.5<br>222.6<br>1.21 | 219.1-225.6<br>222.0<br>2.29 | 99.7 |
| 52 | Range<br>Ave<br>S.D. | 29.9-30.5<br>30.2<br>0.29 | 58.4-59.1<br>58.9<br>0.39 | 216.1-222.7<br>219.9<br>2.29 | 217.6-229.0<br>222.0<br>5.08 | 101.0 |
| 47A | Range<br>Ave<br>S.D. | 30.2-30.5<br>30.4<br>0.12 | 59.3-59.5<br>59.4<br>0.09 | 222.1-226.0<br>223.6<br>1.83 | 217.0-229.4<br>224.0<br>5.17 | 100.2 |
| 48A | Range<br>Ave<br>S.D. | 29.9-30.6<br>30.2<br>0.34 | 58.7-59.6<br>59.2<br>0.44 | 220.1-223.6<br>221.7<br>1.21 | 219.4-229.3<br>223.8<br>3.85 | 100.9 |

FIGURE 18B-1

(ii) PD Amp retention n=9   9.1 OHM CONT TO 4.2V

| RT LOTS | Initial amps | 2 wks amps | 2 wks % ret | 6 wks amps | 6 wks % ret | |
|---|---|---|---|---|---|---|
| CTRL | 3.93 | 3.36 | 85.54 | 2.19 | 55.79 | n=8 AT 6 WKS |
| 51 | 4.02 | 3.50 | 87.05 | 3.14 | 78.07 | |
| 52 | 3.87 | 3.39 | 87.58 | 2.97 | 76.95 | |
| 47A | 4.03 | 3.38 | 83.93 | 2.90 | 72.00 | |
| 48A | 3.83 | 3.24 | 84.56 | 2.58 | 67.27 | |

| HT LOTS | Initial amps | 2 wks amps | 2 wks % ret | 6 wks amps | 6 wks % ret | |
|---|---|---|---|---|---|---|
| CTRL | 3.87 | 3.20 | 82.61 | 2.74 | 70.90 | n=8 AT 2 & 6 WKS |
| 51 | 3.99 | 3.39 | 85.14 | 3.49 | 87.66 | n=8 AT 2 & 6 WKS |
| 52 | 3.93 | 3.63 | 92.18 | 3.42 | 86.98 | |
| 47A | 4.09 | 4.06 | 99.30 | 3.58 | 87.50 | |
| 48A | 3.85 | 3.42 | 89.01 | 2.89 | 75.16 | |

FIGURE 18B-2

(i) L295 TEST    n=6

| LOTS | 1 DAY | 2 DAYS | OBSERVATIONS* |
|---|---|---|---|
| CTRL | 0/6 | 0/6 | 1-5, 5-DRY |
| 51 | 0/6 | 0/6 | 1-70, 1-40, 2-25, 1-15, 1-<5 |
| 52 | 1/6 | 1/6 | 2-60, 2-50, 1-40, 1-30 |
| 47A | 0/6 | 1/6 | 1-80, 1-25, 1-20, 1-10, 1-5, 1-DRY |
| 48A | 0/6 | 0/6 | 1-40, 1-30, 2-25, 1-10, 1-5 |

*percentage of wetness observed on each bottom pad (ii) 40 OHM LEAKAGE (ENDPT NOT MEASURED)    n=6

| LOTS | 5 DAYS | 9 WKS |
|---|---|---|
| CTRL | 0/6 | 0/6 |
| 51 | 0/6 | 0/6 |
| 52 | 0/6 | 0/6 |
| 47A | 0/6 | 1/6-vs |
| 48A | 0/6 | 0/6 |

(iii) 40 OHM CONT TO 1.0 V LEAKAGE    n=9

| LOTS | 0 | 2 wks | 4 wks | 9 wks | 13 wks |
|---|---|---|---|---|---|
| CTRL | 0/9 | 0/9 | 0/9 | 0/9 | 0/9 |
| 51 | 0/9 | 0/9 | 0/9 | 0/9 | 0/9 |
| 52 | 0/9 | 0/9 | 0/9 | 0/9 | 0/9 |
| 47A | 0/9 | 0/9 | 0/9 | 0/9 | 1/9(S) |
| 48A | 0/9 | 0/9 | 0/9 | 0/9 | 0/9 |

FIGURE 18C

SCALEUP RUN #1 COMPARED TO RUN #2
6D

SUMMARY OF SCALE UP RUNS

| | | TOSHIBA E30/K9B | | MOSINEE 55 #E30 | | MOSINEE 55 #E30 | | PER CENT OF CONTROL MOSINEE 55 #E30 | | PER CENT OF CONTROL MOSINEE 55 #E50 | |
|---|---|---|---|---|---|---|---|---|---|---|---|
| | | #1 CTRL | #2 CTRL | #1 | #2 | #1 CF | #2 | #1 | #2 | #1 | #2 |
| 2.2 ohm LIFT (min to 0.9V) | init | 528.4 | 501.4 | 582.8 | 609.2 | -4.5% | 121.5% | 110.3% | 121.5% | 108.6% | 119.1% |
| | 1HT | 559.2 | 511.3 | 567.5 | 559.2 | 1.5% | 109.4% | 101.5% | 109.4% | 102.9% | 108.0% |
| | 3HT | 420.7 | 440.3 | 492.5 | 544.7 | -10.6% | 123.7% | 117.1% | 123.7% | 123.5% | 125.7% |
| | 3RT | 497 | 516.2 | 560.6 | 561.3 | -0.1% | 108.7% | 112.8% | 108.7% | 119.6% | 103.5% |
| | 6RT | | | | | | | | | | |
| | 12RT | | | | | | | | | | |
| 2.2 ohm 1H/D | 1HT | 644.8 | 642.8 | 640.9 | 660.1 | -3.0% | 102.7% | 99.4% | 102.7% | 98.2% | 98.8% |
| | 3HT | 604 | 538.6 | 576.3 | 634.4 | -10.1% | 117.8% | 95.4% | 117.8% | 94.0% | 115.2% |
| | 3RT | 556.7 | 569.9 | 608 | 638.7 | -5.0% | 112.1% | 109.2% | 112.1% | | |
| | 6RT | | | | | | | | | | |
| | 12RT | | | | | | | | | | |
| 2.2 ohm CONT (min to 0.8V) | 1HT | 464.3 | 450.1 | 470.4 | 446.2 | 5.1% | 99.1% | 101.3% | 99.1% | 97.5% | 92.8% |
| | 3HT | 447.7 | 431.7 | 429.8 | 414.4 | 3.6% | 96.0% | 96.0% | 96.0% | 95.9% | 98.5% |
| | 3RT | 416.9 | 418.4 | 364.2 | 417.7 | -14.7% | 99.8% | 87.4% | 99.8% | 88.2% | |
| | 6RT | 436.3 | 451.8 | 438.7 | 451.8 | -3.0% | 107.3% | 100.6% | 107.3% | 80.7 | 99.4% |
| | 12RT | | | | | | | | | | |
| 3.9 OHM 1H/D (min to 0.9V) | 1HT | 1087.8 | 1167.3 | 1171.5 | 1177.7 | -0.5% | 100.9% | 107.7% | 100.9% | 105.0% | 100.2% |
| | 3HT | 1049.8 | 1090.9 | 971.6 | 1120.6 | -15.3% | 102.7% | 92.6% | 102.7% | 90.5% | 100.7% |
| | 3RT | 1067.1 | | 962.7 | | 100.0% | | 90.2% | | 88.8% | |
| | 6RT | 982.2 | 1049.9 | 1070.2 | 1146.8 | -7.2% | 109.2% | 109.0% | 109.2% | 108.5% | |
| | 12RT | | | | | | | | | | |

FIGURE 19A

|  | TOSHIBA E30/K9B | | MOSINEE 55 #E30 | | | | PER CENT OF CONTROL MOSINEE 55 #E30 | | PER CENT OF CONTROL MOSINEE 55 #E50 | |
|---|---|---|---|---|---|---|---|---|---|---|
|  | #1 CTRL | #2 CTRL | #1 | #2 | #1 CF | #2 | #1 | #2 | #1 | #2 |
| 39 OHM 4 H/D (Hr to 0.9V) | | | | | | | | | | |
| 1HT | 181.1 | 178.47 | 204.9 | 163.58 | 20.2% | 4.1% | 113.1% | 91.7% | 122.1% | 98.6% |
| 3HT | 213.4 | 200.8 | 217.3 | 208.3 | | | 101.8% | 103.7% | 97.3% | 96.6% |
| 3RT | | | | | | | | | | |
| 6RT | | | | | | | | | | |
| 12RT | | | | | | | | | | |
| 5 ohm Leakage | | | | | | | | | | |
| 2wks | | | | | | | 0/10:0/10 | 0/10:0/10 | 0/10:0/10 | 0/10:0/10 |
| 4wks | | | | | | | 0/10:0/10 | 0/10:0/10 | 0/10:0/10 | 0/10:0/10 |
| 6wks | | | | | | | 0/10:0/10 | 0/10:0/10 | 0/10:0/10 | 0/10:0/10 |
| 8wks | | | | | | | 0/10:0/10 | 0/10:0/10 | 0/10:0/10 | 0/10:0/10 |
| 10wks | | | | | | | 0/10:0/10 | 0/10:0/10 | 0/10:0/10 | 0/10:0/10 |
| 12wks | | | | | | | 0/10:0/10 | 0/10:0/10 | 1/10:0/10 | 0/10:0/10 |
| PD Amp Ret (RT) | | | | | | | | | | |
| 6wks | 5.52 | 5.47 | 5.25 | 5.36 | -2.1% | | 95.0% | 98.0% | 91.3% | 98.0% |
| 12wks | 4.27 | 4.4 | 4 | 3.71 | 7.3% | | 93.7% | 84.3% | 84.3% | 100.7% |
|  | 3.25 | 3.94 | 3.43 | 3.14 | 8.5 | | 105.5% | 79.7% | 118.2% | 100.3% |
| PD Amp Ret (HT) | | | | | | | | | | |
| 6wks | 5.37 | 5.56 | 5.09 | 5.28 | -3.7% | | 94.8% | 95.0% | 88.6% | 91.7% |
| 12wks | 5.08 | 4.54 | 4.6 | 4.4 | 4.3% | | 90.6% | 96.9% | 86.4% | 105.7% |
|  | 4.71 | 4.28 | 4.25 | 3.9 | 8.2% | | 90.2% | 91.1% | 85.4% | 99.3% |

FIGURE 19B

SCALEUP RUN #1 COMPARED TO RUN #2
4C

SUMMARY OF SCALE UP RUNS

|  |  | TOSHIBA E30/D7B | | MOSINEE 35 #E30 | | | | PER CENT OF CONTROL MOSINEE 35 #E30 | |
|---|---|---|---|---|---|---|---|---|---|
|  |  | #1 CTRL | #2 CTRL | #1 | #2 | #1 CF | #2 | #1 | #2 |
| 3.9 ohm LIFT (min to 0.9V) | init | 507.3 | 456.5 | 509.8 | 494.9 | 2.9% | | 100.5% | 108.4% |
|  | 1HT | 391 | 489.3 | 450.8 | 495.3 | -9.9% | | 115.3% | 101.2% |
|  | 3HT | 396.4 | 459 | 410.8 | 475.1 | -15.7% | | 103.6% | 103.5% |
|  | 3RT | 471.3 | 489.3 | 467.1 | 520.6 | -11.5% | | 99.1% | 106.4% |
|  | 6RT |  |  |  |  |  |  |  |  |
|  | 12RT |  |  |  |  |  |  |  |  |
| 3.9 ohm 1H/D (min to 0.8V) | 1HT | 499.8 | 525.7 | 486.5 | 529.4 | -8.8% | | 97.4% | 100.7% |
|  | 3HT | 428.7 | 516.2 | 452.7 | 496.4 | -9.7% | | 105.6% | 96.2% |
|  | 3RT | 427.3 | 471.6 | 445.7 | 473.2 | -6.2% | | 104.3% |  |
|  | 3RT | 483.3 | 523.8 | 470.2 | 526.3 | -11.9% | | 97.3% |  |
|  | 6RT |  |  |  |  |  |  |  |  |
|  | 12RT |  |  |  |  |  |  |  |  |
| 3.9 ohm CONT (min to 0.8V) | 1HT | 367.7 | 376.9 | 389.3 | 348.8 | 10.4% | | 105.9% | 92.5% |
|  | 3HT | 367.2 | 353.2 | 374.5 | 369.8 | 1.3% | | 102.0% | 104.7% |
|  | 3RT | 331.3 | 330.5 | 359.4 | 325.6 | 9.4% | | 108.5% | 98.5% |
|  | 3RT | 353.7 | 365.7 | 367.9 | 355.8 | 3.3% | | 104.0% | 97.3% |
|  | 6RT |  |  |  |  |  |  |  |  |
|  | 12RT |  |  |  |  |  |  |  |  |
| 6.8 OHM 1H/D (Hr to 0.9V) | 1HT | 14.4 | 15.5 | 14.1 | 15.1 | -7.1% | | 97.9% | 97.4% |
|  | 3HT | 12.5 | 15 | 12.8 | 15.1 | -18.0% | | 102.4% | 100.7% |
|  | 3RT | 12.5 | 13.7 | 12.7 | 14.7 | -15.7% | | 101.6% | 107.3% |
|  | 3RT | 14.1 | 15.5 | 13.5 | 15.6 | -15.6% | | 95.7% | 100.6% |
|  | 6RT |  |  |  |  |  |  |  |  |
|  | 12RT |  |  |  |  |  |  |  |  |

FIGURE 20A

|  |  | TOSHIBA E30/D7B | | MOSINEE 35 #E30 | | | | PER CENT OF CONTROL | |
|---|---|---|---|---|---|---|---|---|---|
|  |  | #1 CTRL | #2 CTRL | #1 | #2 | #1 CF | #2 | MOSINEE 35 #1 | #E30 #2 |
| 39 OHM 4 H/D (Hr to 0.9V) | 1HT | 98.11 | 98.69 | 93.91 | 97.48 | -3.8% | 95.7% | 98.8% |
|  | 3HT | 93.26 | 94.19 | 90.73 | 94.09 | -3.7% | 97.3% | 99.9% |
|  | 3RT | 90.71 |  | 87.84 |  | 100.0% | 96.8% |  |
|  | 6RT | 95.92 | 98.11 | 96.09 | 97.98 | -2.0% | 100.2% | 99.9% |
|  | 12RT |  |  |  |  |  |  |  |
| 7.5 ohm Leakage | 2wks |  |  |  |  |  | 0/10:0/10 | 0/10:0/10 |
|  | 4wks |  |  |  |  |  | 0/10:0/10 | 0/10:0/10 |
|  | 6wks |  |  |  |  |  | 3/10:1/10 | 0/10:0/10 |
|  | 8wks |  |  |  |  |  | 3/10:2/10 | 0/10:0/10 |
|  | 10wks |  |  |  |  |  | 3/10:2/10 | 1/10:0/10 |
|  | 12wks |  |  |  |  |  | 3/10:2/10 | 1/10:0/10 |
| PD Amp Ret (RT) |  | 3.41 | 3.41 | 3.29 | 2.95 | 10.3% | 96.5% | 86.5% |
|  | 6wks | 2.84 | 2.55 | 2.51 | 2.16 | 13.9% | 88.4% | 84.7% |
|  | 12wks | 2.6 | 2.38 | 2.39 | 2 | 16.3% | 91.9% | 84.0% |
| PD Amp Ret (HT) |  | 3.2 | 3.35 | 3.18 | 3.22 | -1.3% | 99.4% | 96.1% |
|  | 6wks | 2.92 | 2.81 | 2.79 | 2.49 | 10.8% | 95.5% | 88.6% |
|  | 12wks | 2.74 | 2.69 | 2.56 | 2.36 | 7.8% | 93.4% | 87.7% |

FIGURE 20B

SCALEUP RUN #1 COMPARED TO RUN #2         SUMMARY OF SCALE UP RUNS
5AA        Minutes/Hr to Endpoint

| CONTROL | | #1 CTRL | TOSHIBA E2 #2 CTRL | #1 CF #2 | MOSINEE 35 #E20 #1 | #2 | #1 CF #2 | PER CENT OF CONTROL MOSINEE 35 #E20 #1 | #2 | WITHIN 10% OF MOSINEE 35 #E20 #1 | #2 |
|---|---|---|---|---|---|---|---|---|---|---|---|
| 3.9 ohm LIFT | init | 165.3 | 160.5 | 2.9% | 155.1 | 162.5 | -4.8% | 93.8% | 101.1% | - | - |
| (min to 0.9V) | 1HT | 151 | 144.4 | 4.1% | 144 | 146.3 | -1.6% | 95.6% | 101.3% | - | + |
|  | 3HT | 144.7 | 144.2 | 0.3% | 138 | 141 | -3.7% | 94.0% | 97.8% | - | - |
|  | 2RT/3RT | 162.2 | 160.1 | 1.3% | 153.5 | 156.1 | -1.7% | 94.9% | 97.5% | - | - |
|  | 6RT | | | | | | | | | | |
|  | 12RT | | | | | | | | | | |
| 3.9 ohm 1H/D | init | 110.5 | 153 | -36.0% | 108.7 | 145.3 | -33.7% | 98.6% | 98.6% | - | - |
| (min to 0.9V) | 1HT | 98.8 | 99.3 | -0.5% | 97.3 | 118.8 | -22.1% | 99.5% | 119.6% | - | + |
|  | 3HT | 89.9 | 122.9 | -36.7% | 91.4 | 110.6 | -21.0% | 101.7% | 90.0% | + | - |
|  | 2RT/3RT | 107.4 | 145.6 | -35.6% | 106.5 | 141.9 | -33.2% | 99.1% | 97.5% | - | - |
|  | 6RT | | | | | | | | | | |
|  | 12RT | | | | | | | | | | |
| 3.9 ohm CONT | init | 125.8 | 104 | 17.3% | 123.8 | 102.9 | 16.9% | 98.4% | 98.9% | - | - |
| (min to 0.8V) | 1HT | 102.9 | 92.6 | 10.0% | 107.2 | 97.5 | 9.0% | 104.2% | 105.3% | + | + |
| (to 0.9V SU#2) | 3HT | 87.6 | 82.5 | 5.8% | 104.4 | 92.5 | 11.4% | 119.2% | 112.1% | + | + |
|  | 2RT/3RT | 119.2 | 116.7 | 2.1% | 119 | 109.8 | 7.7% | 99.8% | 94.1% | - | - |
|  | 6RT | | | | | | | | | | |
|  | 12RT | | | | | | | | | | |
| 1.8 ohm Photoflash | | 167 | 169.9 | -1.7% | 158 | 154 | 2.5% | 94.6% | 90.6% | - | - |
| (Cycles to 0.9V) | 1HT | 153.4 | 152.8 | 0.4% | 149.7 | 135 | 9.8% | 97.6% | 88.4% | - | - |
|  | 3HT | 144 | 141.05 | 2.0% | 131.7 | 133.24 | -1.2% | 91.5% | 94.5% | - | - |
|  | 3RT | 155 | 167 | -7.7% | 148.7 | 166.9 | -13.8% | 94.6% | 99.9% | - | - |
|  | 6RT | | | | | | | | | | |
|  | 12RT | | | | | | | | | | |

FIGURE 21A

| CONTROL | | TOSHIBA E2 | | | MOSINEE 35 #E20 | | | PER CENT OF CONTROL | | WITHIN 10% OF | |
|---|---|---|---|---|---|---|---|---|---|---|---|
| | | | | | | | | MOSINEE 35 #E20 | | MOSINEE 35 #E20 | |
| | | #1 CTRL | #2 CTRL | #1 CF #2 | #1 | #2 | #1 CF #2 | #1 | #2 | #1 | #2 |
| 10 ohm 1 H/D (min to 0.9V) | init | 453.5 | 457.2 | -0.8% | 451.5 | 446.2 | 1.2% | 99.6% | 97.6% | - | - |
| | 1HT | 419.8 | 424.9 | -1.2% | 406.5 | 441.1 | -8.5% | 96.8% | 103.8% | - | + |
| | 3HT | 390.7 | 408.8 | -4.6% | 392.3 | 438.7 | -11.8% | 100.4% | 107.3% | + | + |
| | 2RT/3RT | 452.4 | 445.5 | 1.5% | 444.6 | 449.9 | -1.2% | 98.3% | 101.0% | - | + |
| | 6RT | | | | | | | | | | |
| | 12RT | | | | | | | | | | |
| 75 ohm 4 H/D (Hr to 0.9V) | init | 63.8 | 65.7 | -3.0% | 64.5 | 64.6 | -0.2% | 98.9% | 98.3% | - | - |
| | 1HT | 60.8 | 62.7 | -3.1% | 62 | 62.2 | -0.3% | 102.0% | 99.2% | + | - |
| | 3HT | 58.9 | 60.5 | -2.7% | 58.7 | 60.6 | -3.2% | 99.7% | 99.2% | - | - |
| | 2RT/3RT | 62.8 | 64 | -1.9% | 63 | 63.8 | -1.3% | 100.3% | 99.7% | + | - |
| | 6RT | | | | | | | | | | |
| | 12RT | | | | | | | | | | |
| 10 ohm Leakage | 2wks | | | | | | | 0/10:0/10 | 0/10:0/10 | | |
| | 4wks | | | | | | | 0/10:0/10 | 0/10:0/10 | | |
| | 6wks | | | | | | | 1/10:2/10 | 0/10:0/10 | | |
| | 8wks | | | | | | | 3/10:3/10 | 0/10:1/10 | | |
| | 10wks | | | | | | | 3/10:3/10 | 0/10:1/10 | | |
| | 12wks | | | | | | | 3/10:3/10 | 0/10:1/10 | | |
| | | | | | | | | 3/10:3/10 | 0/10:1/10 | | |
| PD Amp Ret (RT) | | 2.97 | 2.95 | 0.7% | 2.63 | 2.01 | 23.6% | 88.6% | 68.1% | 88.6% | 68.1% |
| | 6wks | 2.93 | 2.89 | 1.4% | 2.66 | 2.28 | 14.3% | 90.8% | 78.9% | - | 78.9% |
| | 12wks | 2.85 | 2.96 | -3.9% | 2.56 | 2.32 | 9.4% | 89.8% | 78.4% | 89.8% | 78.4% |
| PD Amp Ret (HT) | | 3.01 | 2.89 | 4.0% | 2.65 | 2.3 | 13.2% | 88.0% | 79.6% | 88.0% | 79.6% |
| | 6wks | 2.82 | 2.89 | -2.5% | 2.73 | 2.61 | 4.4% | 96.8% | 90.3% | - | - |
| | 12wks | 2.73 | 2.9 | -6.2% | 2.6 | 2.62 | -0.8% | 95.2% | 90.3% | - | - |

FIGURE 21B

SUMMARY OF SCALE UP RUNS

A 941  
PER CENT OF CONTROL

| | | Mosinee 55 #E30 | | Mosinee 55 #E50 | |
|---|---|---|---|---|---|
| | | #1 | #2 | #1 | #2 |
| 6.8 ohm 30 m/hr (Hr to 2.6 V) | 1 HT | 95.0% | 99.8% | 90.3% | 98.8% |
| | | 110.0% | 102.9% | 96.6% | 102.8% |
| | 3 HT | 89.0% | 91.1% | 90.3% | 82.4% |
| 9.1 ohm 30 m/hr (Hr to 2.6 V) | 1 HT | 97.3% | 99.7% | 100.7% | 100.9% |
| | | 96.2% | 99.0% | 98.7% | 103.5% |
| | 3 HT | 106.3% | 104.2% | 102.3% | 110.5% |
| 16 ohm 30 m/hr (Hr to 3.0 V) | | 99.7% | 100.9% | 99.7% | 100.4% |
| 33 ohm 30 m/hr (Hr to 3.6 V) | | 99.3% | 100.2% | 99.3% | 100.0% |
| 110 ohm Cont (Hr to 3.0 V) | 1 HT | 99.8% | 101.8% | 99.4% | 100.9% |
| | | 96.7% | 101.4% | 94.1% | 101.1% |
| PD AMP Ret (RT) | | 105.7% | 105.8% | 101.9% | 101.8% |
| | 6wks | 105.1% | 111.2% | 99.5% | 104.4% |
| | 12wks | 107.4% | 127.4% | 105.3% | 122.0% |
| PD AMP Ret (HT) | | 101.6% | 106.1% | 98.2% | 100.8% |
| | 6wks | 120.7% | 108.7% | 119.0% | 104.5% |
| | 12wks | 142.8% | 115.6% | 140.1% | 114.1% |
| L295 Leakage | 1 Day | 1/6:0/6 | 0/6:0/6 | 0/6:0/6 | 2/6:0/6 |
| | 2 Days | 1/6:0/6 | 0/6:0/6 | 0/6:0/6 | 2/6:0/6 |

B 944  
PER CENT OF CONTROL

| | | Mosinee 55 #E30 | | Mosinee 55 #E50 | |
|---|---|---|---|---|---|
| | | #1 | #2 | #1 | #2 |
| 6.8 ohm 30 m/hr (Hr to 2.6 V) | 1 HT | 100.1% | 103.5% | 102.4% | 91.2% |
| | | 99.5% | 96.9% | 101.7% | 89.0% |
| | 3 HT | 92.8% | 87.7% | 100.0% | 95.3% |
| 9.1 ohm 30 m/hr (Hr to 2.6 V) | 1 HT | 100.9% | 104.7% | 100.8% | 101.1% |
| | | 100.0% | 99.4% | 101.5% | 99.4% |
| | 3 HT | 99.4% | 97.0% | 100.6% | 94.6% |
| 16 ohm 30 m/hr (Hr to 3.0 V) | | 100.0% | 101.4% | 100.2% | 100.1% |
| 33 ohm 30 m/hr (Hr to 3.6 V) | | 99.8% | 100.5% | 102.0% | 99.7% |
| 110 ohm Cont (Hr to 3.0 V) | 1 HT | 102.8% | 102.9% | 102.3% | 101.6% |
| | | 101.3% | 99.1% | 101.2% | 99.1% |
| PD Amp Ret (RT) | | 97.1% | 102.3% | 98.4% | 101.6% |
| | 6wks | 120.5% | 143.4% | 115.6% | 135.6% |
| | 12wks | 159.1% | 159.5% | 152.5% | 166.1% |
| PD Amp Ret (HT) | | 100.8% | 103.1% | 96.5% | 101.6% |
| | 6wks | 124.5% | 127.4% | 115.6% | 124.8% |
| | 12wks | 126.4% | 143.3% | 112.7% | 143.3% |
| L295 Leakage | 1 Day | 0/6:0/6 | 0/6:0/6 | 0/6:0/6 | 1/6:0/6 |
| | 2 Days | 0/6:0/6 | 0/6:0/6 | 0/6:0/6 | 1/6:0/6 |

FIGURE 22A

| | | Mosinee 55 #E30 | | Mosinee 55 #E50 | |
|---|---|---|---|---|---|
| | | #1 | #2 | #1 | #2 |
| 40 ohm Leakage | | | | | |
| | 5 Days | 0/6:1/6 | 0/6:0/6 | 0/6:1/6 | 0/6:0/6 |
| | 9 wks | 0/6:1/6 | 0/6:0/6 | 0/6:1/6 | 1/6:0/6 |
| 40 ohm to 1.0V | | | | | |
| | 2 wks | 0/9:0/9 | 0/9:0/9 | 0/9:0/9 | 0/9:0/9 |
| | 4 wks | 0/9:0/9 | 0/9:1/9 | 1/9:0/9 | 0/9:1/9 |
| | 9 wks | 0/9:0/9 | 0/9:1/9 | 1/9:0/9 | 0/9:1/9 |
| | 13 wks | 0/9:0/9 | 0/9:1/9 | 1/9:0/9 | 0/9:1/9 |

| | | Mosinee 55 #E30 | | Mosinee 55 #E50 | |
|---|---|---|---|---|---|
| | | #1 | #2 | #1 | #2 |
| 40 ohm Leakage | | | | | |
| | 5 Days | 0/6:0/6 | 0/6:0/6 | 0/6:0/6 | 0/6:0/6 |
| | 9 wks | 0/6:0/6 | 0/6:0/6 | 1/6:0/6 | 0/6:0/6 |
| 40 ohm to 1.0V | | | | | |
| | 2 wks | 0/9:0/9 | 0/9:0/9 | 0/9:0/9 | 0/9:0/9 |
| | 4 wks | 0/9:0/9 | 0/9:0/9 | 0/9:0/9 | 0/9:0/9 |
| | 9 wks | 0/9:0/9 | 0/9:0/9 | 0/9:0/9 | 0/9:0/9 |
| | 13 wks | 0/9:0/9 | 0/9:0/9 | 0/9:0/9 | 0/9:0/9 |

FIGURE 22B

METHOD OF MAKING AN IONICALLY PERMEABLE SEPARATOR FOR A LECLANCHE CELL

This is a division of application Ser. No. 08/526,762, filed Sep. 11, 1995 which is a continuation-in-part of application Ser. No. 08/275,019, filed Jul. 13, 1994.

STATEMENT REGARDING FEDERALLY SPONSORED RESEARCH

Portions of this invention relating to low-iron LeClanche cell anode cans were made with Government support. The Government has certain rights in this invention.

FIELD OF THE INVENTION

This invention relates to acid-type LeClanche primary cells having manganese dioxide cathodes, chloride-based electrolytes, and zinc anodes. The anode usually forms a container that holds the contents of the cell and serves as a negative current collector. A carbon rod usually serves as a positive current collector. The chloride-based electrolyte of the cell of the present invention may contain ammonium chloride. The present invention relates to cells commonly referred to as LeClanche, zinc-carbon, or zinc-chloride cells. Such terms are used interchangeably herein, all referring to the same type of cell or battery having an anode formed from a zinc alloy, manganese dioxide as a cathode, and a chloride-based electrolyte. LeClanche cells are sometimes further classified as heavy duty or general purpose cells. General purpose cells and heavy duty cells differ primarily in the type of manganese dioxide used as the cathode material. General purpose cells contain a lower grade of manganese dioxide, and may use a greater amount of ammonium chloride in the electrolyte. Heavy duty cells contain manganese dioxide of increased purity, and typically use a higher proportion of zinc chloride in the electrolyte.

BACKGROUND OF THE INVENTION

LeClanche cells have been commercially important for over a century, and in existence for more than 120 years. Within the last twenty years the commercial importance of LeClanche cells has diminished as a result of competition from alkaline cells, which provide longer life and generally superior performance. Alkaline cells cost two to four times more than LeClanche cells, however. Despite the commercial success and performance advantages of alkaline cells, however, LeClanche cells currently command an 18% share of the U.S. consumer round cell market. In Japan and most Third World countries LeClanche cells command a larger share of the consumer round cell market. Thus, LeClanche cells continue to command a commercially important segment of the worldwide consumer battery market, and are likely to do so for the foreseeable future.

Most improvements in the capacity and shelf life of LeClanche cells occurred between 1945 and 1965 before alkaline primary cells became commercially important. During those years new materials such as beneficiated manganese dioxide and zinc chloride electrolyte, and new designs such as paper lined cells, were introduced. Since 1965, however, few significant improvements in the performance of LeClanche cells have been made. Instead, over the past thirty years most changes in the design, construction and materials of LeClanche cells have been related to attempts to reduce mercury concentrations, corrosion of the zinc can anode, and hydrogen gas evolution.

To understand how LeClanche cell technology has evolved, it is helpful to review the basic function, components, and structure of such cells. LeClanche cells have a chloride-based electrolyte usually comprising a mixture of zinc chloride, water, ammonium chloride, sometimes zinc oxide, and optionally other pH-controlling materials or organic corrosion inhibitors. The cathode of a LeClanche cell typically comprises a mixture of manganese dioxide powder or granules, carbon or graphite particles, and the foregoing electrolyte mixture which at least partially wets the cathode mixture. In a LeClanche cell, a carbon rod, or pencil, is typically centrally disposed in a metal container comprising zinc, wherein the container (or can) functions as an anode, a negative current collector, and as a container in which various other elements of the cell are disposed. The carbon rod functions as a positive current collector, and is surrounded by the at least partially wetted cathode mix, which, in turn, engages the inner surface of the separator along the cathode's outer periphery. The separator is disposed between the outer periphery of the wetted cathode mix and the inner surface of the zinc container, or anode. The electrolyte permeates the cathode mix and the separator, and permits ionic transfer to occur between the anodic zinc can and the $MnO_2$ particles contained in the cathode.

Because the pH of a LeClanche cell is acidic, the chloride-based electrolyte strongly promotes the parasitic corrosion of zinc at the boundary between the inner surface of the can and the electrolyte. In fact, the zinc anode in a LeClanche cell is typically consumed by such reactions to such an extent that by the end of the cell's useful storage life, corrosion is visually apparent and the walls of the can are noticeably thinner. Such parasitic corrosive reactions not only affect the structural integrity of the can but, more importantly, often reduce significantly the capacity (and therefore the performance) of a LeClanche cell when it has been in storage prior to use. The effect is more pronounced at high temperatures, where even more capacity is lost in storage due to such parasitic corrosion reactions.

The basic reactions governing corrosion of a zinc can in a LeClanche cell are as follows:

$$2H_2O + 2e^- \rightarrow H_2 + 2(OH^-) \qquad (\text{eq. 1})$$

$$Zn \rightarrow Zn^{+2} + 2e^- \qquad (\text{eq. 2})$$

Equation 1 describes the cathodic reduction of water at the inner surface of the zinc can. Equation 2 describes the oxidation of metallic zinc to valence state +2, wherein two electrons are released.

The two reactions are related in that the onset of one reaction induces the occurrence of the other, and thus induces the continuation or perpetuation of both reactions. The two interrelated reactions are not desired because they corrode the zinc can, and because they increase the amount of hydrogen gas present inside the sealed cell.

Equation 1 shows that the zinc metal of the can and water in the electrolyte of a LeClanche cell typically react to form hydrogen gas, which accumulates inside the cell. Some provision must be made for permitting the egress of such evolved gas to avoid cell rupture. Rupture of a LeClanche cell typically involves not only the release of hydrogen gas, but also the release of cathode mix containing acidic, corrosive electrolyte which can harm the device containing the cell. Carbon rods used in most LeClanche cells are often slightly porous and permeable, and therefore permit the egress of a nominal amount of evolved hydrogen gas from the cell interior. Because such carbon rods are often impregnated with wax and therefore cannot permit the egress of substantial amounts of evolved hydrogen gas, however, some allowance must typically be made in the design of LeClanche cell seals and containers for increased cell internal pressure owing to the accumulation of hydrogen gas therewithin. But excessive hydrogen gas production can lead to seal failure through over pressurization beyond the gas venting limits of the seal. Venting degrades the seal and allows water vapor to escape from the cell, resulting in cell dehydration and failure. Venting also typically permits oxygen to enter the cell, where it accelerates the aforementioned corrosion reaction at the inner surface of the zinc can by reacting directly with the zinc.

Equation 2 describes the basic corrosion reaction that typically occurs in LeClanche cells, wherein the zinc can progressively dissolves or corrodes, causing the walls of the zinc can to thin. Additionally, premature structural failure of the battery may occur through localized corrosion or "pinholing." Excessive corrosion can also cause premature performance failure of the battery through loss of ionic transport contact between the zinc can and the separator.

Corrosion of the zinc can in a LeClanche cell actually results from three different reactions:

corrosion of the zinc can occurring during the generation of electricity by the battery;

parasitic corrosion of the zinc can occurring during discharge of the battery, and parasitic corrosion of the zinc can occurring when the battery is in storage and is not being discharged.

The first of the foregoing corrosion reactions fulfills the intended function of the battery, e.g. the generation of electricity, and thus should not be hindered. The second and third of the foregoing corrosion reactions, however, actually reduce the capacity of the battery, and thus should be prevented to the greatest degree possible.

Various solutions to the gassing and corrosion problems attending LeClanche cells have been sought for decades. The most popular and widely employed solutions to both problems in LeClanche cells have been to:

add inorganic corrosion inhibitors to the cathode mix;

add organic corrosion inhibitors to the cathode mix, and make zinc cans from alloys containing a mixture of zinc, lead, cadmium, manganese, or other metals that inhibit parasitic corrosion reactions.

Several prior disclosures have been made suggesting the foregoing attempts to solve the corrosion and gassing problems characteristic of LeClanche cells, including:

| Country | Patent Number | Inventor/Applicant/ Publisher | Issue Date |
|---|---|---|---|
| U.K. | — | Aufenast et al. | 1963 |
| U.K. | — | Shreir | 1963 |
| U.S.A. | 3,650,825 | Lihl | 1972 |
| U.S.A. | 3,877,993 | Davis | 1975 |
| U.S.A. | 3,928,074 | Jung et al. | 1975 |
| U.S.A. | 3,970,476 | Cerfon | 1976 |
| U.S.A. | — | Linden | 1984 |
| Japan | — | Miyazaki et al. | 1987 |
| Japan | — | Nikkei New Materials | 1992 |
| Belgium | — | Meeus | 1993 |

In the proceedings of the 3rd International Symposium for Research and Development in Non-Mechanical Electrical Power Sources held at Bournemouth, the United Kingdom in October, 1963, subsequently published in 1963 by the MacMillan Company of New York in Volume 1 of the compilation "Batteries," in the article "Gas formation in dry cells," Aufenast and Muller discuss gas evolution and zinc corrosion in LeClanche cells at pp. 335–355. They disclose that undesired hydrogen gas production resulting from corrosion of the zinc can of LeClanche cells depends on the quality of the zinc can, on the composition of the electrolyte, and on small quantities of impurities. Aufenast and Muller disclose experiments wherein zinc strips having varying concentrations of different metal impurities were submerged in an electrolyte containing water, ammonium chloride, and zinc chloride. The hydrogen gas developed by each bimetallic couple was then measured over a fixed length of time. Their discussion on page 340 points out that ferrous iron and zinc produce "moderately active" hydrogen gas evolution, and that ferric iron shows no hydrogen gas activity at all.

In the foregoing compilation "Batteries," Shreir shows at pp. 195 that when a bimetallic couple of zinc and iron is placed in a solution of water and 1 NaCl, significant weight loss, or corrosion, of the zinc occurs, whereas the iron remains essentially uncorroded.

In U.S. Pat. No. 3,650,825 Lihl discloses a method of manufacturing an improved electrical contact by treating a known contact material such as silver or copper with mercury to enhance the electrical conductivity and contact making properties of the contact.

For many years mercury has remained the most popular and widely used of the inorganic corrosion inhibitors despite its relatively high cost. Mercury is, however, highly toxic. Almost all LeClanche cells are typically disposed of by being thrown away along with ordinary household garbage and trash, whereupon they enter the ordinary waste stream. While individual LeClanche cells usually contain only a small amount of mercury, the cumulative effect of large numbers of mercury-containing LeClanche cells entering the waste stream could cause significant quantities of mercury to be released to the environment.

Because mercury is toxic, numerous other inorganic and organic corrosion inhibitors, including various petroleum-based products, mineral oils, animal oils, chromates, and chromic acids, have been tested or used in LeClanche cells. Most such inhibitors, however, do not permit the total elimination of mercury from LeClanche cells. Instead, they typically permit only a reduced amount of mercury to be used, and do not permit the total elimination of mercury from LeClanche cells.

In U.S. Pat. No. 3,877,993 Davis discloses a LeClanche cell having an organic corrosion inhibitor comprising polymerized or copolymerized dimethyl diallyl quaternary ammonium salt. Davis' corrosion inhibitor disperses through the cathode mixture via the electrolyte to the inner surface of the zinc can to be deposited on the inner surface of the zinc can anode where it inhibits, to some degree, the aforementioned corrosion and gassing reactions. Davis' corrosion inhibitor enables the amount of mercury required in a LeClanche cell to be lowered.

In U.S. Pat. No. 3,928,074 Jung et al. disclose a LeClanche cell having a polyethylene glycol monoalkyl ether (PEL) corrosion inhibitor added to the ammonium chloride/water electrolyte thereof. The organic PEL additive reduces gassing rates in LeClanche cells having no mercury to levels commensurate with similarly constructed LeClanche cells containing mercury.

In U.S. Pat. No. 3,970,476 Cerfon discloses a LeClanche cell having a mixture of electrolyte and an organic ascorbic acid corrosion inhibitor. Cerfon discloses superior high temperature storage characteristics resulting from the addition of ascorbic acid to the ammonium chloride/water electrolyte of a LeClanche cell.

Another means of attempting to solve the gassing and corrosion problems attending LeClanche cells has been to form the zinc cans thereof from alloys containing a mixture of zinc, lead, and cadmium, wherein the inner wall of the can is coated with an amalgam of mercury. Cadmium is typically included in such zinc can alloys because it aids the zinc can manufacturing process. Typically, about 0.01% by weight mercury is added to the electrolyte of the LeClanche cell at the time of cell manufacture in the form of mercurous chloride. After the cell is assembled and closed, the mercury disperses towards the inner walls of the zinc can to form a protective mercury-zinc amalgam thereon. The mercury-zinc amalgam reduces undesired parasitic corrosion and gas evolution reactions in LeClanche cells.

In the book entitled "Handbook of Batteries and Fuel Cells," published in 1984 by McGraw-Hill Publishing Company, Chapter 5 of which is hereby incorporated by reference, at pp. 5–7 Linden discloses LeClanche cells having zinc cans containing up to about 3000 ppm cadmium and more than 3000 ppm lead. Linden discloses further that lead contributes to the forming qualities of the can, that cadmium makes the zinc corrosion-resistant to ordinary dry cell electrolytes, adds strength to the can, and is usually present in amounts of up to 1000 ppm. At page 5–7 Linden states that:

[M]etallic impurities such as copper, nickel, iron, and cobalt cause corrosive reactions with the zinc and must be avoided. In addition, iron makes zinc harder and less workable.

In the paper "New alloy composition for zinc can for carbon-zinc dry cells," published in 1987 by the JEC Press in vol. 6 of "Progress in Batteries & Solar Cells," which paper is hereby incorporated by reference, at pp. 110–112 Miyazaki et al. disclose LeClanche cells having no mercury therein, wherein the zinc can alloy contains a mixture of zinc, lead, cadmium, indium, and manganese, and wherein zero-mercury cells having zinc cans made of the disclosed alloy exhibit reasonably good performance characteristics and corrosion resistance in respect of LeClanche cells containing mercury.

In the paper "Mercury free dry battery materialized in Japan, mercury function substituted by a combination of materials," published in "Nikkei New Materials" in 1992, the reduction of hydrogen gassing rates through the removal of impurities from zinc can anodes in "manganese dry batteries" is disclosed at pp. 1–10.

In the paper entitled "The PMA Alloy," published in 1993 by the JEC Press in No. 5 of the "JEC Battery Newsletter," which paper is hereby incorporated by reference, Meeus discloses at pp. 30–43 zinc cans having lead concentrations as low as 2000 ppm, having no cadmium therein, and made by extruding zinc cans from calots. At page 33 Meeus discusses the beneficial effects of having lead concentrations in zinc cans exceeding 2000 ppm, wherein such lead concentrations reduce gassing and corrosion rates.

The foregoing means of reducing or eliminating mercury in LeClanche cells through the use of special alloys in the zinc can anode require, however, the presence of significant amounts of lead, cadmium, or both. It is well known that lead and cadmium are toxic metals. The special zinc can alloys developed to eliminate the use of mercury in LeClanche cells, and known of heretofore, do not contain reduced concentrations of either or both of those toxic metals. Some of the foregoing special alloys even contain elevated concentrations of both toxic metals.

Other efforts to improve the performance, capacity, and storage characteristics of mercury-free LeClanche cells have been directed to identifying suitable inhibitors for use in mercury-free cells.

Ihara et al., "Mechanism of Corrosion Inhibition with Bismuth Compounds for Iron, Nickel and Zinc in Acid Solutions," 60 Derki Kagaku 500–507 (1992), demonstrates the use of bismuth compounds, including organobismuth compounds for inhibiting corrosion by formation of protective films on electrodes, including zinc electrodes.

Huang, et al., Mercury-Free zinc/manganese batteries with paper separators," Chinese Patent Document CN 1065553A (1992) (Abstract translated at CA Selects Batteries & Fuel Cells, Issue 10, page 5, 1993, describes the use of paper separators coated with 0.25–0.45% $BiCl_3$ paste to suppress corrosion of Zn anodes.

Chen, et al., "Corrosion of Ammonium Chloride Mercury-Free Paper Lined Battery During Storage," Dianchi 24:20 (1994), report certain conditions and procedures for improving corrosion resistance using Bismuth compounds in mercury free general purpose batteries.

Huang, et al., "Mercury-Substituting Inhibitors for Zinc Manganese Dry Cells," 24 Battery Monthly 260 (1994) evaluated bismuth as a corrosion inhibitor.

What is needed is a mercury-free heavy duty LeClanche cell having acceptable performance, capacity, and storage characteristics that can be produced at a significantly lower cost than prior mercury-free heavy duty LeClanche cells.

It is therefore an object of the present invention to provide a heavy duty LeClanche cell having comparable or superior performance, capacity, and storage characteristics when compared to existing heavy duty LeClanche cells.

It is another object of the present invention to provide a heavy duty LeClanche cell having increased performance at lower cost.

It is still another object of the present invention to provide a LeClanche cell that presents a reduced hazard to the environment, wherein the cell may be disposed of in a landfill without presenting any significant hazard to human or other forms of life.

It is a further object yet of the present invention to provide a LeClanche cell having reduced or no mercury therein.

It is another object yet of the present invention to provide a LeClanche cell having low gassing rates.

It is still another object of the present invention to provide a LeClanche cell having reduced parasitic corrosion reactions occurring on the surface of the zinc anode thereof.

It is still another object yet of the present invention to provide methods of making separators for LeClanche cells and for incorporating the separators into LeClanche cells, wherein cells so made exhibit superior performance, capacity, and storage characteristics comparable or superior to existing cells.

It is a further object of the present invention to provide methods of making separators for LeClanche cells that present a reduced hazard to the environment.

It is a feature of the present invention to provide separators for a LeClanche cell.

It is another feature of the present invention to provide a Kraft paper separator paper for a LeClanche cell, which, when suitably coated exhibits performance, capacity and storage characteristics comparable or superior to existing separators.

It is another feature of the present invention to provide a separator for use in an improved LeClanche cell that decreases the extent of leakage during storage and increases the milliamp hours of performance, while decreasing gas evolution.

It is another feature of the present invention to provide a separator in a LeClanche cell, the separator having no mercury disposed on the surface thereof.

It is a further feature of the present invention to provide a LeClanche cell having reduced mercury therein.

It is yet another feature of the present invention to provide a LeClanche cell having no mercury therein.

It is a still further feature yet of the present invention to provide a LeClanche cell, the cathode, the electrolyte, the separator and the anode thereof containing, in combination, no more than about 0.01 percent by weight mercury.

It is a further feature of the present invention to provide a LeClanche cell, the cathode, the electrolyte, the separator and the zinc anode thereof containing, in combination, no, or substantially no, mercury.

It is a still a further feature yet of the present invention to provide a method of making a separator for forming a zinc anode of a LeClanche cell, the method including the steps of selecting a Kraft paper as a substrate, and thereafter depositing thereon a coating comprising an inorganic corrosion inhibitor, an organic corrosion inhibitor, and a binding agent.

It is an advantage of the present invention that the Kraft paper-containing separator thereof costs less to manufacture than a conventional capacitor-grade separator for a LeClanche cell.

SUMMARY OF THE INVENTION

This invention satisfies the above needs. A novel heavy duty LeClanche electrochemical cell, a separator therefor, a combination of substrate and coating from which the separator is made, and methods of making and using same, are provided for.

Some objects of the present invention are attained in a separator configured for use in a heavy duty LeClanche cell, the separator comprising a Kraft paper substrate and a corrosion-inhibiting coating thereupon. The coating thereupon comprises an organic inhibitor, an inorganic inhibitor, a starch and a binding agent.

The separator can be configured for use in a round LeClanche cell inside a cylindrical can having a bottom and a sidewall extending upwardly therefrom, the can having an initially open top end, where such a round LeClanche cell is selected from the group consisting of AAA, AA, C, D and Lantern sizes. The separator can also be configured for use in a flat LeClanche cell such as a 9 Volt cell.

Additional objects of the present invention are attained in a LeClanche electrochemical cell comprising a zinc anode, a manganese dioxide cathode, an ionically permeable separator of the type described herein interposed between the anode and the cathode, an electrolyte comprising zinc chloride as a primary component, the electrolyte at least partially wetting the anode, the cathode, and the separator, and a current collector electrically connected to the cathode.

A cell of the present invention should contain no more than about 0.01% mercury by weight. More preferably, the cell of the present invention contains substantially no mercury.

Further objects of the present invention are attained in a method of making an ionically permeable separator configured for use in a LeClanche cell, the method comprising the steps of selecting as a starting material a Kraft paper substrate and depositing thereupon a coating comprising an organic inhibitor, an inorganic inhibitor, a starch, and a binding agent.

Additional objects of the present invention are attained in a method of making an electrochemical LeClanche cell comprising the steps of selecting a cathode material comprising manganese dioxide, selecting an electrolyte comprising chloride as a primary component, selecting a zinc anode configured for use in the cell, selecting a cathode current collector comprising carbonaceous material, selecting an ionically permeable separator of the type described herein having first and second major opposing surfaces, placing the first surface of the separator propinquant to the anode, placing the cathode material propinquant to the second surface of separator, placing the cathode current collector propinquant to the cathode material, wetting at least one of the anode, the separator and the cathode material with the electrolyte, and sealing the cell to at least inhibit the ingress of air therein.

Still additional objects yet of the present invention are attained in a method of using a LeClanche electrochemical cell comprising a positive terminal, a negative terminal, and an ionically permeable separator of the type described herein, the separator being disposed propinquant to an anode and a cathode, the method comprising the step of discharging the cell across its positive and negative terminals.

BRIEF DESCRIPTION OF THE DRAWINGS

The foregoing and other objects, features, and advantages of the present invention will become better understood by referring to the following description, appended claims, and accompanying drawings, where:

FIGS. 9A–9H show characteristics of data acquired using Heavy Duty D Size cells prepared in Scale Up Run 1.

FIGS. 10A–10H show characteristics of data acquired using Heavy Duty D Size cells having separators of the present invention as prepared in Scale Up Run 2.

FIGS. 11A–11E show characteristics of data acquired using Heavy Duty C Size cells having separators of the present invention as prepared in Scale Up Run 1.

FIGS. 12A–12E show characteristics of data acquired using Heavy Duty C Size cells having separators of the present invention as prepared in Scale Up Run 2.

FIGS. 13A–13E show characteristics of data acquired using Heavy Duty AA Size cells having separators of the present invention as prepared in Scale Up Run 1.

FIGS. 14A–14I show characteristics of data acquired using Heavy Duty AA Size cells having separators of the present invention as prepared in Scale Up Run 2.

FIGS. 15A–15C show characteristics of data acquired using Heavy Duty Lantern 941 Size cells having separators of the present invention as prepared in Scale Up Run 1.

FIGS. 16A–16C show characteristics of data acquired using Heavy Duty Lantern 941 Size cells having separators of the present invention as prepared in Scale Up Run 2.

FIGS. 17A–17C show characteristics of data acquired using Heavy Duty Lantern 944 Size cells having separators of the present invention as prepared in Scale Up Run 1.

FIGS. 18A–18C show characteristics of data acquired using Heavy Duty Lantern 944 Size cells having separators of the present invention as prepared in Scale Up Run 2.

FIG. 19 shows summary data comparing characteristics of data acquired using Heavy Duty D Size cells having separators of the present invention as prepared in Scale Up Runs 1 and 2.

FIG. 20 shows summary data comparing characteristics of data acquired using Heavy Duty C Size cells having separators of the present invention as prepared in Scale Up Runs 1 and 2.

FIG. 21 shows summary data comparing characteristics of data acquired using Heavy Duty AA Size cells having separators of the present invention as prepared in Scale Up Runs 1 and 2.

FIG. 22 shows summary data comparing characteristics of data acquired using Heavy Duty Lantern Size 941 and 944 cells having separators of the present invention as prepared in Scale Up Runs 1 and 2.

DETAILED DESCRIPTION OF THE PREFERRED EMBODIMENTS

While those skilled in the art will recognize that the present invention is applicable to all types of heavy duty LeClanche cells, batteries, and separators, and methods of making and using same, the particular embodiments of the invention set forth herein relate to round and flat cell LeClanche cells and batteries.

In this patent application, references to "heavy duty" LeClanche cells are intended to encompass all LeClanche type cells that use all or substantially all zinc chloride electrolyte. It is understood in the art that a high percentage of zinc chloride (and lower ammonium chloride percentage) is generally associated with a higher grade of manganese dioxide cathode and a heavier duty cell. For purposes of this application, a heavy duty cell uses an electrolyte that is greater than 90% and preferably greater than 95% and most preferably greater than 99% zinc chloride.

Figure 1:
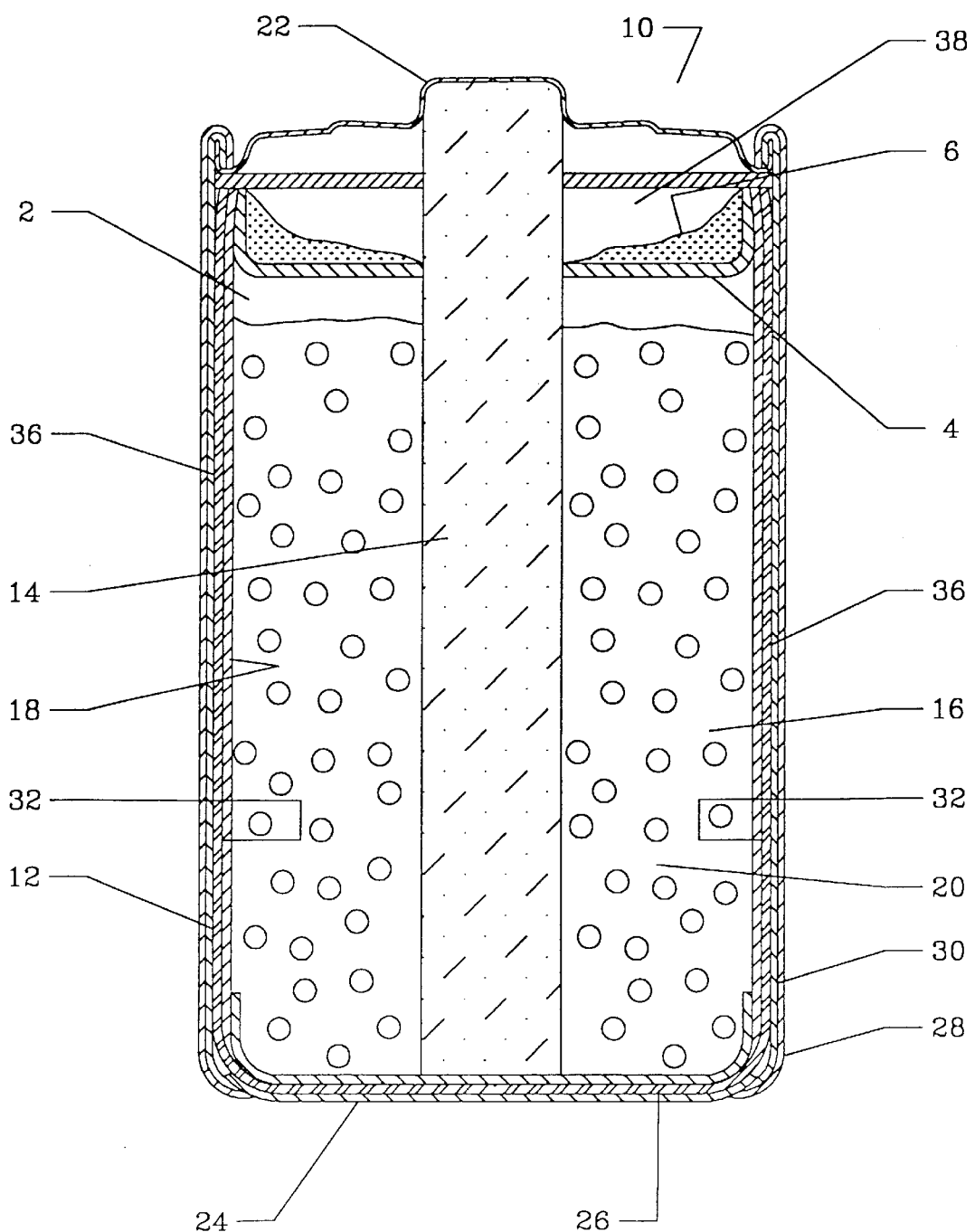
FIG. 1 is a cross-sectional view of a first embodiment of a round LeClanche cell of the present invention.

FIG. 1 is a cross-sectional view of a first embodiment of a round LeClanche cell of the present invention. In round cell 10 of FIG. 1, zinc anode 12 (referred to herein interchangeably as zinc can 12, or zinc container 12) serves as the zinc anode of the LeClanche cell, the can forming a container having bottom 26, upstanding inner sidewall 32, and upstanding outer sidewall 36 extending upwardly therefrom.

Several components of the round LeClanche cell are disposed within zinc anode 12 having an initially open top end 38. Carbon rod 14 in the center of the cell functions as the cathode current collector. Cathode material 16 is disposed around carbon rod 14. Separator 18 prevents inner sidewalls 32 of zinc can 12 from coming into direct electrical contact with cathode material 16. Liquid electrolyte 20 is disposed substantially evenly throughout cathode material 16.

Expansion void 2, disposed between cathode material 16 and seal washer 4, permits the expansion of various cell components and gases to occur therein as the cell discharges. Seal washer 4 typically comprises wax impregnated paper, and forms a barrier atop which asphalt sealant 6 is disposed. Optionally, an inner seal of the type disclosed in U.S. patent application Ser. No. 08/236,578 entitled "Electrochemical Cell Having Inner Seal," filed on May 2, 1994, the disclosure of which is hereby incorporated by reference in its entirety, may be disposed between seal washer 4 and cathode material 16.

Top cover 22 is in electrical contact with carbon rod 14, and serves as the positive terminal of the cell. Bottom cover 24 is in electrical contact with bottom 26 of zinc can or container 12, and serves as the negative terminal of the cell. Outer jacket 28, made of steel, paper, plastic or the like, extends between top cover 22 and bottom cover 24, and engages outer upstanding sidewall 36 of zinc anode 12.

Figure 2:
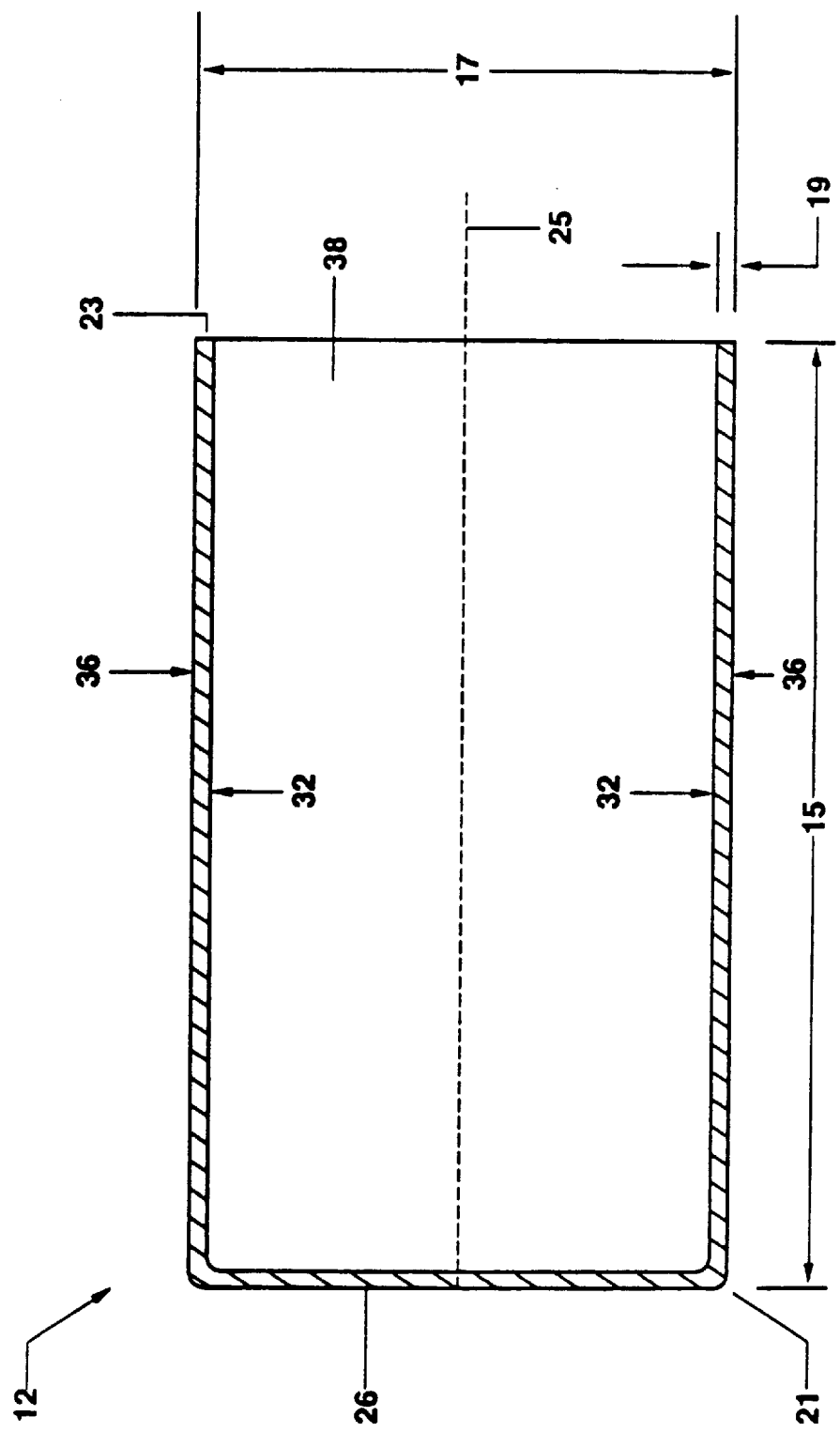
FIG. 2 is a cross-sectional view of the zinc can of the round LeClanche cell of FIG. 1 prior to cell assembly, and prior to inward crimping of the top edge thereof.

FIG. 2 is a cross-sectional view of the zinc anode of the round LeClanche cell of FIG. 1, wherein zinc anode 12 is shown as it appears prior to other cell components being placed therein, and prior to the top end thereof being crimped inwardly during the cell manufacturing and assembly process. Zinc anode 12 comprises bottom 26, inner sidewall 32, top edge 23, and outer sidewall 36, such components forming a can or container 12 having initially open top end 38. In its typical commercial round cell embodiments, zinc anode 12 is characterized by physical dimensions length 15, radius 21, outer diameter 17, and sidewall thickness 19, as shown in FIG. 2. Table 1 presents preferred specifications for those dimensions in round LeClanche cells of the present invention selected from the group consisting of AAA, AA, C, and D sizes.

TABLE 1

Preferred Dimensions of Zinc Anodes for Round LeClanche Cells of the Present Invention

| Dimension | Round Cell Size and Type | Corresponding Specification (inches) |
|---|---|---|
| Length 15 | AA (heavy duty) | 1.783 ± 0.002 |
| | C (heavy duty) | 1.656 ± 0.016 |
| | D (heavy duty industrial) | 2.062 ± 0.016 |
| | D (heavy duty) | 2.062 ± 0.016 |
| | D lantern (heavy duty) | 3.406 ± 0.016 |
| Outer Diameter 17 | AA (heavy duty) | 0.515 ± 0.003 |
| | C (heavy duty) | 0.892 ± 0.003 |
| | D (heavy duty industrial) | 1.183 ± 0.003 |
| | D (heavy duty) | 1.183 ± 0.003 |
| | D lantern (heavy duty) | 1.245 ± 0.003 |
| Thickness 19 | AA (heavy duty) | 0.011–0.014 |
| | C (heavy duty) | 0.014–0 017 |
| | D (heavy duty industrial) | 0.014–0.016 |
| | D (heavy duty) | 0.016–0.018 |
| | D lantern (heavy duty) | 0.017–0.019 |
| Radius 21 | AA (heavy duty) | 0.047 |
| | C (heavy duty) | 0.063 |
| | D (heavy duty industrial) | 0.063 |
| | D (heavy duty) | 0.063 |
| | D lantern (heavy duty) | 0.063 |

To attain maximum performance and reliability in round LeClanche cells of the present invention, zinc anode 12 should conform to the following additional specifications prior to cell assembly. Referring to FIG. 2, top edge 23 should exhibit thereon substantially no irregularities such as burrs, rough edges, or slivers. Zinc anode 12 should not exhibit any blisters, cracks, laminations, wrinkles, or tears, and should not have any foreign material on the surface thereof such as drawing or cleaning compound residuum. Sidewalls 32 and 36, and bottom 26, should form a cylindrical can 12 having a cross-section that is substantially circular when viewed at an angle of 90 degrees in respect of a plane perpendicular to longitudinal axis 25.

Most preferably, the dimensions presented in Table 1 should be confirmed by measuring length 15, outside diameter 17, thickness 19, and radius 21 of a representative low zinc anode 12 with a Brown & Sharp No. 225 ball micrometer and a Mituyo Digimatic 6" caliper, wherein can 12 is slit open, laid flat, and an average of at least six different micrometer readings is taken for each of dimensions 15, 17, 19, and 21, the average of each set of measurements falling within the corresponding specification given in Table 1.

Zinc anode 12 of FIGS. 1 and 2 is most preferably fabricated in accordance with the deep drawing method set forth infra, but may also be made in accordance with the less preferred methods of impact extrusion, or rolling and soldering, also described infra.

Figure 3:
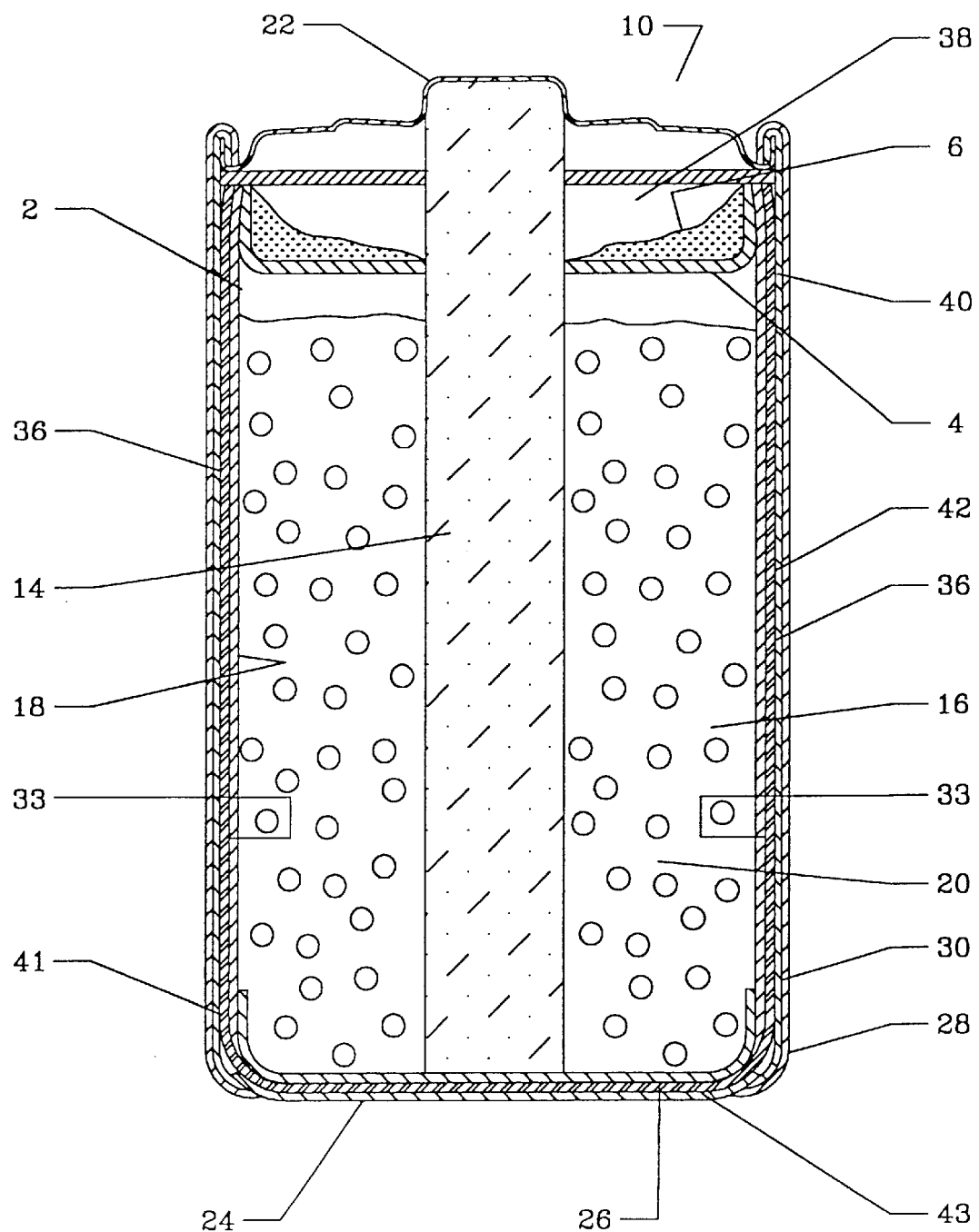
FIG. 3 is a cross-sectional view of a second embodiment of a round LeClanche cell of the present invention.

FIG. 3 is a cross-sectional view of a second embodiment of a round LeClanche cell of the present invention. In FIG. 3, can 41 comprises inner zinc can 40 and outer can 42. Outer can 42 may comprise zinc, steel or any other suitable metal or alloy, or optionally, may comprise any other suitable electrically conductive material such as plastic or graphite. Inner zinc can 40 physically engages, and is in electrical contact with, outer can 42, and may form an insert can or sleeve that frictionally or otherwise engages the inner sidewall of outer can 42. Inner zinc can 40 has a bottom 43, the bottom being contiguous at its outer perimeter with inner sidewall 33 of inner zinc can 40. Optionally, inner zinc can 40 may have no bottom 43, but may form a sleeve or cylinder having open top and bottom ends.

Can 41 of FIG. 3 may be formed by pressing together two metal sheets, most preferably at temperatures or pressures sufficient to cause some bonding or welding together of the metal sheets, wherein a first zinc alloy sheet subsequently forms inner can 40, and a second metal sheet subsequently forms outer can 42. Can 41 may then be formed by any one of the deep drawing, impact extrusion, or rolling processes discussed below. Alternatively, inner zinc can 40 and outer can 42 may first be formed separately by deep drawing means, followed by inner zinc can 40 being press fitted into outer can 42 to form can 41.

Figure 4:
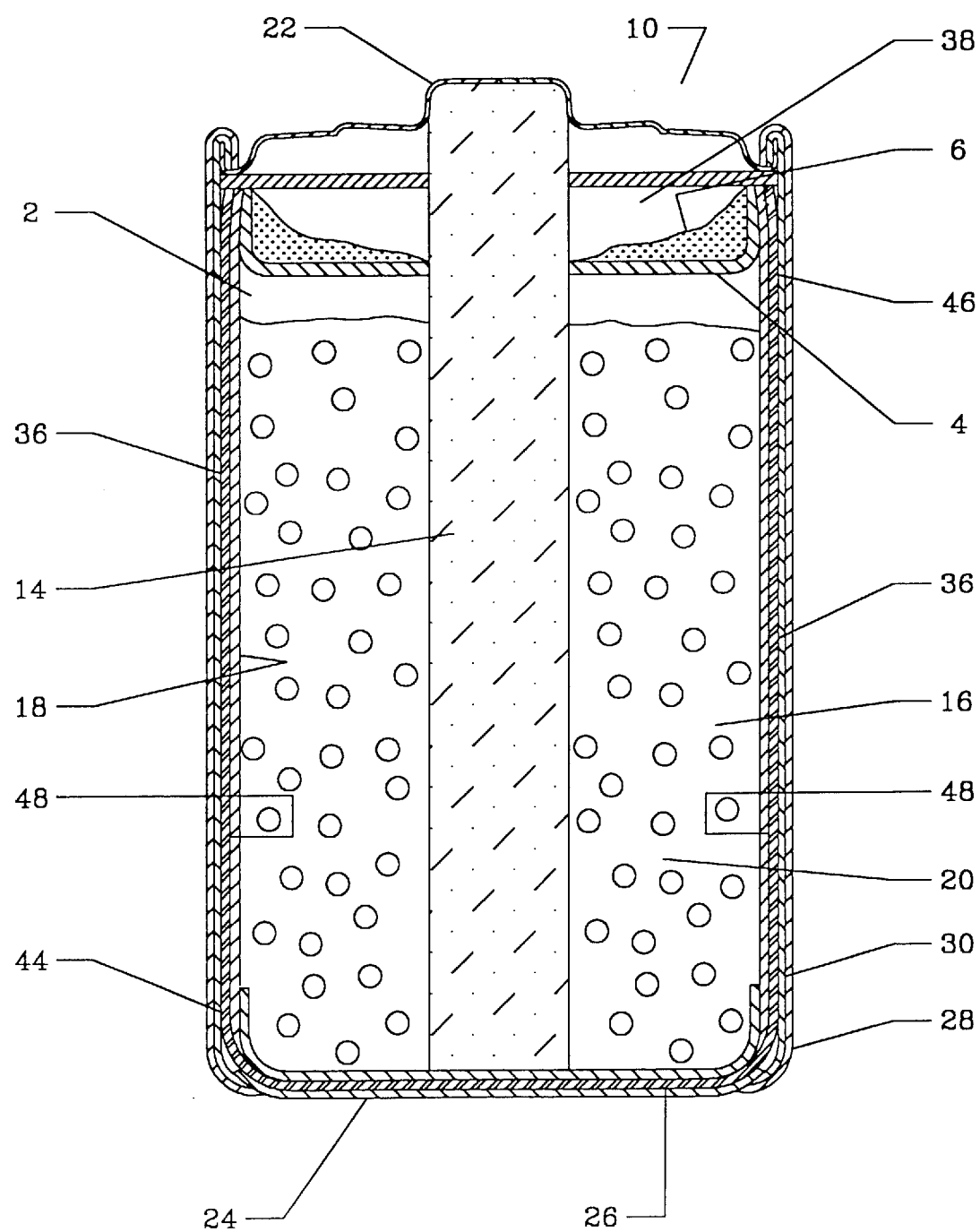
FIG. 4 is a cross-sectional view of a third embodiment of a round LeClanche cell of the present invention, wherein the can has a zinc plating disposed on the inner sidewall thereof.

FIG. 4 is a cross-sectional view of a third embodiment of a round LeClanche cell of the present invention, wherein can 44 has zinc plating 46, and being disposed on the inner sidewall 48 of can 44. In the third embodiment, can 44 may comprise zinc or, optionally, may comprise any other suitable metal or alloy. Zinc plating 46 physically engages, and is in electrical contact with, inner sidewall 48 of can 44.

Zinc plating 46 may be deposited upon inner sidewall 48 of can 44 by any one of several well known electroplating processes. For example, electrodeposition of the zinc alloy of plating 46 may be obtained in a suitable electrolyte solution, wherein can 44 serves as an electroplating cathode in such suitable electrolyte solution, and direct current is introduced through an electroplating zinc alloy anode. Zinc plating 46 may be disposed on any suitable electrically conductive material.

Figure 5:
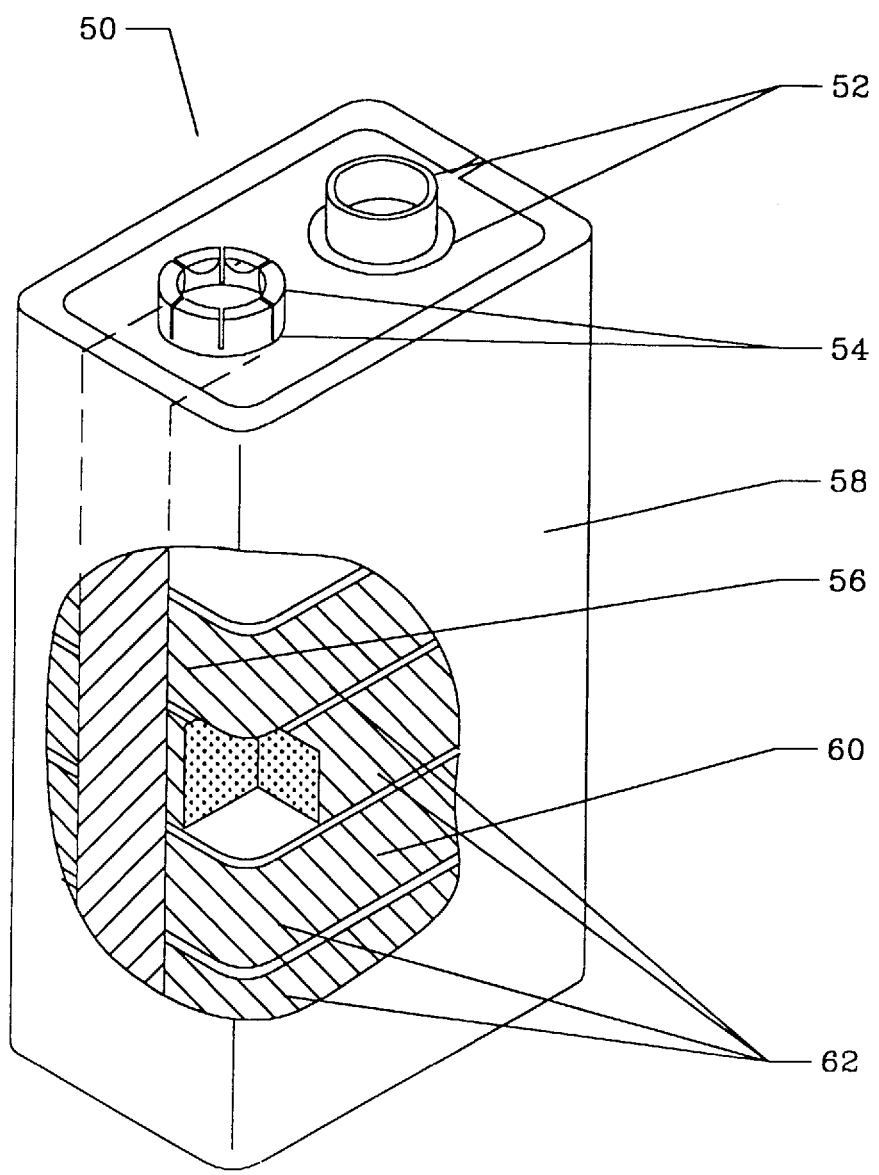
FIG. 5 is a perspective view of an embodiment of a flat cell LeClanche battery of the present invention.

FIG. 5 is a perspective view of a flat cell LeClanche battery 50 of the present invention. Flat cell battery 50 has a plurality of unit flat cells 62, one disposed atop the other therewithin, the unit flat cells 62 being connected electrically in series to positive contact 52 and negative contact 54. Connector strip 56 connects negative contact 54 to the zinc anode of the lowermost of unit flat cells 62. Outer jacket 58 is electrically insulated from the plurality of unit flat cells 62. Wax coating 60 provides a seal for the battery. Typically, six unit flat cells 62 are connected in series to form a 9-volt battery of the type shown in FIG. 5.

Figure 6:
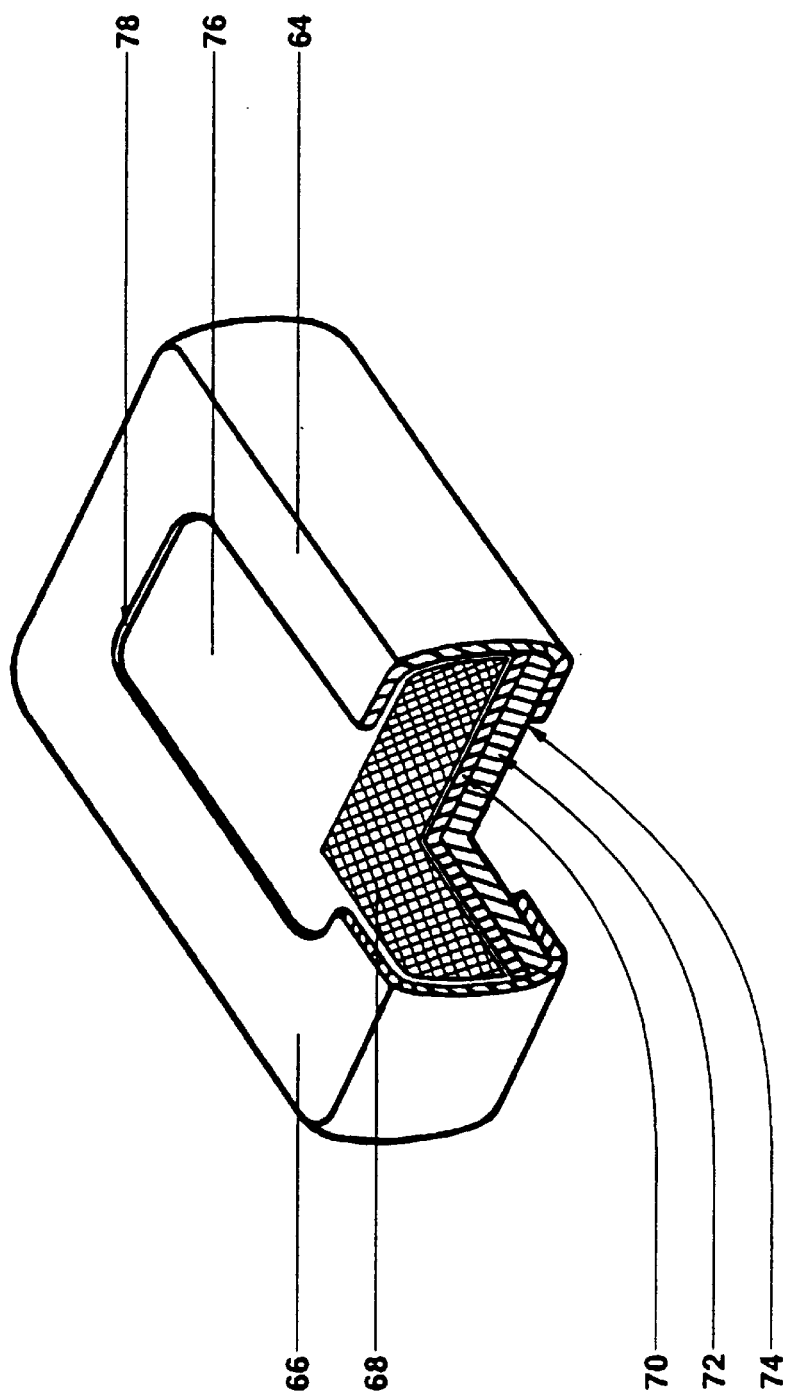
FIG. 6 is an enlarged perspective view of a unit LeClanche cell of the flat cell LeClanche battery of FIG. 5.
Figure 7:
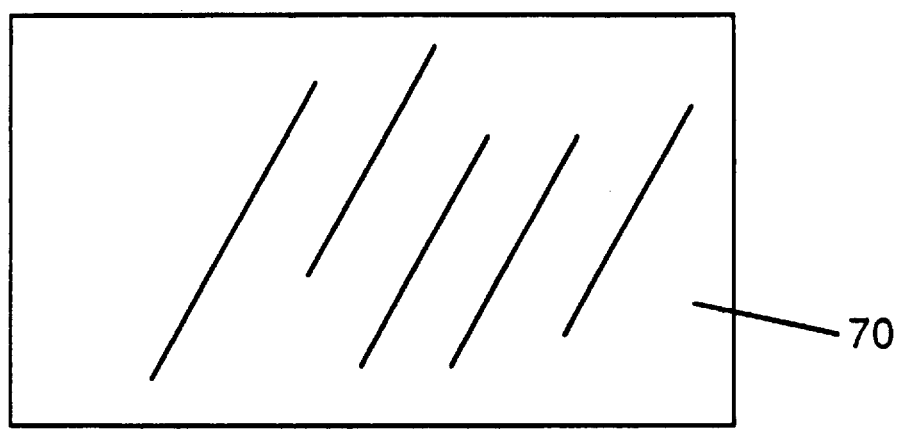
FIG. 7 is a top view of a separator in accordance with the present invention.
Figure 8:
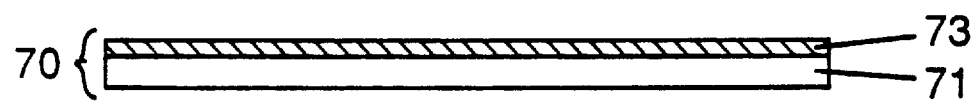
FIG. 8 is a sectional view of a separator in accordance with the present invention.

FIG. 6 is an enlarged perspective view of one of the unit flat cells 62 of FIG. 5. Plastic envelope 66 has upper aperture 76, wherein outer perimeter 78 defines the lateral extent of upper aperture 76. Plastic envelope 66 has a lower aperture disposed on the bottom side thereof having the same dimensions as the upper aperture, the outer perimeter of the lower aperture being aligned vertically below outer perimeter 78 of top aperture 76.

Several components of flat unit cell 64 are disposed within plastic envelope 66, including cathode mix 68, separator 70, and zinc anode 72. Cathode mix 68 comprises manganese dioxide, a carbon binder, and an electrolyte. Most preferably, cathode mix 68 contains about 9.64% by weight acetylene black compressed by 50%, about 53.32% by weight electrolytic manganese dioxide, about 1.28% by weight ammonium chloride, about 17.41% by weight zinc chloride solution, and about 25.19% by weight water. The upper surface of cathode mix 68 is exposed through upper aperture 76 to permit electrical contact of cathode mix 68 with conductive carbon coating 74 of the unit cell immediately adjacent thereabove. Separator 70, comprising cereal coated Kraft paper 71 coated with a corrosion inhibiting coating 73 thereupon, is disposed between cathode mix 68 and zinc anode 72.

Zinc anode 72 serves as the anode of the flat unit cell, and forms a rectangular member having substantially flat opposing major upper and lower surfaces, wherein the major upper surface contacts separator 70 and the major lower surface has conductive carbon coating 74 disposed thereupon. Conductive carbon coating 74 is exposed through the lower aperture to permit the coating to function as a current collector for the cathode mix of the unit cell disposed immediately therebelow.

Zinc alloy sheets from which zinc anode 72 is formed may be manufactured in accordance with the process for making a zinc alloy set forth below. Typically, zinc anode 72 is then stamped, die-cut, or otherwise formed from the zinc alloy sheets produced in accordance with the present invention.

Although Kraft paper 71 has previously been used as a separator in low-cost, low-grade general purpose batteries, it has not previously been combined with a corrosion-inhibiting coating to form a separator capable of reducing or preventing corrosion of a zinc anode or electrolyte leakage in heavy duty cells. Instead, the art has relied upon high-cost capacitor paper to achieve these goals in heavy duty cells, particularly mercury-free cells. Capacitor paper, as used herein, refers to paper used in the electrochemical cell industry, but primarily manufactured for use in capacitors. Its distinguishing characteristic is that it has no free electrolytes such as sulfites or chlorides. As a result of the additional processing required during manufacture of capacitor paper, it is a costly paper. It is however, generally regarded to be "cleaner," because impurities other than free electrolytes are also removed during manufacture. Presumably because its fewer impurities can translate into other benefits, such as ion flow, capacitor paper has been used in the industry as a separator paper in electrochemical cells.

In prior efforts to produce low-mercury or zero-mercury batteries, those skilled in the art have attempted to replace the corrosion-inhibiting property of mercury with other coatings applied to capacitor paper. Bismuth (at times provided in the form of bismuth sulfate) has been coated onto capacitor papers. Adhesion problems have been encountered when trying to evenly coat bismuth compounds onto capacitor paper to form an effective separator for use in a heavy duty LeClanche cell.

It has been discovered by the present inventors that a Kraft paper substrate can be coated with a suitable corrosion inhibiting coating to form a suitable separator for use in LeClanche cells. Because the cost of Kraft paper is significantly lower than that of the more typical high-grade capacitor paper used in the industry, a significant cost savings is realized in the production of heavy duty cells. In addition, production problems relating to coating adhesion on capacitor paper are minimized or overcome.

References in this patent application to Kraft paper or Kraft-type paper are intended to include, but are not limited to, paper substrates prepared according to the sulfate pulping process described in detail at page 722 et seq of Vol. 10 of the Encyclopedia of Polymer Science and Engineering (John Wiley & Sons) 2nd Ed. (1987), and Kraft paper as defined therein at page 722. Definitions of the terms "sulfate pulping process" and "Kraft paper," as set forth in the preceding publication, are incorporated by reference herein, as is the publication in its entirety.

Kraft paper suitable for use in the present invention can range in weight from 20 lb/ream to 80 lb/ream, and a preferred weight is in the range of 30–60 lb/ream. A most preferred weight for use in the invention is 35 lb/ream because a suitable coating is most readily applied to one face of the paper. A heavier Kraft paper (e.g., 55 lb/ream) is preferred for use in heavy-duty D size cells and in lantern cells which contain several LeClanche cells wired in series, but in such cases it is possible and advantageous to apply a thinner layer of coating to the Kraft paper substrate. The Kraft paper is preferably a simplex (single ply), but can be a duplex, if desired.

The coating 73 comprises an inorganic corrosion-inhibiting material. A bismuth containing material such as bismuth acetate, bismuth chloride, bismuth citrate, bismuth neodicanoate, bismuth oxychloride, bismuth 2-ethyl-hexoate, bismuth borate, bismuth nitrate, bismuth phosphate, bismuth sub-acetate, bismuth sulfide, bismuth salicylate, bismuth sulfate, bismuth trioxide and others are acceptable and the choice of compounds can largely be made on the basis of cost. Bismuth trioxide is preferred, as it is relatively inexpensive. Bismuth compounds are used at 0.5 to 5% by weight, and preferably at 1–2%, and most preferably at 1.2–1.5%. In addition to bismuth compounds other inorganic inhibitors can be used at comparable concentration levels. These would include indium compounds including, but not limited to, indium oxide, indium chloride, indium salicylate, indium acetate, indium sulfide, indium nitrate, indium oxalate, indium phosphate, indium methoxide and indium hydroxide.

The coating further comprises an organic corrosion inhibiting material at a concentration of between 0.5% and 5% in the coating. A preferred organic inhibitor is polypropylene glycol, which is commercially available in a number of molecular weight ranges. A preferred polypropylene glycol is PPG 230 which has a nominal molecular weight of 230 grams/mole. PPG 1000, which has a nominal molecular weight of 1,000 grams/mole has also been used. Other suitable organic inhibitors include other non-ionic organic surfactants, including, but not limited to, polyethylene glycol, polyalkyl glycol, polyalkyl oxide, polyethylene oxide, derivatives of polyethylene oxide, derivatives of polypropylene oxide, combinations of derivatives of polyethylene oxide and polypropylene oxide. The foregoing derivatives include, but are not limited to, esters, phosphates, ethers, alkyl esters, aryl esters, alkyl phosphates, and aryl phosphates, and other combinations and derivatives of the foregoing.

Many commercially available starches, including those described herein, and others known in the art to provide adhesive and stability properties during storage, can also be included in a coating mix. Suitable starches for the present invention include, but are not limited to, modified corn starches having any of a number of varying degrees of crosslinking, natural corn starch, modified potato starches, natural potato starches. Less suitable starches for the present invention include wheat starch, wheat flour, rice starch, cellulose-based adhesives, and derivatives thereof, cellulose derivatives, guar gum, xanthum gum, and other natural cellulose materials and derivatives.

The coating also comprises one or more binding agents at a weight percent of less than 5%. These can include a polyvinyl alcohol (PVA) of suitable molecular weight or other suitable polymeric acetate or polymeric alcohol. The art is familiar with the use of binding agents on separator papers and the selection and use of a particular binding agent alone has no substantial bearing on this invention.

In addition, the coating can be provided with other agents such as viscosity-modifying agents such as Acrysol GS™ or Surfonyl 440™ that may be advantageously incorporated to facilitate the coating process.

The coating can be applied to a suitable thickness in an air knife coating process. An air knife coating process is described and shown at page 744 of Vol. 10 of the Encyclopedia of Polymer Science and Engineering (John Wiley & Sons) 2nd. Ed. (1987), which has previously been incorporated herein by reference in its entirety. A suitable coating weight is readily determined by varying the coating weight or thickness in test runs. Generally, coatings in the range of 5–50 mg/in$^2$ are suitable and weights of 10–40 mg/in$^2$ are preferred. It has been determined by the inventors that, as a general rule, as at higher substrate weights or thicknesses, thinner (lower weight) coatings are more preferred.

A coated Kraft paper separator thus prepared can be disposed in a LeClanche cell of the present invention such that the coated face of the separator is propinquant to the zinc anode.

Mercury is eliminated or substantially reduced from cells, batteries, and separators of the present invention. Unexpectedly, the present invention provides a mercury-free or substantially mercury-free LeClanche cell or battery having performance, capacity, and storage characteristics exceeding or at least matching those of prior LeClanche cells or batteries containing no mercury, which employ more expensive separators.

Although not essential to the present invention, reducing iron content in zinc anodes of the present invention to 12 ppm or less by weight appeared to permit a dramatic lowering of the threshold minimum amount of lead required in the zinc alloy used to manufacture the zinc anode. Because of the cost of removing iron from zinc, it is generally impractical to reduce the iron in the anode to below 1.5 or 2 ppm. Generally, iron levels between 2 and 10 ppm are suitable. The composition of a preferred zinc alloy, and a zinc anode formed therefrom is the subject of U.S. patent application Ser. No. 08/275,019, filed Jul. 13, 1994 which is incorporated herein by reference in its entirety.

For many years lead levels of at least about 2000 ppm by weight, and more commonly levels of at least about 3000 ppm by weight, were believed to be required in zinc cans of LeClanche cells to impart sufficient malleability and workability to the zinc alloy sheets from which extruded zinc cans were made. Some workability beyond that provided by conventional zinc was also thought to be required in zinc alloy sheets from which rolled or deep drawn zinc cans were made, wherein lead levels of between about 500 and 1000 ppm by weight were common in combination with between about 1000 ppm and 3000 ppm by weight cadmium. Reducing iron content also appeared to maintain desirable cell performance, capacity, and storage characteristics. Surprisingly, it was discovered that the lead content of the zinc alloy could be reduced to a level below about 800 ppm by weight, or even down to about 20–40 ppm by weight, even when cadmium concentrations lower than 30 ppm by weight were present in the alloy. Because it is toxic, the dramatic reduction in lead content in zinc anodes afforded by the present invention benefits the environment.

For many years cadmium levels of as low as 300 to 800 ppm by weight, but more typically between about 1000 ppm by weight and about 3000 ppm by weight were believed to be required in zinc cans of LeClanche cells to impart sufficient strength and zinc corrosion resistance to the zinc alloy sheets from which such cans were made during the processes of deep drawing, impact extrusion, or rolling.

It was discovered that reducing the iron content of the zinc anode to 12 ppm or less by weight also appeared to permit a dramatic lowering of the threshold minimum amount of cadmium required to manufacture the zinc alloy from which the zinc anodes of the present invention were fabricated. Furthermore, it appeared that the present invention permitted desirable cell performance, capacity, and storage characteristics to be maintained, despite the low cadmium content of the zinc anodes thereof. Surprisingly, it was discovered that the cadmium content of the zinc alloy from which zinc anodes were fabricated could be reduced to a level below about 200 ppm by weight, or even down to less than about 30 ppm by weight. Like lead, cadmium is toxic, and therefore the significant reduction of cadmium content in zinc anodes afforded by the present invention benefits the environment.

It was further discovered that small amounts of magnesium and manganese could be substituted for cadmium to impart greater strength and corrosion resistance to the zinc alloy from which zinc anodes of the present invention are made. Additionally, it was discovered that trace amounts of nickel, cobalt, molybdenum, antimony, and arsenic in the zinc alloy impaired battery performance. Thus, the presence of those metals in the zinc anodes of the present invention should be minimized.

The process of manufacturing the zinc anode comprises three basic steps:

melting a zinc alloy starting material and adding desired constituents, if any, to the resulting melt;

casting and rolling, or otherwise forming, the zinc alloy produced in of the first step into a zinc alloy calot or sheet, and fabricating the zinc anode from the zinc alloy calot or sheet produced in the second step.

In the first step, the starting material is melted in a suitable container having a refractory or other liner that does not permit susceptible iron to contact, or migrate into, the melt. The pot needs to reach temperatures sufficient to melt the starting material and any additional constituents of the zinc alloy, and thus may be set in a furnace. The furnace may be of the reverberatory type fired by gas or oil. Alternatively, a low frequency or high frequency induction furnace may be used. As required, constituents other than zinc may be added to the furnace for incorporation into the melt. If the heating method used does not agitate the melt by convection current or other means sufficiently to ensure even distribution of the added constituents throughout the melt, the melt should be stirred or agitated to effect even distribution. The furnace should hold the zinc alloy melt at a temperature between about 830° and 950° F., depending on metal analysis and casting requirements.

It was determined that contamination of the zinc alloy by iron occurred almost entirely during the first step when the alloy is molten. Thus, close attention to the first step is required because performance, capacity, and storage characteristics of cells and batteries of the present invention improve markedly, and in direct relation to the amount by which the iron content of the zinc anode thereof is reduced; provided, however, that the resulting zinc anode contains less than about 12 ppm by weight iron.

It was also determined that many types of industrial tools, containers, handling vessels, transport conduits, and the like used in the first and second steps contain susceptible iron. While the zinc alloy is in a molten state, steps should be taken to minimize contact between the alloy and any iron that is susceptible to migrating into the melt. By limiting contact between the molten zinc alloy and susceptible iron, migration of susceptible iron into the melt is minimized or, even more preferably, eliminated entirely.

Contact between the molten zinc alloy and susceptible iron may be controlled by using iron-containing devices that are generally not susceptible to the migration of iron therefrom into the molten zinc alloy, or by providing appropriate coatings or linings on iron-containing devices that would otherwise be susceptible to the migration of iron therefrom into the molten or heated zinc alloy. For example, appropriate coatings, linings, and materials for preventing the migration of iron into the molten zinc alloy include, but are not limited to, graphite, 304 Stainless Steel, and refractory materials.

Upon completion of the first step, the iron content of the zinc alloy is the same or only slightly elevated in respect of the iron content of the zinc ingots used as the starting material. By preventing contamination of the molten zinc alloy by susceptible iron, the iron content of the subsequently fabricated zinc anode is typically no more than about 1 to about 4 ppm greater than the iron content of the zinc starting material.

Absent measures to separate iron from the zinc alloy during the second or third steps, the iron content of the fabricated zinc anode cannot be less than the iron content of the starting material. Thus, the iron content of the starting material must be controlled in the first step. As a starting material, zinc ingots having an iron content as low as about 2 ppm by weight are readily and economically obtained. Accordingly, such low iron content in the starting material is preferred, provided such starting material may be procured at a suitable price.

In the second step, rolling slabs are cast in either open or closed book molds. Open molds generally have fins on the bottom for water cooling, whereas closed molds are air cooled. The casting molds should be lined with refractory of other materials that do not permit the migration of susceptible iron therefrom into the zinc alloy, and should also have clean, smooth surfaces that allow unrestricted shrinkage of the cast slab. The use of mold lubricant should be held to a minimum. Casting temperatures vary with the type of casting and metal analysis, but the normal range is from about 830° to about 950° F. Mold temperatures should vary between about 175° and 250° F., depending on the type of mold used and metal analysis requirements. The pouring of slabs in both open and closed book molds must be at such a rate as to hold turbulence to a minimum, and provide an even flow of metal across the bottom surface of the mold. Slabs cast in open molds must be skimmed immediately to remove surface oxide. Rolling slabs should be cast from about ¾ to about 4 inches thick. The thickness, width, and length of the slabs are determined by the gage and size of the finish-rolled sheet or calot, and the capacity of the rolling equipment used.

Temperatures of rolling slabs delivered to the slab roll should range between about 350° and about 500° F. Reductions on the slab roll should start at about 10 percent and then be increased to about 30 percent as the rolling progresses. The rate of reduction is controlled by metal analysis, roll shape, and mill capacity. Next, slab rolled material is cut into pack sheets, which are then finished at starting temperatures between about 350° and 450° F. in the packrolling process. Packs are rolled at light pressures, with a corresponding loss in temperature, to produce zinc alloy sheets or calots. Temperatures of finished packs of zinc alloy sheets or calots vary between about 175° and 250° F., depending on final thickness and metal analysis.

More detailed information concerning the first and second steps may be found at pages 523–533 of the book "Zinc— The Metal, Its Alloys and Compounds," by C. W. Mathewson, published by Reinhold Publishing Corp of New York in 1959, such pages being hereby incorporated by reference herein. For more information concerning rolling, see pages 343–360 of Volume 14 ("Forming and Forging") of the Ninth edition of the "Metals Handbook," edited by Joseph R. Davis, and published by ASM International of Ohio in 1988, such pages being hereby incorporated by reference herein.

The most preferred fabricating process, or third step, for manufacturing the round cells of the present invention is to make zinc cans by deep drawing means, wherein the zinc alloy sheet produced in the second step is fed through about eight in-line tool and die stations. At each station the zinc alloy sheet is stamped by a tool into a die. Progressing from first station to last, the can is drawn deeper at each station as the dies become progressively deeper and the diameter of the zinc can decreases. Upon emerging from final tool and die station the zinc can has been formed. Much more detailed information concerning the preferred deep drawing process of the third step may be found at pages 575–590 of Davis, supra, such pages being hereby incorporated by reference herein.

Another means of making round cell zinc cans is to take a zinc alloy calot of circular or octagonal shape and form therefrom a zinc can by impact extrusion means, otherwise commonly referred to as reverse extrusion. After completing the impact extruding step, excess zinc should be trimmed from the zinc can. Care must be taken in the impact extruding step to form zinc cans having sidewalls of sufficient thickness to form a strong can. More information concerning extrusion may be found at pages 301–326 of Davis, supra, in the Meeus reference, supra, and at pages 559–560 of Mathewson, supra, such pages being hereby incorporated by reference herein.

Yet another, but less preferred, method of making zinc cans is to cut a rectangular piece of metal from a sheet of zinc alloy and roll the piece to form a cylinder of appropriate dimensions. A circular piece is cut from the zinc alloy sheet of such dimensions as to fit in the bottom of the cylinder. The seam in the sidewall of the cylinder is then soldered together, and the bottom circular piece is soldered in place. The foregoing steps result in the formation of an upstanding zinc can having a closed bottom. This is not the most preferred method of making zinc cans because the solder required to close the seams of the can usually contains substantial amounts of lead. As mentioned above, lead is undesirable for environmental reasons. More information concerning this method of making zinc cans may be found at pages 555–559 of Mathewson, supra, such pages being hereby incorporated by reference herein.

The further the iron content of the zinc anode is reduced below 12 ppm by weight, the greater becomes the cost of effecting the iron reduction. Thus, some balance should be struck between battery performance and the cost of reducing iron content. It was determined that the cost of reducing the iron content of the zinc anodes of the present invention below 1 ppm iron by weight seemed to outweigh benefits in cell performance achieved through so doing; zinc ingots for starting material having an iron content of 1 ppm or less by weight are difficult to obtain and expensive.

To reduce the cost of manufacturing the zinc anode of the present invention, the anode should have an iron content of at least about 1.5 to 2 ppm by weight. Such iron contents permit some relaxation of the strict controls that would otherwise be required in the manufacturing process, and thus reduce manufacturing costs. In some embodiments the iron content is preferably at least about 4 ppm by weight, or may be as low as 2 ppm by weight. To the extent the cost of reducing the iron content is at least equally offset by improved cell or battery performance, capacity, or storage characteristics, however, still lower iron contents are preferred.

In weighing the cost of reducing iron content versus improvements achieved in cell or battery performance, capacity, or storage characteristics, it was determined that the iron content of the zinc anodes of the present invention should preferably be no more than about 10 or 11 ppm, and most preferably should not exceed about 8 ppm.

Various separators formed in accordance with the present invention were incorporated into heavy duty cells of various sizes and were compared in a variety of tests against commercial and test cells comprising capacitor-type separator papers.

The heavy duty cells of the following Examples were made using the internal mix constituents and corresponding amounts shown in the following table.

| Heavy Duty Cell Internal Mix Constituents and Amounts | |
|---|---|
| Constituent | Amount (percent by weight of total mix) |
| Acetylene Black, compressed 50% | 8.70% |
| Electrolytic MnO$_2$ | 49.49% |
| Ammonium Chloride | 1.51% |
| Zinc Oxide | 0.33% |
| Zinc Chloride Solution | 16.71% |
| Water (@ 160° F.) | 23.27% |

All heavy duty cells of the following Examples were made in accordance with the structure shown in FIG. 1. None of the cells contained mercury.

The following tests, among others noted elsewhere herein, were performed as indicated below:

Light Industrial Flashlight Test ("LIF Test" or "LIFT")

LIF tests were initiated approximately 1–3 weeks after the cells were prepared. In a LIF test, cells were stored for a suitable length of time and at a desired temperature, which was either room temperature (RT) or high temperature (HT). Throughout this patent application, unless otherwise noted, room temperature is 70° F. and high temperature is 113° F. An indication of 1HT, for example, refers to test data gathered after one month storage at high temperature, while 3RT indicates three months storage at room temperature.

Cells were also tested for their ability to retain charge without a storage period; the results of these tests are designated as "0 Delay" or "initial" throughout this patent application. These cells were not subject to a discharge protocol.

After storage, each tested cell energized an electrical circuit having a desired (e.g., 2.2 Ω, 3.9 Ω, 39 Ω) resistor load placed thereacross, such load simulating a typical flashlight load. Each circuit had a timed switch means for completing an interrupting the circuit. Using the timed switch means, each circuit was closed, and the battery was discharged thereacross for 4 minutes during each of 8 consecutive hours every day. Each cell then rested, or was not discharged, for the remaining 16 consecutive hours of the day. This cycle was repeated for each cell until the closed circuit voltage of the cell reached a suitable closed circuit voltage endpoint, which, unless otherwise noted, was 0.9 volts. When the endpoint was reached, the LIF test for those cells was terminated. The measured value (minutes to endpoint) is a measure of the cell's capacity.

LIF Test With Gassing Analysis

A LIF test under specified load conditions was performed as described above and subsequent measurement of evolved gas was made using a cell discharge hydrogen gas volume measurement apparatus. The apparatus measured the volume of hydrogen gas generated by discharged heavy duty cells.

Weight Loss Analysis

The decrease in weight, in mg, of each cell was determined after storage at pH 4.7, 113° F. for 31 days. In the AA cells tested, 5 ml of electrolyte were initially present in the cells.

Partial Discharge Analyses

Cells were partially discharged across an indicated continuous load for an indicated length of time or to a desired endpoint at room temperature or high temperature. After partial discharge, one of several analyses were performed. In some tests, leakage was measured over an extended period of weeks. If any leakage was observed, the cell was deemed to be positive for leakage. In other tests, the amperage retention was tested over an extended period of weeks. At suitable intervals thereafter, each cell was temporarily removed from storage and the flash current it could deliver was measured using an ammeter. No electrical load was placed in series with the cell and the ammeter while the flash current was being measured over a 0.5 second interval. Each cell was then returned to storage. The flash current measurement process was subsequently repeated for each cell. In certain tests, the residual capacity was measured after storage for an extended period as the number of discharge cycles needed to reach a stated closed circuit endpoint voltage.

EXAMPLE 1

Preparation and Test of Heavy Duty AA-Size Batteries

The following coated separators were prepared and placed into 6.0 ppm Fe cans, except Lot Number 10 where 16.5 ppm Fe cans were used. The separators of the cells of Lots 1–9 were hand-placed. The cells of Lot 10 were commercial products and, the separators were, therefore, machine-placed. Toshiba (Toshiba Battery Company) and NKK (Nippon Kodoshi Corporation) refer to commercially available capacitor-grade papers used in the industry to prepare battery separator papers. NKK D7B is a 70 micron thick duplex capacitor-grade paper. The bismuth compounds were used at 1.5–2.0% by weight. W-11 Stabilizer™, Glucostar 1030N™, Keoflo 364™, and 400 Stabilizer™ are starches commercially available from American Maize, Chemstar, National Starch and American Maize, respectively.

In this, and subsequent, formulations, polyvinyl alcohol (PVA) was used as a binder at 1–2%, unless otherwise noted. Polypropylene glycol having a nominal molecular weight of 230 grams/mole ("PPG230") or 1,000 grams/mole ("PPG1000"), an organic corrosion inhibitor, was included in each formulation at a concentration of about 2%, unless otherwise noted. Purity NCS™ is a modified corn starch available from National Starch. In addition, one or more suitable starches, such as corn starch, potato starch, or other starch of the type commonly used in separator coatings was also included in each formulation. The precise nature of the starch has not been determined.

In some samples, Acrysol GS™ was added to adjust the viscosity of the coating.

| Lot Number | Separator Paper | Coating Formulation |
|---|---|---|
| 1 | Toshiba E20-42D7B | Unknown |
| 2 | NKK D7B | Bismuth Chloride Glucostar ™ 19% W-11 ™ 76% |
| 3 | NKK D7B | Bismuth Sulfate Glucostar ™ 19% W-11 ™ 76% |
| 4 | NKK D7B | Bismuth Triacetate Glucostar ™ 19% W-11 ™ 76% |
| 5 | NKK D7B | Bismuth Salicylate Glucostar ™ 19% W-11 ™ 76% |
| 6 | NKK D7B | Bismuth Chloride W-11 ™ 46% Purity NCS ™ 46% PVA 4% Acrysol GS ™ 4% |
| 7 | NKK D7B | Bismuth Chloride W-11 ™ 67% Glucostar ™ 14% Keoflo ™ 14% |
| 8 | NKK D7B | Bismuth Chloride Glucostar ™ 14% W-11 ™ 67% Keoflo 14% No PVA |
| 9 | NKK D7B | Bismuth Chloride 400 Stabilizer ™ 46% W-11 ™ 46% PVA 4% Acrysol GS ™ 4% |
| 10 | Toshiba E20-42D7B | Unknown |

A. The following Table shows the results of a 3.9 Ω LIF test obtained using cells prepared with the 10 coated separators described above. Each test used the indicated number of prepared cells.

The Table shows the average capacity of each tested cell, expressed as the number of minutes required to reach a 0.9 V endpoint after storage under the indicated conditions. The Table also shows that each cell was able to retain greater than 80%, and often greater than 90% of its capacity using the capacitor-type separator paper in each of the tested cells.

TABLE A

| | Minutes to 0.9 V | | | | | | | | | |
|---|---|---|---|---|---|---|---|---|---|---|
| Lot # | 1 | 2 | 3 | 4 | 5 | 6 | 7 | 8 | 9 | 10 |
| Initial | 140.64 | 139.37 | 140.08 | 140.92 | 141.28 | 140.47 | 138.40 | 139.65 | 137.48 | 137.18 |
| 1HT | 116.74 | 118.35 | 122.63 | 130.47 | 119.30 | 124.63 | 119.33 | 115.90 | 124.62 | 130.93 |
| % Retention | 83.01 | 84.92 | 87.55 | 92.58 | 84.44 | 88.73 | 86.22 | 82.99 | 90.64 | 95.45 |
| 3HT | 112.53 | 111.86 | 114.93 | 115.53 | 114.63 | 115.13 | 114.78 | 113.95 | 118.20 | 113.05 |
| % Retention | 80.00 | 80.26 | 82.04 | 81.98 | 81.13 | 81.96 | 82.93 | 81.59 | 85.97 | 82.41 |
| 3RT | 131.30 | 131.10 | 127.90 | 128.40 | 126.20 | 131.10 | 129.90 | 130.80 | 127.70 | 132.60 |
| % Retention | 93.36 | 94.07 | 91.30 | 91.12 | 89.33 | 93.33 | 93.86 | 93.66 | 92.89 | 96.86 |

B. Gassing Test

A 3.9 Ω LIF test was performed on the above-described Heavy Duty AA cells and the evolution of gas, in ml, was determined at 10 days. The following table shows the average evolution of gas from a pair of tested cells of each type. The standard deviation is also shown.

TABLE B

| | Milliliters of Evolved Gas | | | | | | | | | |
|---|---|---|---|---|---|---|---|---|---|---|
| Lot # | 1 | 2 | 3 | 4 | 5 | 6 | 7 | 8 | 9 | 10 |
| 10 day | 1.449 | 1.271 | 2.73 | 1.539 | 1.286 | 0.755 | 1.679 | 0.956 | 1.206 | 3.157 |
| Standard Deviation | 0.06 | 0.16 | 1.77 | 0.06 | 0.11 | 0.04 | 0.48 | 0.06 | 0.1 | 0.12 |

C. Weight Loss Analysis

The above-identified Heavy Duty AA cells were tested for weight loss (in milligrams) after storage at 113° F. at pH 4.7 with 5 ml of electrolyte per can. The standard deviation is also shown in the following table.

TABLE C

| | Milligrams Weight Loss | | | | | | | | | |
|---|---|---|---|---|---|---|---|---|---|---|
| Lot # | 1 | 2 | 3 | 4 | 5 | 6 | 7 | 8 | 9 | 10 |
| 31 days | 9.03 | 13 | 12.4 | 13.2 | 8.2 | 11.8 | 13.4 | 11.9 | 11.4 | Not done |
| Standard Deviation | 0.81 | 0.2 | 0.15 | 1.79 | 0.35 | 1.7 | 1.3 | 0.42 | 0.72 | |

D. Partial Discharge Leakage Analysis

Partial discharge was performed across a 10 Ω continuous load for 72 hours. The number of cells exhibiting partial discharge leakage at 0, 2, 4, and 6 week intervals was then determined and is shown in the following table.

TABLE D

| | Number of Cells Leaking per Set | | | | | | | | | |
|---|---|---|---|---|---|---|---|---|---|---|
| Lot # | 1 | 2 | 3 | 4 | 5 | 6 | 7 | 8 | 9 | 10 |
| Initial | 0/6 | 0/6 | 0/3 | 0/6 | 0/6 | 0/6 | 0/6 | 0/6 | 0/3 | 0/6 |
| 2 week | 0/6 | 0/6 | 0/3 | 0/6 | 0/6 | 0/6 | 0/6 | 0/6 | 0/3 | 0/6 |
| 4 week | 0/6 | 0/6 | 1/3 | 1/6 | 0/6 | 0/6 | 1/6 | 0/6 | 0/3 | 0/6 |
| 6 week | 0/6 | 0/6 | 1/3 | 2/6 | 0/6 | 1/6 | 1/6 | 0/6 | 0/3 | 0/6 |

EXAMPLE 2

Second Preparation and Test of Heavy Duty AA-Size Batteries

A second analysis of Heavy Duty AA-size batteries in 6.0 ppm iron cans was made. These tests employed the following separator papers and coatings. Kraft paper used in the described tests was obtained from Mosinee Paper. The separators of the cells of Lot Number 11 were hand-placed. The cells of Lot Number 14 were commercial products and the separators were, therefore, machine-placed.

| Lot Number | Separator Paper | Coating Formulation |
|---|---|---|
| 11 | Toshiba E20-42D7B | Unknown Bismuth Component PPG-type inhibitor |
| 12 | NKK D7B | Bismuth Salicylate PPG1000 (at 14 mg/in$^2$) |
| 13 | Kraft 35 lb/ream | Bismuth Salicylate PPG1000 (at 14 mg/in$^2$) |
| 14 | Toshiba E20-42D7B | Unknown Bismuth Component PPG-type inhibitor |

Notably, this example includes a Kraft separator paper. All of the other separator papers tested were capacitor-grade papers typically used in the industry as separators in zinc-carbon batteries.

A. 3.9 ΩLIF Test

As shown below in the following table, the ability to retain charge in a 3.9 Ω LIF test using the Kraft paper is comparable, if not superior to that obtained using an identical coating on a more expensive capacitor paper.

TABLE E

| | Minutes to 0.9 V | | | |
|---|---|---|---|---|
| | Lot # | | | |
| | 11 | 12 | 13 | 14 |
| Initial | 127.10 | 136.00 | 123.80 | 137.00 |
| 1HT | 119.80 | 121.58 | 110.45 | 119.40 |
| % Retention | 94.25 | 89.39 | 89.21 | 87.15 |
| 3HT | 110.98 | 110.67 | 111.18 | 114.08 |
| % Retention | 87.32 | 81.37 | 89.81 | 83.27 |
| 3RT | 128.50 | 121.80 | 119.98 | 132.03 |
| % Retention | 101.10 | 89.56 | 96.91 | 96.37 |

B. Partial Discharge Leakage Analysis

When the above-noted test cells were evaluated for partial discharge leakage after discharge across a 10 Ω continuous load for 72 hours, the observed leakage at both room temperature and 113° F. were comparable to, or superior to, those employing the capacitor-type separator paper.

TABLE F

| | Number of Cells Leaking per Set | | | |
|---|---|---|---|---|
| | Lot # | | | |
| | 11 | 12 | 13 | 14 |
| Room Temp | | | | |
| Initial | 0/6 | 0/6 | 0/6 | 0/6 |
| 2 week | 0/6 | 1/6 | 0/6 | 0/6 |
| 4 week | 0/6 | 1/6 | 0/6 | 1/6 |
| 6 week | 0/6 | 2/6 | 0/6 | 1/6 |
| High Temp | | | | |
| Initial | 0/6 | 0/6 | 0/6 | 0/6 |
| 2 week | 0/6 | 0/6 | 0/6 | 0/6 |
| 4 week | 0/6 | 0/6 | 1/6 | 3/6 |
| 6 week | 0/6 | 0/6 | 1/6 | 3/6 |

EXAMPLE 3

Preparation and Test of Heavy Duty D-Size Batteries

The following test cells were prepared using the indicated capacitor-grade or Kraft paper separators and the indicated coatings. Lot Number 15 was a commercial capacitor-grade separator that was hand-placed into low iron cans. Lot Number 20 was prepared by coating commercial capacitor paper and was then hand-placed into cells. Lot Number 21 was a commercially available cell used as a control. NKK paper is a commercially available capacitor paper. M2 is a zero-mercury coated capacitor-grade separator paper that is commercially available from Matsushita Battery Company. PPG refers to polypropylene glycol. The inhibitor identified in M2 appears to be NPPEG which is nonyl phenoxypolyethylene glycol.

The coating weight is presented in mg/in$^2$. The "pass" indication refers to the number of passes through an air knife coater used in producing the tested coated separator papers.

| Lot Number | Separator Paper | Coat. Formulation | Weight |
|---|---|---|---|
| 15 | Toshiba D7B E30-D7B | Unknown Bismuth Comp. | 22 mg/in$^2$ |
| 16 | Kraft 35 lb/ream | Bismuth Salicylate PPG1000 | 22 mg/in$^2$ 2-pass |
| 17 | NKK D7B | Bismuth Salicylate PPG1000 | 22 mg/in$^2$ 2-pass |
| 18 | NKK D7B | Bismuth Salicylate PPG1000 | 34 mg/in$^2$ 3-pass |
| 19 | Kraft 35 lb/ream | Bismuth Salicylate PPG1000 | 34 mg/in$^2$ 2-pass |
| 20 | M2 | NPPEG | |
| 21 | M2 | NPPEG | |

A. 2.2 Ω LIF Test

A 2.2 Ω LIF test was performed on the above-noted Heavy Duty D-size batteries. The individual results of each battery tested, plus the average and standard deviation are shown. Readings were also taken after 1 month and 3 months, for the test performed at high temperature, and at 3 months for the test performed at room temperature.

TABLE G

| | | Minutes to 0.9 V | | | | | | |
|---|---|---|---|---|---|---|---|---|
| Lot # | Delay | 15 | 16 | 17 | 18 | 19 | 20 | 21 |
| 0 | | 634.40 | 632.80 | 655.70 | 587.40 | 614.00 | 582.20 | 418.40 |
| | | 623.40 | 636.40 | 639.20 | 587.60 | 606.00 | 554.40 | 450.50 |
| | | 624.80 | 660.80 | 654.40 | 591.60 | 581.20 | 583.30 | 483.90 |
| | | 595.40 | 450.00 | 598.00 | 583.40 | 614.00 | 556.60 | 419.10 |
| | | 575.20 | 654.00 | 595.70 | 558.00 | 587.60 | 581.80 | 482.60 |
| | | 595.40 | 606.00 | 615.70 | 583.60 | 604.80 | 558.00 | 419.50 |
| Average | | 608.10 | 606.67 | 626.45 | 481.93 | 601.27 | 569.38 | 445.67 |
| Std Dev | | 22.85 | 79.10 | 27.09 | 12.11 | 13.77 | 14.35 | 31.57 |
| 1HT | | 603.60 | 566.00 | 584.60 | 419.40 | 539.20 | 483.40 | 417.60 |
| | | 592.80 | 570.40 | 547.20 | 290.90 | 285.10 | 420.30 | 391.20 |
| | | 584.70 | 530.00 | 588.80 | 572.80 | 289.50 | 386.60 | 418.60 |
| | | 516.80 | 559.20 | 259.60 | 571.20 | 527.30 | 417.50 | 419.90 |
| | | 530.00 | 596.60 | 554.00 | 418.00 | 519.60 | 420.30 | 523.50 |
| | | 513.20 | 519.40 | 532.80 | 548.80 | 227.90 | 571.20 | 515.20 |
| 1HT | | 551.18 | 556.90 | 511.16 | 470.18 | 398.08 | 449.88 | 447.65 |
| % Retention | | 91.30 | 87.29 | 81.59 | 80.79 | 66.21 | 79.01 | 100.44 |
| 3HT | | 320.8 | 504.8 | 485.6 | 482.0 | 510.0 | 387.0 | 387.7 |
| | | 322.6 | 321.5 | 562.0 | 577.6 | 481.4 | 290.7 | 387.5 |

TABLE G-continued

| | | Minutes to 0.9 V | | | | | | |
|---|---|---|---|---|---|---|---|---|
| Lot # | Delay | 15 | 16 | 17 | 18 | 19 | 20 | 21 |
| | | 352.9 | 259.6 | 482.8 | 577.2 | 518.4 | 356.0 | 387.6 |
| | | 386.3 | 558.0 | 508.8 | 547.3 | 227.3 | 323.4 | 419.2 |
| | | 289.4 | 466.0 | 355.0 | 566.0 | 550.0 | 355.3 | 355.7 |
| | | 419.5 | 495.6 | 292.0 | 582.0 | 478.0 | 386.6 | 418.5 |
| Average | | 348.6 | 434.2 | 447.7 | 555.35 | 460.95 | 349.83 | 392.70 |
| Std Dev | | 47.79 | 116.8 | 102.27 | 38.05 | 117.18 | 37.40 | 23.73 |
| 3HT | | 348.6 | 434.2 | 447.4 | 555.35 | 460.95 | 349.83 | 392.70 |
| % Retention | | 57.32 | 71.58 | 71.46 | 95.43 | 76.66 | 61.44 | 88.11 |
| 3RT | | 601.50 | 618.73 | 597.32 | 588.30 | 607.40 | 551.13 | 404.93 |
| % Retention | | 98.91% | 101.99% | 95.35% | 101.09% | 101.02% | 96.79% | 90.86% |

39 Ω Test

After storage under the indicated conditions, the discharge process was carried out across a 39 Ω load for 4 continuous hours per day followed by 20 hours of rest. The results presented below indicate that when compared to a control commercial battery, batteries employing a 35 lb/ream Kraft paper, at either 22 mg/in$^2$ or 34 mg/in$^2$ coating weight, retain charge to an extent comparable to those cells employing more expensive capacitor-grade paper. These data are expressed as the number of hours required to reach a 0.9V endpoint.

TABLE H

| | | Hours to 0.9 V | | | | | | |
|---|---|---|---|---|---|---|---|---|
| Lot # | Delay | 15 | 16 | 17 | 18 | 19 | 20 | 21 |
| | 0 | 204.2 | 188.1 | 173.0 | 211.7 | 202.8 | 217.5 | 216.5 |
| | | 187.0 | 197.4 | 180.4 | 182.3 | 212.3 | 200.3 | 212.0 |
| | | 196.2 | 180.6 | 196.1 | 181.9 | 222.5 | 209.9 | 208.1 |
| Average | | 195.8 | 188.7 | 183.2 | 192.0 | 212.5 | 209.2 | 212.2 |
| Std Dev | | 8.6 | 8.4 | 11.8 | 17.1 | 9.9 | 8.6 | 4.2 |

B. 2.2 Ω LIF Gassing Test

Three samples of each of the indicated cells were tested for gas evolution at 10 days after discharge across 2.2 Ω load in a LIF test. Low gas evolution was observed in the tested 35 lb/ream Kraft separator cell.

TABLE I

| | | Milliliters of Evolved Gas | | | | | | |
|---|---|---|---|---|---|---|---|---|
| Lot # | Delay | 15 | 16 | 17 | 18 | 19 | 20 | 21 |
| n = 3 | 10 day | 2.35 | 3.958 | 3.257 | 3.272 | no cells | 3.765 | 13.249 |
| Std Dev | | | 0.558 | 0.098 | 0.055 | 0.219 | | 0.084 | 0.405 |

C. Leakage Analysis

Six cells of each of the indicated Heavy Duty D-size batteries were tested for leakage at various times after discharge across a 5 Ω load for 24 hours. No leakage was observed at 2, 4, or 6 weeks after discharging.

D. Partial Discharge Ampere Retention Test

A partial discharge amp retention test was performed after cells had been discharged across a 2.2 Ω load for 250 minutes. The residual flash amperes in each of the indicated cells are shown below at initial, 6-week, and 12-week time points.

TABLE J

| | | Flash Amperes | | | | | | |
|---|---|---|---|---|---|---|---|---|
| Lot # | Delay | 15 | 16 | 17 | 18 | 19 | 20 | 21 |
| | Initial | 5.538 | 5.686 | 5.864 | 5.796 | no cells | 4.846 | 5.057 |
| | 6 WK | 5.211 | 4.56 | 4.942 | 5.03 | no cells | 4.343 | 3.586 |
| | % Retention | 94.09 | 80.19 | 84.27 | 86.78 | | 89.62 | 70.91 |
| | 12 WK | 5.017 | 4.22 | 4.684 | 4.834 | no cells | 4.11 | 3.334 |
| | % Retention | 90.59 | 74.22 | 79.87 | 83.4 | | 84.81 | 65.93 |
| | | | | | | | | n = 3 |

EXAMPLE 4

Preparation and Test of Heavy Duty AA-Size Batteries

To determine the effect of various bismuth inorganic inhibitors in combination with capacitor-type separator papers, the following Heavy Duty AA-size batteries were prepared in 6.0 ppm iron cans. MHD refers to a commercial capacitor paper available from MH Dielectrics. Lot Number 26 was hand-placed using a commercial capacitor paper from Toshiba. Lot Number 27 was a commercial battery cell employing a capacitor paper that was used as a control.

| Lot Number | Separator Paper | Coat. Formulation | Weight |
|---|---|---|---|
| 22 | NKK D7B | Bismuth Salicylate PPG230 | 14 mg/in$^2$ |
| 23 | NKK D7B | No Bismuth PPG230 | 14 mg/in$^2$ |
| 24 | MHD D7B | Bismuth Trioxide PPG230 | 14 mg/in$^2$ |
| 25 | NKK D7B | Bismuth Trioxide PPG230 | 14 mg/in$^2$ |
| 26 | Toshiba E20-42D7B | Unknown Bismuth Comp. PPG | 14 mg/in$^2$ |
| 27 | Toshiba E20-42D7B | Unknown Bismuth Comp. PPG | 14 mg/in$^2$ |

A. 3.9 Ω LIF Test

When the above-indicated test cells were compared against the commercial Toshiba control after discharge across a 3.9 Ω load under LIF test conditions, the following results were observed.

TABLE K

Minutes to 0.9 V

| Lot# | 22 | 23 | 24 | 25 | 26 | 27 |
|---|---|---|---|---|---|---|
| Initial | 142.1 | 145.9 | 140.2 | 139.0 | 141.2 | 146.5 |
| 1HT | 133.8 | 132.8 | 126.9 | 134.3 | 133.3 | 132.9 |
| % Retention | 94.2 | 91.0 | 90.6 | 96.6 | 88.2 | 90.7 |
| 3HT | 117.0 | 124.2 | 100.0 | 131.3 | 134.5 | 123.86 |
| % Retention | 82.3 | 85.1 | 71.4 | 94.5 | 88.9 | 84.5 |
| 3RT | 137.11 | 139.10 | 134.80 | 137.35 | 145.38 | 141.3 |
| % Retention | 96.49 | 95.34 | 96.18 | 98.85 | 96.16 | 96.43 |
| 6RT | 135.85 | 121.36 | 126.70 | 139.13 | no cells | 144.40 |
| % Retention | 95.60 | 83.18 | 90.37 | 100.10 | | 98.56 |

B. 3.9 Ω LIF With Gassing

A 3.9 Ω LIF with gassing test was performed on the above-Heavy Duty AA-size batteries. The following table indicates the evolution of gas, in milliliters, from each type of tested cell, over a ten day period.

TABLE L

Milliliters of Evolved Gas

| Lot # | 22 | 23 | 24 | 25 | 26 | 27 |
|---|---|---|---|---|---|---|
| 10 day | 0.863 | 0.97 | 0.638 | 0.639 | 0.425 | 2.493 |
| Std Dev | 0.053 | 0.113 | 0.162 | 0.102 | 0.114 | 0.158 |

C. Photoflash Cycle Test

The following table reports the average number of photoflash discharge cycles (1 cycle=15 second discharge across 1.8 Ωload per minute) needed to reach a 0.9 V endpoint after storage under the indicated conditions.

TABLE M

Number of Cycles to 0.9 V

| Lot # | 22 | 23 | 24 | 25 | 26 | 27 |
|---|---|---|---|---|---|---|
| Initial | 155.15 | 148.13 | 152.93 | 159.03 | 146.79 | 154.96 |
| 1HT | 141.24 | 135.60 | 137.18 | 139.18 | 134.36 | 140.03 |
| % Retention | 91.03 | 91.54 | 89.70 | 87.62 | 91.63 | 90.36 |
| 3HT | 127.96 | 131.43 | 128.73 | 132.82 | 129.43 | 133.61 |
| % Retention | 90.69 | 96.92 | 93.84 | 96.43 | 96.33 | 96.41 |
| 3RT | 147.55 | 147.53 | 149.78 | 148.69 | 151.57 | 149.77 |
| % Retention | 95.10 | 99.59 | 97.94 | 93.50 | 103.25 | 96.65 |

D. Partial Discharge Leakage Analysis

A partial discharge leakage analysis was performed on the above-noted Heavy Duty AA-size cells after discharge across a 10 Ω continuous load for 240 minutes.

The following leakage results were observed at 2, 4, and 6 weeks of post-discharge storage at room temperature (70° F.) and high temperature (113° F.).

TABLE N

Number of Cells Leaking per Set

| Lot # | 22 | 23 | 24 | 25 | 26 | 27 |
|---|---|---|---|---|---|---|
| RT | | | | | | |
| Initial | 0/10 | 0/10 | 0/10 | 0/10 | 0/10 | 0/10 |
| 2 wk | 0/10 | 0/10 | 0/10 | 0/10 | 0/10 | 0/10 |
| 4 wk | 0/10 | 0/10 | 1/10 | 1/10 | 1/10 | 0/10 |
| 6 wk | 2/10 | 3/10 | 1/10 | 1/10 | 2/10 | 1/10 |

TABLE N-continued

Number of Cells Leaking per Set

| Lot # | 22 | 23 | 24 | 25 | 26 | 27 |
|---|---|---|---|---|---|---|
| HT | | | | | | |
| Initial | 0/10 | 0/10 | 0/10 | 0/10 | 0/10 | 0/10 |
| 2 wk | 0/10 | 0/10 | 1/10 | 0/10 | 0/10 | 0/10 |
| 4 wk | 2/10 | 0/10 | 1/10 | 0/10 | 2/10 | 0/10 |
| 6 wk | 3/10 | 5/10 | 5/10 | 4/10 | 4/10 | 6/10 |

E. Partial Discharge Ampere Retention Test

The above-noted Heavy Duty AA-size cells were tested for charge retention after discharge across a 10 Ω continuous load for 240 minutes.

The following data were obtained followed by storage at room temperature or at 113° F., for 0, 2, 4 and 6 weeks.

TABLE O

Flash Amperes

| Lot # | 22 | 23 | 24 | 25 | 26 | 27 |
|---|---|---|---|---|---|---|
| RT | | | | | | |
| Initial | 2.478 | 2.358 | 2.101 | 2.446 | 2.415 | 2.269 |
| 2 wk | 2.414 | 2.333 | 2.117 | 2.435 | 2.406 | 2.207 |
| % Retention | 97.41 | 98.94 | 100.76 | 99.67 | 99.62 | 97.26 |
| 4 wk | 2.393 | 2.272 | 2.083 | 2.341 | 2.368 | 2.006 |
| % Retention | 96.57 | 96.35 | 99.14 | 95.71 | 98.05 | 88.41 |
| 6 wk | 2.354 | 2.198 | 2.031 | 2.273 | 2.294 | 2.035 |
| % Retention | 94.99 | 93.21 | 96.67 | 92.93 | 94.99 | 89.68 |
| HT | | | | | | |
| Initial | 2.491 | 2.501 | 2.202 | 2.559 | 2.497 | 2.520 |
| 4 wk | 2.500 | 2.499 | 2.261 | 2.598 | 2.502 | 2.522 |
| % Retention | 100.36 | 99.92 | 102.68 | 101.52 | 100.20 | 100.08 |
| 6 wk | 2.414 | 2.403 | 2.174 | 2.516 | 2.423 | 2.454 |
| % Retention | 96.56 | 96.16 | 96.15 | 96.84 | 96.84 | 97.3 |

EXAMPLE 5
Preparation and Test of Heavy Duty D-Size Cells

In the following tests, a set of separator papers including capacitor-type and Kraft papers (at 35 lb/ream and 55 lb/ream) were prepared and tested in Heavy Duty D-size cells. As a control, a commercially available Toshiba K9B separator capacitor-grade paper, of unknown composition, was tested, as was a commercially available battery cell containing Toshiba K9B separator paper. The separators of the cells of Lot Number 28 were hand-placed using the commercial coated Toshiba K9B capacitor paper. Lot 34 was a commercially available cell and, therefore, the separators were machine-placed.

| Lot Number | Separator Paper | Coat. Formulation | Weight |
|---|---|---|---|
| 28 | Toshiba K9B | Unknown Bismuth Compound PPG-Type inhibitor | 22 mg/in$^2$ |
| 29 | MHD K9B-equivalent | Bismuth Trioxide PPG230 | 22 mg/in$^2$ |
| 30 | Kraft 35 lb/ream | Bismuth Trioxide PPG230 | 34 mg/in$^2$ |
| 31 | NKK K9B | Bismuth Trioxide | 22 mg/in$^2$ |
| 32 | Kraft 35 lb/ream | Bismuth Trioxide PPG230 | 22 mg/in$^2$ |
| 33 | Kraft | Bismuth Trioxide | 22 mg/in$^2$ |

-continued

| Lot Number | Separator Paper | Coat. Formulation | Weight |
|---|---|---|---|
| 34 | 55 lb/ream Toshiba K9B | PPG230 Unknown Bismuth Compound PPG-Type Inhibitor | 22 mg/in$^2$ |

A. 2.2 Ω LIF Test

After storage under the indicated conditions, a LIF test was performed as described using discharge across a 2.2 Ω load. The following results were obtained.

TABLE P

| | Minutes 0.9 V | | | | | | |
|---|---|---|---|---|---|---|---|
| Lot # Delay | 28 | 29 | 30 | 31 | 32 | 33 | 34 |
| 0 | 566.83 | 589.70 | 593.15 | 607.00 | 605.53 | 614.86 | 481.35 |
| 1 HT | 528.83 | 545.80 | 514.73 | 520.00 | 475.85 | 504.68 | 540.66 |
| % Retention | 93.28 | 92.66 | 86.78 | 85.66 | 78.68 | 82.08 | 112.32 |
| 3 HT | 415.00 | 464.96 | 429.40 | 468.23 | 451.25 | 308.4 | 441.78 |
| % Retention | 73.20 | 78.84 | 72.39 | 77.14 | 74.52 | 50.15 | 91.78 |
| 3 RT | 545.78 | 588.45 | 597.70 | 585.83 | 597.98 | 596.10 | 517.10 |
| % Retention | 96.27 | 99.78 | 100.76 | 96.51 | 98.75 | 96.95 | 107.43 |
| 6 RT | 469.80 | | 570.20 | 623.20 | 589.80 | 556.40 | 501.20 |
| % Retention | 82.87 | | 96.13 | 102.67 | 97.40 | 90.49 | 104.12 |

B. 39 Ω 4 Hour/Day Test

Using fresh Heavy Duty D-size cells, the discharge process was carried out across a 39 Ω load for 4 continuous hours per day, followed by 20 hours of rest. The following results were obtained.

TABLE Q

| | Hours to 0.9 V | | | | | | |
|---|---|---|---|---|---|---|---|
| Lot # Delay | 28 | 29 | 30 | 31 | 32 | 33 | 34 |
| 0 | 179.3 | 175.1 | 184.3 | 176.8 | 178.0 | 188.8 | 195.6 |

C. Partial Discharge Leakage

A partial discharge leakage test was performed after storage at high temperature or room temperature discharging the cells across a 5 Ω continuous load for 930 minutes. Ten cells of each type were tested for a 6-week period. No leakage was observed in any cell at 0, 2, 4 or 6 weeks of storage.

D. Ampere Retention Test

The above-indicated Heavy Duty D-cells were stored under the indicated conditions and were then discharged across a 5 Ω continuous load for 930 minutes. Those cells employing a Kraft-grade separator paper exhibit comparable or superior charge retention to those employing the more expensive capacitor-type separator paper, without regard to whether the cells were stored at high temperature (113° F.) or room temperature.

TABLE R

| | Flash Amperes | | | | | | |
|---|---|---|---|---|---|---|---|
| Lot # Delay | 28 | 29 | 30 | 31 | 32 | 33 | 34 |
| RT | | | | | | | |
| Initial | 4.335 | 4.478 | 4.255 | 4.306 | 4.305 | 4.011 | 4.112 |
| 2 wk | 4.185 | 4.156 | 4.059 | 4.160 | 4.159 | 3.811 | 3.582 |
| % Retention | 96.54 | 92.81 | 95.39 | 96.61 | 96.61 | 95.01 | 87.11 |
| 4 wk | 3.791 | 3.651 | 3.762 | 3.732 | 3.741 | 3.424 | 3.301 |
| % Retention | 87.45 | 81.53 | 88.41 | 86.70 | 86.90 | 85.36 | 80.27 |
| 6 wk | 3.391 | 3.531 | 3.697 | 3.574 | 3.621 | 3.375 | 3.351 |
| % Retention | 78.23 | 78.85 | 86.88 | 83.00 | 84.11 | 84.14 | 81.51 |
| HT | | | | | | | |
| Initial | 4.177 | 4.320 | 4.124 | 4.352 | 4.360 | 4.028 | 4.189 |
| 2 wk | 3.921 | 4.326 | 4.209 | 4.252 | 4.364 | 4.001 | 3.441 |
| % Retention | 93.87 | 100.13 | 102.06 | 97.7 | 100.09 | 99.33 | 82.15 |
| 4 wk | 3.659 | 4.134 | 3.980 | 3.882 | 4.066 | 3.738 | 3.001 |
| % Retention | 87.60 | 95.69 | 96.51 | 89.20 | 93.25 | 92.80 | 71.65 |

TABLE R-continued

| | | Flash Amperes | | | | | | |
|---|---|---|---|---|---|---|---|---|
| Lot # | Delay | 28 | 29 | 30 | 31 | 32 | 33 | 34 |
| | 6 wk | 3.465 | 3.665 | 3.606 | 3.517 | 3.808 | 3.372 | 2.070 |
| | % Retention | 82.97 | 84.83 | 87.44 | 80.81 | 87.34 | 83.71 | 49.41 |

EXAMPLE 6
Larger Scale Preparation and Analysis of Coated Papers in Heavy Duty Cells On the basis of the preceding results, a coating having the following formulation was prepared in a limited plant run of approximately 500 lbs. per cell size. The coating was tested on a number of Kraft and capacitor-type papers in five different cell types: AA, C, D, 941 (Lantern) and 944 (Lantern).

The coating formulation was as follows:
8.7% glucostar starch
70% W-11™ starch
15% Keoflo 364 starch
1% polyvinyl alcohol
2% polypropylene glycol 230
1.2% bismuth trioxide (American International Chemical, "AIC")

This coating formulation was applied at the indicated coating weight on the indicated substrate papers.

| Lot | Paper | Coat. Wt. | Cell Size | [Iron] (ppm) |
|---|---|---|---|---|
| 35 | MHD K9B-equiv. | 22 mg/in$^2$ | D | 9.7 |
| 35A | MHD K9B-equiv. | 22 mg/in$^2$ | Lantern 941/944 | 14.5/10.8 |
| 36 | MHD K9B-equiv. | 34 mg/in$^2$ | D | 9.7 |
| 36A | MHD K9B-equiv. | 34 mg/in$^2$ | Lantern 941/944 | 14.5/10.8 |
| 37 | Kraft 55 lb/ream | 22 mg/in$^2$ | D | 9.7 |
| 38 | Kraft 55 lb/ream | 34 mg/in$^2$ | D | 9.7 |
| 39 | Kraft 55 lb/ream | 22 mg/in$^2$ | Lantern 941/944 | 14.5/10.8 |
| 40 | Kraft 55 lb/ream | 34 mg/in$^2$ | Lantern 941/944 | 14.5/10.8 |
| 41 | NKK D7B | 14 mg/in$^2$ | AA | 12.7 |
| 42 | MHD D7B-equiv. | 14 mg/in$^2$ | AA | 12.7 |
| 43 | Kraft 35 lb/ream | 14 mg/in$^2$ | AA | 12.7 |
| 44 | NKK D7B | 22 mg/in$^2$ | C | 8.3 |
| 45 | MHD D7B-equiv. | 22 mg/in$^2$ | C | 8.3 |
| 46 | Kraft 35 lb/ream | 22 mg/in$^2$ | C | 8.3 |

A second scale-up of a coating having the following similar formulation was prepared in a limited plant run of approximately 500 lbs. per cell size. The second scale-up coating was tested on a number of Kraft and capacitor-type papers in five different heavy duty cell types: AA, C, D, 941 (Lantern) and 944 (Lantern).

The coating formulation was as follows:
7.0% glucostar starch
70.6% W-11™ starch
15.2% Keoflo 364 starch
4% polyvinyl alcohol
2% polypropylene glycol 230
1.2% bismuth trioxide (AIC material)

This coating formulation was applied at the indicated coating weight on the indicated substrate paper. MHB K9B-equivalent paper had a basis weight of 64.7 g/m$^2$, a thickness of 0.003 inches and a density of 0.82 g/cm$^2$.

| Lot | Paper | Coat. Wt. | Cell Size | [Iron] (ppm) |
|---|---|---|---|---|
| 47 | MHD K9B-equiv. | 22 mg/in$^2$ | D | 11.5 |
| 47A | MHD K9B-equiv. | 22 mg/in$^2$ | Lantern 941/944 | 10.8/11.2 |
| 48 | MHD K9B-equiv. | 34 mg/in$^2$ | D | 11.5 |
| 48A | MHD K9B-equiv. | 34 mg/in$^2$ | Lantern 941/944 | 10.8/11.2 |
| 49 | Kraft 55 lb/ream | 22 mg/in$^2$ | D | 11.5 |
| 50 | Kraft 55 lb/ream | 34 mg/in$^2$ | D | 11.5 |
| 51 | Kraft 55 lb/ream | 22 mg/in$^2$ | Lantern 941/944 | 10.8/11.2 |
| 52 | Kraft 55 lb/ream | 34 mg/in$^2$ | Lantern 941/944 | 10.8/11.2 |
| 53 | NKK D7B | 14 mg/in$^2$ | AA | 11.0 |
| 54 | Kraft 35 lb/ream | 14 mg/in$^2$ | AA | 11.0 |
| 55 | NKK D7B | 22 mg/in$^2$ | C | 10.6 |
| 56 | Kraft 35 lb/ream | 22 mg/in$^2$ | C | 10.6 |

The analyses performed on the first and second scale up tests of the above-noted coatings are indicated below.

I. Analysis of Heavy Duty D-Size Cells of Scale Up Runs 1 and 2

Attached FIGS. 9A–9H (scale up run 1) and 10A–10H (scale up run 2) report the results obtained when Heavy Duty D-size cells prepared using separators prepared as described in the preceding section were stored under the indicated conditions and then compared in the following tests against control cells. Control cells were made using a commercially available coated separator for use in Heavy Duty cells. The control separator was Toshiba K9B paper with 22 mg/in$^2$ coating.

A. 2.2 Ω LIF test.

B. Cells were discharged continuously across a 2.2 Ω load for 1 hour per day until an endpoint of 0.9V (first run) or 0.8V (second run) was reached.

C. Cells were discharged continuously across a 2.2 Ω load until an endpoint of 0.8V was reached.

D. 3.9 Ω one hour per day LIF test.

E. Cells were discharged continuously across a 39 Ω load for four hours per day until an endpoint of 0.9 V was reached.

F. Delayed Target Analyses. The charge capacity of fresh cells was determined. A similar analysis was performed on the cells after storage for 0, 2, or 4 months at 113° F. in 50% humidity. Yet another delayed target analysis was performed after 3 months storage at 130° F. Even under these conditions, there is virtually no difference in residual charge capacity after this treatment.

G. A Partial Discharge Leakage Analysis was performed on samples of each of the above-noted Heavy Duty D-size cells after discharge across a 5 Ω load for a 24 hour time period. The cells were stored for up to 12 weeks at room temperature and monitored for leakage during the storage period. Ten cells of each type were monitored at each time. No leakage was observed, even at 12 weeks after initiation of the test.

H. A Partial Discharge Ampere Retention Analysis was performed at 0, 6, and 12 weeks. Cells were stored at Room Temperature and at High Temperature (113 ° F.) and tested at Room Temperature.

II. Analysis of Heavy Duty C-Size Cells of Scale Up Runs 1 and 2

Attached FIGS. 11A–11E (scale up run 1) and 12A–12E (scale up run 2) report the results obtained when Heavy Duty C-size cells prepared using separators prepared as described in the preceding section were stored under the indicated conditions and then compared in the following tests against control cells. Control cells were made using a commercially available coated separator for use in Heavy Duty cells. The control separator was Toshiba D7B paper with 22 mg/in$^2$ coating.

A. 3.9 Ω LIF Test.

B. Cells were discharged continuously across a 3.9 Ω load for one hour per day until an endpoint of 0.8V was reached.

C. Cells were discharged continuously across a 3.9 Ω load until an endpoint of 0.8V was reached.

D. Cells were continuously discharged across a 6.8 Ω load for one hour per day until an endpoint of 0.9V was reached.

E. Cells were discharged across a 39 Ω load for four continuous hours per day until an endpoint of 0.9V was reached.

F. Delayed Target Analysis. The amperage range of fresh cells was determined. A similar analysis was performed on the cells after storage for 0, 2, or 4 months at 113° F. in 50% humidity. Yet another delayed target analysis was performed after 0, 1, 2 or 3 months storage at 130° F.

G. A Partial Discharge Leakage Analysis was performed on ten samples of each of the above-noted Heavy Duty C-size cells after discharge across a 7.5 Ω load for a 24 hour time period. The cells were stored for up to 12 weeks at room temperature and monitored for leakage during the storage period. Ten cells of each type were monitored at each time point.

H. A Partial Discharge Ampere Retention Analysis was performed at 0, 6, and 12 weeks. Cells were stored at Room Temperature and at High Temperature (113° F.) and tested at Room Temperature.

III. Analysis of Heavy Duty AA-Size Cells of Scale Up Runs 1 and 2

Attached FIGS. 13A–13E (scale up run 1) and 14A–14I (scale up run 2) report the results obtained when Heavy Duty AA-size cells prepared using separators prepared as described in the preceding section were stored under the indicated conditions and then compared in the following tests against control cells. Control cells were made using a commercially available coated separator for use in Heavy Duty cells. The control separator was Toshiba K9B paper with E20 coating.

A. 3.9 Ω LIF Test.

B. Cells were discharged continuously across a 3.9 Ω load for one hour per day until an endpoint of 0.9V (first run) or 0.8V (second run) was reached.

C. Cells were discharged continuously across a 3.9 Ω load until an endpoint of 0.8V was reached.

D. The average number of photoflash discharge cycles (1 cycle=15 second discharge across 1.8 Ω load per minute) needed to reach a 0.9 V endpoint after storage under the indicated conditions was determined.

E. Cells were discharged continuously across a 10 Ω load for one hour per day until an endpoint of 0.9V was reached.

F. Cells were discharged continuously across a 75 Ω load for four hours per day until an endpoint of 0.9V was reached.

G. Delayed Target Analysis. The flash amperage range of fresh cells and cells stored for six months at room temperature was determined. A similar analysis was performed on the cells after storage for 0, 2, or 4 months at 113° F. in 50% humidity. Yet another delayed target analysis was performed after 0, 1, 2 or 3 months storage at 130° F.

H. A Partial Discharge Leakage Analysis was performed on ten samples of each of the above-noted Heavy Duty AA-size cells after discharge across a 10 Ω load for the indicated time period.

I. A Partial Discharge Ampere Retention Analysis was performed at 0, 6, and 12 weeks. Cells were stored at Room Temperature and at High Temperature (113° F.) and tested at Room Temperature.

IV. Analysis of 941 and 944-Size Cells

Attached FIGS. 15A–15C (scale up run 1) and 16A–16C (scale up run 2) report the results obtained when Heavy Duty Lantern-size 941 cells prepared using separators prepared as described in the preceding section were stored under the indicated conditions and then compared in the following tests against control cells. Comparable results for Lantern Size 944 are reported in FIGS. 17A–17C (Scale up Run 1) and 18A–18C (Scale up Run 2). Control cells were made using AP4 coated separator paper available from Appleton Papers, Inc.

A. Cells were discharged across a 6.8 Ω load for 30 min. per hour until a 2.6 V endpoint was reached.

B. Cells were discharged across a 9.1 Ω load for 30 min. per hour until a 2.6 V endpoint was reached.

C. Cells were discharged across a 16 Ω load for 30 min. per hour until a 3.0V endpoint was reached.

D. Cells were discharged across a 33 Ω load for 30 min. per hour until a 3.6 V endpoint was reached.

E. Cells were discharged continuously across a 110 Ω load until a 3.0 V endpoint was reached.

F. A Partial Discharge Ampere Retention Analysis was performed after continuous discharge across a 9.1 Ω load until a 4.2 V endpoint was reached.

G. Cells were discharged continuously for the indicated periods of time across a 40 Ω load. Leakage from the cells was determined.

H. Cells were discharged continuously across a 40 Ω continuous load until a 1.0 V endpoint was reached. Leakage was determined at the indicated timepoints.

V. Summary Comparison of Scaleup Runs

The data gathered from each type of cells produced in scale up runs 1 and 2 are summarized in attached FIGS. 19–22, from which it is apparent that in all regards the low cost Kraft paper separators of the present invention coated with the indicated coatings are comparable or superior to expensive commercial separators when employed in Heavy Duty LeClanche cells. Reference in these summary comparisons to E20, E30, and E50 refer to coating weights of 14, 22 and 34 mg/in$^2$, respectively.

Those skilled in the art will now see that certain modifications can be made to the compositions, apparatus, and methods disclosed herein as preferred embodiments, without departing from the spirit of the present invention. Thus, the spirit and scope of the present invention is not restricted to what is described above. Within the general framework of LeClanche cells or batteries of the present invention, and methods of making or using same, a very large number of permutations and combinations will now be seen to be possible, all of which are within the scope of the present invention. For example, the present invention encompasses within its scope separators for heavy duty LeClanche cells comprising a Kraft paper separator paper substrate and other coating constituents incorporated therein that are not specifically recited herein, including equivalents thereof.

We claim:

1. A method of making an ionically permeable separator configured for use in a Heavy Duty LeClanche cell, the method comprising the steps of:
   (a) selecting a Kraft paper substrate;
   (b) depositing onto the Kraft paper substrate a coating selected for an ability to inhibit corrosion of a zinc anode, the coating comprising an organic inhibitor, an inorganic inhibitor, a binding agent, and a starch.

2. The method of claim 1, wherein the organic inhibitor is selected from the group consisting of a polypropylene glycol, polyethylene oxide, polyalkyl glycol, polyalkyl oxide, polyethylene oxide; an ester, phosphate, ether, alkyl ester, aryl ester, alkyl phosphate, or aryl phosphate of polyethylene oxide, an ester, phosphate, ether, alkyl ester, aryl ester, alkyl phosphate, or aryl phosphate of polypropylene oxide, and combinations of an ester, phosphate, ether, alkyl ester, aryl ester, alkyl phosphate, or aryl phosphate of polyethylene oxide and polypropylene oxide.

3. The method of claim 1, wherein the inorganic inhibitor is a compound comprising an element selected from the group consisting of bismuth and indium.

4. The method of claim 1, wherein the inorganic inhibitor is a compound selected from the group consisting of indium oxide, indium chloride, indium salicylate, indium acetate, indium sulfide, indium nitrate, indium oxalate, indium phosphate, indium methoxide and indium hydroxide.

5. The method of claim 1, wherein the inorganic inhibitor is a compound selected from the group consisting of bismuth acetate, bismuth chloride, bismuth citrate, bismuth neodicanoate, bismuth oxychloride, bismuth 2-ethylhexoate, bismuth borate, bismuth nitrate, bismuth phosphate, bismuth subacetate, bismuth sulfide, bismuth salicylate, bismuth sulfate, and bismuth trioxide.

6. The method of claim 1, wherein the binding agent is selected from the group consisting of a polymeric acetate or a polymeric alcohol.

7. The method of claim 1, wherein the starch is selected from the group consisting of a modified corn starch, natural corn starch, modified potato starch, natural potato starch, wheat starch, wheat flour, rice starch, natural cellulose-based adhesive, cellulose materials, guar gum and xanthum gum thereof.

8. The method of claim 1 wherein the coating comprises a compound comprising bismuth, a polymeric alcohol, a non-ionic organic surfactant, and a starch.

9. The method of claim 1 wherein the coating comprises between 0.5 and 5% of a compound comprising bismuth, between 0.5 and 5% of an organic corrosion inhibitor, less than 5% of a binding agent, and a starch.

10. The method of claim 9, wherein the coating comprises between about 1 and 2% of a bismuth compound by weight.

11. The method of claim 1 further comprising the step of configuring the separator for use in a Heavy Duty LeClanche cell.

12. The method of claim 11 wherein the separator is further configured for use in a round LeClanche cell.

13. The method of claim 11 wherein the separator is further configured for use in a cell selected from the group consisting of AAA-, A-, C- D- and Lantern sizes.

14. The method of claim 11 wherein the separator is further configured for use in a flat LeClanche cell.

* * * * *